MULTI-WORD MULTI-DIRECTIONAL RANDOM ACCESS MEMORY SYSTEM

Filed Dec. 28, 1966

46 Sheets-Sheet 1

INVENTOR
ARNOLD WEINBERGER
BY [signature]
ATTORNEY

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 4

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 12

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 13

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 14

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 19

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 24

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 31

Sept. 9, 1969 A. WEINBERGER 3,466,611

MULTI-WORD MULTI-DIRECTIONAL RANDOM ACCESS MEMORY SYSTEM

Filed Dec. 28, 1966 46 Sheets-Sheet 33

Sept. 9, 1969 A. WEINBERGER 3,466,611

MULTI-WORD MULTI-DIRECTIONAL RANDOM ACCESS MEMORY SYSTEM

Filed Dec. 28, 1966

46 Sheets-Sheet 35

SENSE WINDING DETAILS

MEMORY CUBE DRIVE LINES

FIG. 16 ROTATOR
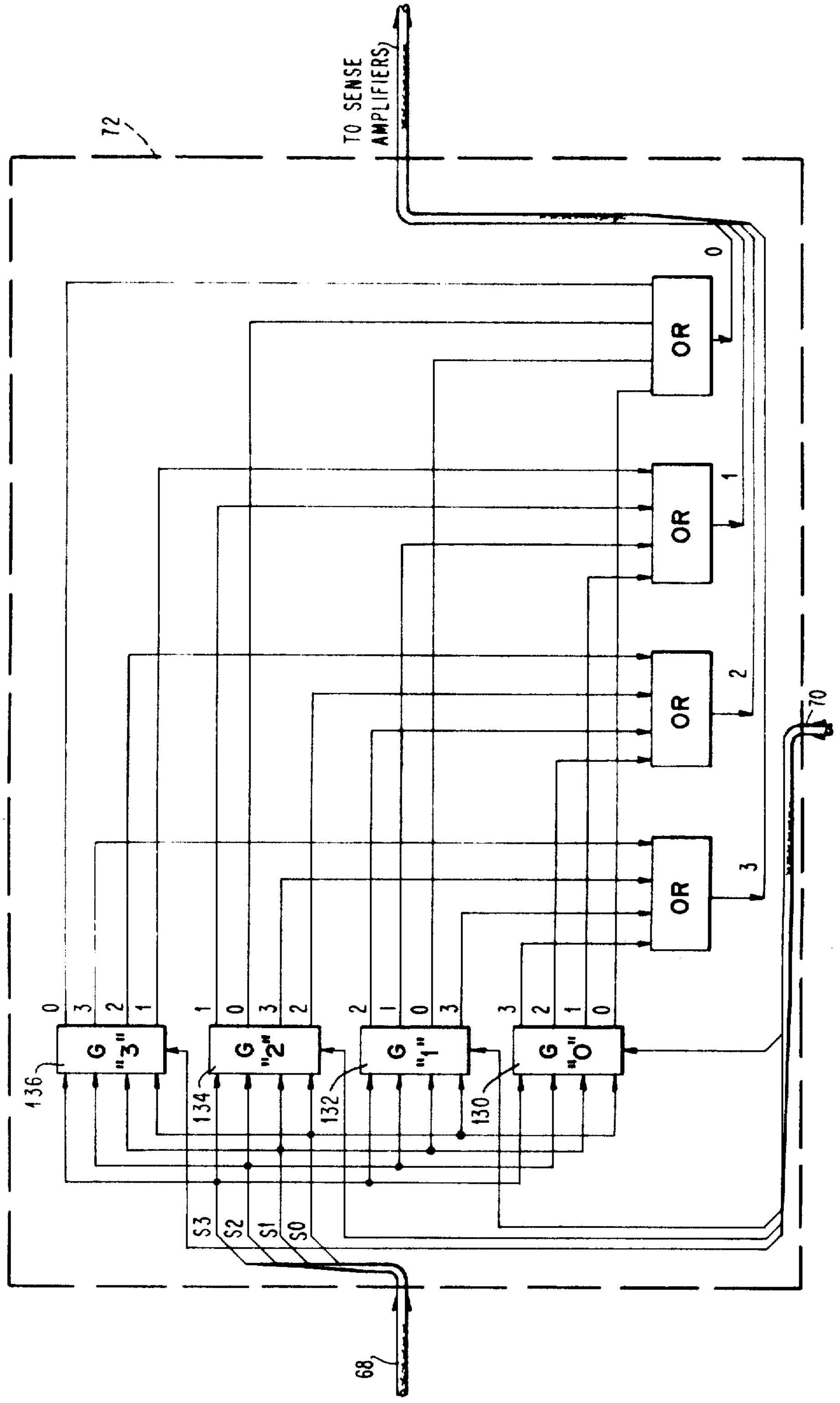

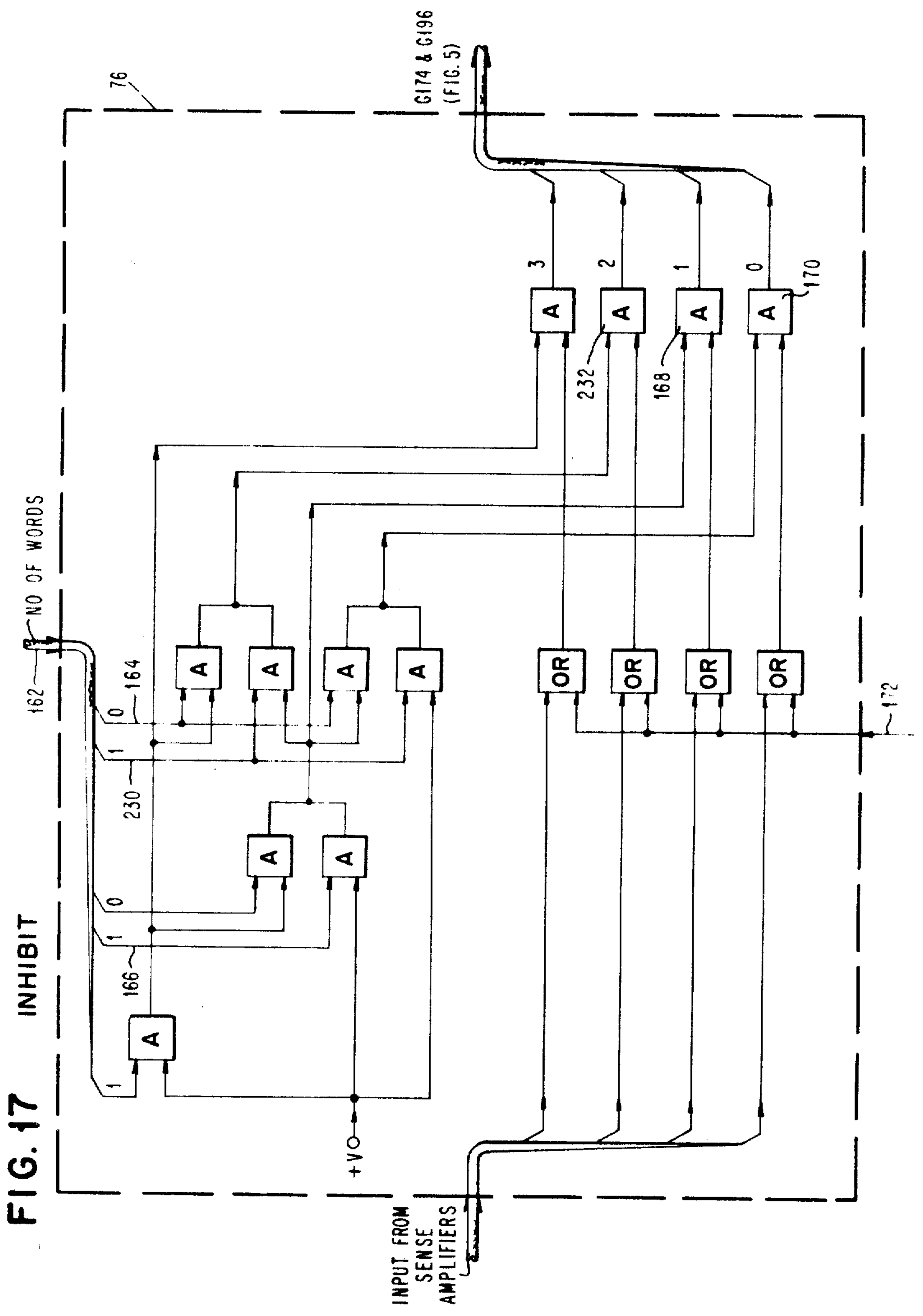
FIG. 17 INHIBIT

United States Patent Office 3,466,611

Patented Sept. 9, 1969

3,466,611

MULTI-WORD MULTI-DIRECTIONAL RANDOM ACCESS MEMORY SYSTEM

Arnold Weinberger, Newburgh, N.Y., assignor to International Business Machines Corporation, Armonk, N.Y., a corporation of New York Filed Dec. 28, 1966, Ser. No. 605,448

Int. Cl. G11b *13/00;* G06f *1/00, 7/00*

U.S. Cl. 340—172.5 20 Claims

TABLE OF CONTENTS

| | |
|---|---|
| Abstract of Invention | 1 |
| Prior Applications | 1 |
| Background of Invention | 1 |
| General Description of Inventive Concepts and Objects | 2 |
| Drawings | 4 |
| Detailed Description of Disclosed Embodiments | 5 |
| Summary | 17 |
| Claims | 18 |

ABSTRACT OF THE DISCLOSURE

A novel computer memory configuration wherein multi-word access within the memory is possible in a plurality of directions. Only one sense line is required per accessed memory storage element. Only as many sense lines are required in each memory module as the maximum number of bits to be accessed therein. A plurality of individually accessed memory modules are utilized wherein corresponding relative positions in each module contain different module contain different bits of the same memory word. As many memory modules are used as there are bits in a machine word. If 10 bit words are desired, 10 memory modules would be necessary. Each module comprises a three dimensional memory cube in which multi-bit access may occur in either the X, Y or Z direction.

PRIOR APPLICATIONS

Reference is hereby made to the following copending U.S. patent applications for purposes of providing a general environment wherein a multi-word access memory would have particular utility and also to illustrate a prior multi-word memory access system. U.S. application Ser. No. 468,437 filed June 30, 1965 of D. N. Senzig entitled "Vector Processor" and U.S. application Ser. No. 510,497 filed Nov. 30, 1965, now Patent No. 3,394,354 of D. N. Senzig entitled "Two Dimensional Random Access Memory."

BACKGROUND OF THE INVENTION

The electronics industry is continually making efforts to increase the speed and thus the power of modern electronic computers. The present state of the technology in the computer industry is such that the majority of circuit devices as well as memory storage elements are reaching the speed at which the velocity of electrons within a conductor becomes the primary limiting factor in determining the ultimate speed of computation or information transfer within a given machine. It is thus apparent that the effective speed and power of machines must be increased by other means. The concept of multi-processors is currently being widely explored in the computer industry as a means of increasing the effective speed of a machine wherein a multiplicity of operations is performed simultaneously. It is, of course, apparent that the use of such machines requires the obtaining of the necessary operands simultaneously in order that they may be supplied to the respective arithmetic units in a substantially concurrent fashion. It is, of course, possible to utilize a plurality of separately addressable memories to fetch requested operands. However, with such a system the overall machine, in essence, comprises a plurality of separate computers each having separate memory units and arithmetic units merely connected into one large central control unit. A memory organization of this general type is disclosed in the above referenced copending U.S. application Ser. No. 468,437, wherein means are provided for separately addressing a plurality of memory units to obtain a plurality of operands. In such a system the degree of simultaneity is dependent upon the manner in which the addresses are generated insofar as the amount of logical circuitry which is committed to the generation of simultaneous addresses is inversely proportional to time required to generate the addresses.

In U.S. Patent No. 3,394,354 also previously referenced an alternative form of memory organization is disclosed wherein a plurality of words may be simultaneously accessed from a single 3–D memory. However, with this system a plurality of sense lines is necessary for each bit storage location. While using such a memory is clearly feasible, as the trend toward miniaturization increases, providing plural sense lines for each bit storage location in addition to the necessary drive and inhibit lines becomes increasingly difficult.

GENERAL DESCRIPTION OF INVENTIVE CONCEPTS AND OBJECTS

It has now been found that a highly versatile memory system may be achieved wherein multiple word access therein is possible by utilizing a module concept within the memory. Multi-directional as well as multi-word access is possible in the proposed system while at the same time keeping the necessary windings within the individual memory modules at a minimum. According to a primary concept of the invention only as many sense windings are required in any one module as the maximum number of bits which are to be accessed from said module. Thus, the complicated wiring and switching circuitry that is necessary in, for example, the above referenced U.S. Patent No. 3,394,354 of D. N. Senzig is obviated by the simplified sense winding scheme of the present invention.

According to the basic concept of the memory system set forth herein if K words are to be simultaneously accessed from memory and each word is made up of N bits the memory organization would be as follows: N memory modules would be utilized wherein corresponding position through out each module would contain one bit of a word stored in the overall memory system. Assuming the K words are to be accessed simultaneously, K bits will be accessed from each memory module and these bits suitably stored in a data storage register to form the K words. In the disclosed detailed embodiment of the present system, these groups of K bits may be accessed in any one of three allowed directions from a memory cube which makes up each module. However, according to the broad teachings of the invention it is not necessary that these modules be made up specifically of a three dimensional cube. Memory "word" as used herein refers to any group of two or more bits wherein the relative position of the bits is critical to convey desired information. Therefore a byte of data would be understood to be included in the general term "word" as used herein.

A further important concept of the present invention embodies the provision of only as many sense lines threading through a given memory module as the maximum number of bits to be accessed during a single memory cycle. Thus, if as in the disclosed detail embodiment a maximum of a four bit access is desired a total of four sense lines will be threaded in a manner to be described subsequently through out all layers or core planes of the memory.

As stated previously, the present inventive concept is not limited to a three dimensional cube that may take for example a simpler form such as a one dimensional array or a two dimensional array which are shown respectively in FIGURES 8*a* and 8*b* and which will be described more fully subsequently. As is evident both of these simpler memory modules would have more limited access directions within the module. However, the basic scheme of having only as many sense lines as the maximum number of bits to be accessed concurrently is carried out in both cases. Nor is a three dimensional memory cube, the most complex memory module anticipated by the present invention since each module could in essence comprise K separate memory cubes wherein a single bit is to be simultaneously accessed from each cube. In this event a single sense winding would suffice for the entire cube and complex addressing schemes could be utilized wherein either the same relative bit position could be accessed concurrently from each cube or by appropriate indexing circuitry, various combinations or bit patterns could be obtained from all or selected members of a memory module comprising a plurality of such cubes. However, as will be appreciated even in this complex system only one sense line is necessary for each bit to be read out and wherein only one bit from a group of bits through which a given sense line is threaded can ever be fully selected by the addressing circuitry in order for the system to operate properly.

It is accordingly a primary object of the present invention to provide a memory system capable of simultaneously accessing a plurality of words stored therein.

It is another object of the present invention to provide such a system comprising a plurality of individual memory modules wherein as many modules are utilized as bits in a machine word.

It is yet another object of the invention to provide such a system wherein each group of bits accessed from a single memory module comprise portions of different machine words.

It is a further object to provide such a system wherein tehre are only as many sense lines in a given memory module as the maximum number of bits to be accessed from the said module and wherein no more than one bit threaded by a given sense line is accessed in any given machine cycle.

The objects of the present invention are accomplished in general by a computer memory system capable of storing multiple bits of binary data wherein means are provided for concurrently accessing a plurality of words therefrom. Said system includes a plurality of memory modules having access means for selectively accessing one or more bits concurrently from each module. The access means includes sense lines within each memory module and wherein there are only as many sense lines as the maximum number of bits to be simultaneously accessed. Applying this concept to a one dimensional memory each module could, for example, comprise a single string of storage devices each having a single selectable drive line thereto. In such a system beginning with any desired point in the memory one or more bits could be simultaneously accessed and read out on separate sense lines provided for each bit with the maximum number of bits being accessible at any one time determined by the number of sense lines provided.

Assuming that each memory module comprises a two dimensional random access memory core plane starting with a beginning address, a plurality of bits may be selected in either the X or Y coordinate direction and read out on the separate sense line provided therefor. Again it being remembered that the maximum number of bits concurrently accessible would be limited by the number of sense lines present.

Referring to the present preferred embodiment which is described in detail herein, each memory module would ideally consist of a three dimensional memory cube having the conventional X, Y, and Z coordinate directions wherein beginning with a desired address anywhere within the memory cube a desired number of bits may be read out in the X, Y, or Z direction. It should be remembered as in both of the other cases above described again the maximum number of bits concurrently accessible is numbered by the total number of sense lines provided which pass through the individual memory cores in a pattern to be described more fully subsequently.

In the disclosed embodiment of the invention it is assumed and believed to be the most practical embodiment wherein each memory module will have stored therein in the same relative position respective bits of the same memory word. Thus, the maximum number of words concurrently accessible in the system will be determined by the maximum number of bits concurrently accessible in any of the individual modules.

While this is believed to be an optimal embodiment for a system having the greatest flexibility it will of course be understood that data can be input into the memory system in any desired configuration and extracted therefrom in any desired configuration providing of course that the system operator be aware of the format of data input to the system. Thus, for example, a group of bits extractible from any one memory module for certain operations might comprise a short machine word or possibly a machine word bit or group of bits.

In any event the great flexibility of the present system especially in the three dimensional embodiment thereof will be readily apparent to a person skilled in the art. Thus, for certain matrix multiplication problems for example members of the matrix may be accessed along any desired coordinate in a much simpler fashion than is possible in currently existing systems. The system further has more general applicability in the multi-processing area where extremely flexible multiple word memory access is of importance if the extremely high speed computing abilities of such systems are ever to be realized.

DRAWINGS

FIGS. 1A–B comprise a composite overall functional block diagram of a multi-word multi-directional memory system constructed in accordance with a preferred embodiment of the present invention.

FIG. 2 is an organizational drawing illustrating the placement of FIGS. 2A–C.

FIGS. 2A–C comprise a composite logic schematic diagram of a block entitled Main Controls of FIG. 1.

FIG. 3 is an organizational drawing illustrating the placement of FIGS. 3A–F.

FIGS. 3A–F comprise a composite of a Memory Cube illustrating the drive windings for each plane and their respective inter-connections.

FIG. 4 is an organizational drawing illustrating the placement of FIGS. 4A–Q.

FIGS. 4A–Q are a composite logic schematic drawing of that block of FIG. 1 entitled Memory Gates.

FIG. 5 is an organizational drawing illustrating the placement of FIGS. 5A–B.

FIGS. 5A–B are a composite of a combination logical and functional block diagrams of that block of FIG. 1 entitled Local Controls.

FIG. 6 is an organizational drawing illustrating the placement of FIGS. 6A–B.

FIGS. 6A–B comprise a composite logical schematic diagram of a portion of that block in FIG. 1 designated Memory Data Buffer.

Figure 8A:
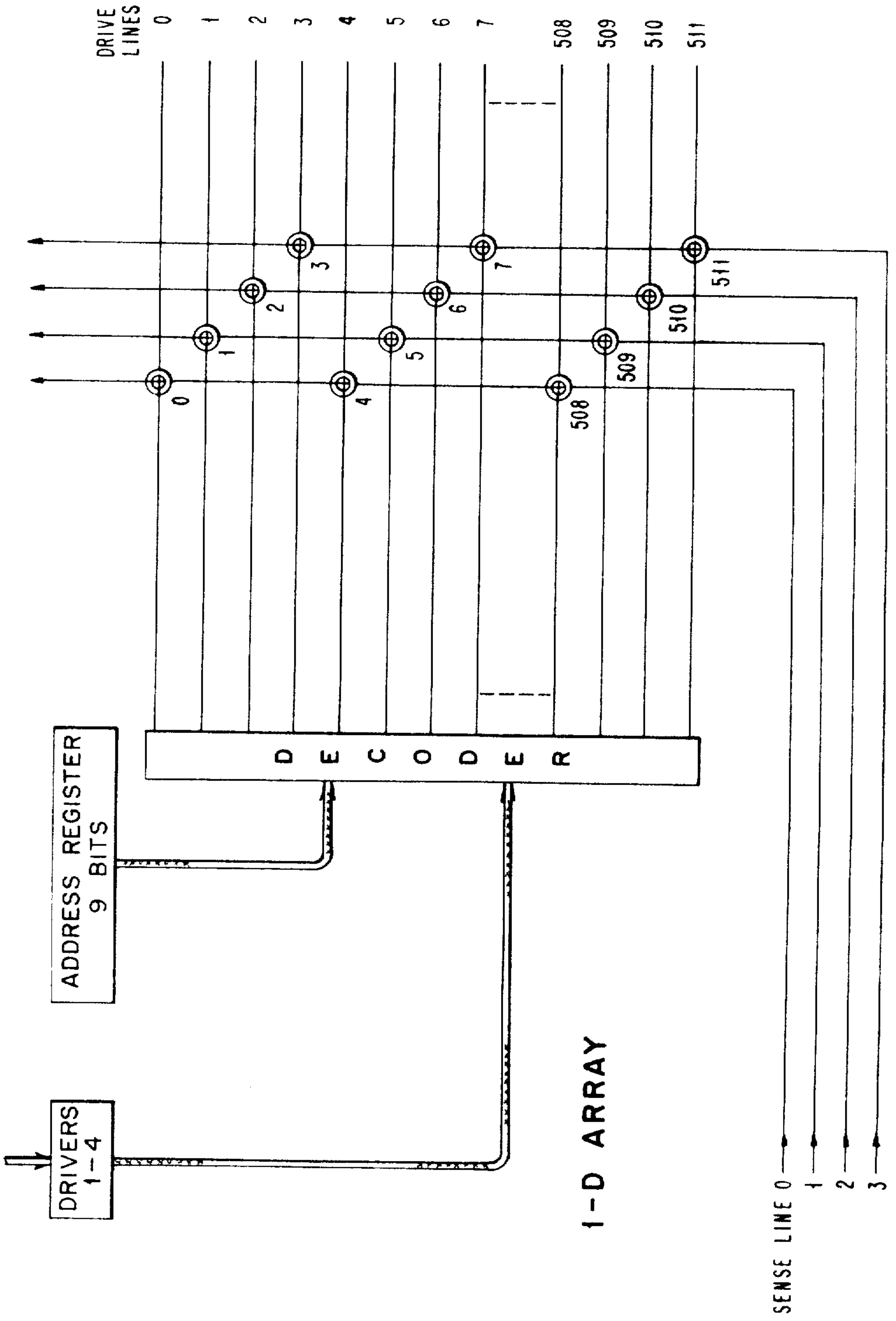
FIG. 8A is a logical schematic diagram of a one dimensional memory illustrating both the drive and sense windings which memory could be used as a Memory Cube in a highly simplified version of the present invention.
Figure 8B:
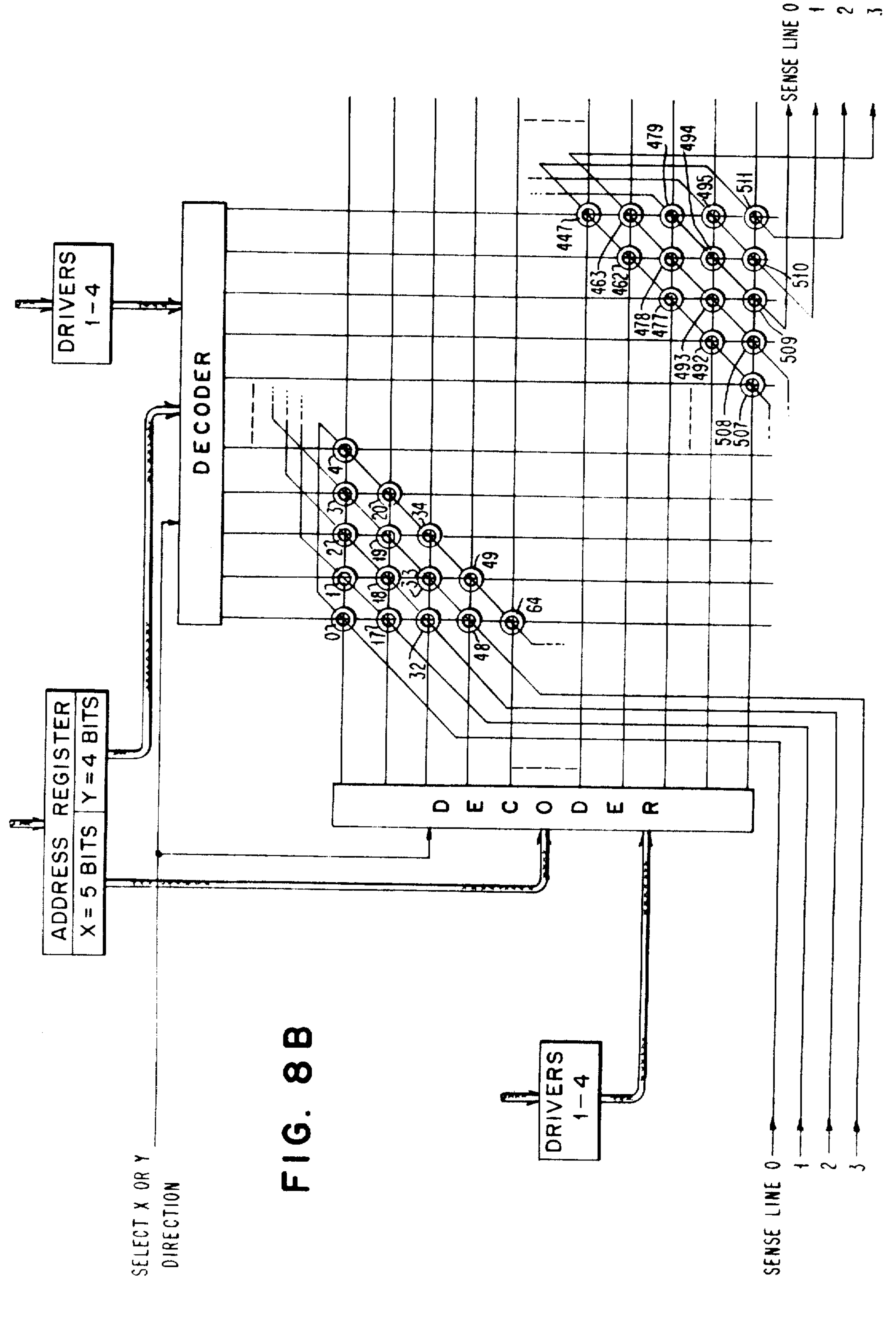

FIG. 8B comprises a logical schematic diagram of a two dimensional memory illustrating both the drive and sense windings therefor which could be used as a Memory Cube in a somewhat more sophisticated version of the present invention.

FIGS. 8C–F comprise the winding details of the sense windings for the three dimensional embodiment of a Memory Cube as utilized in the embodiment of the present invention disclosed in detail.

Figures 8C, 8D, 8E, 8F:
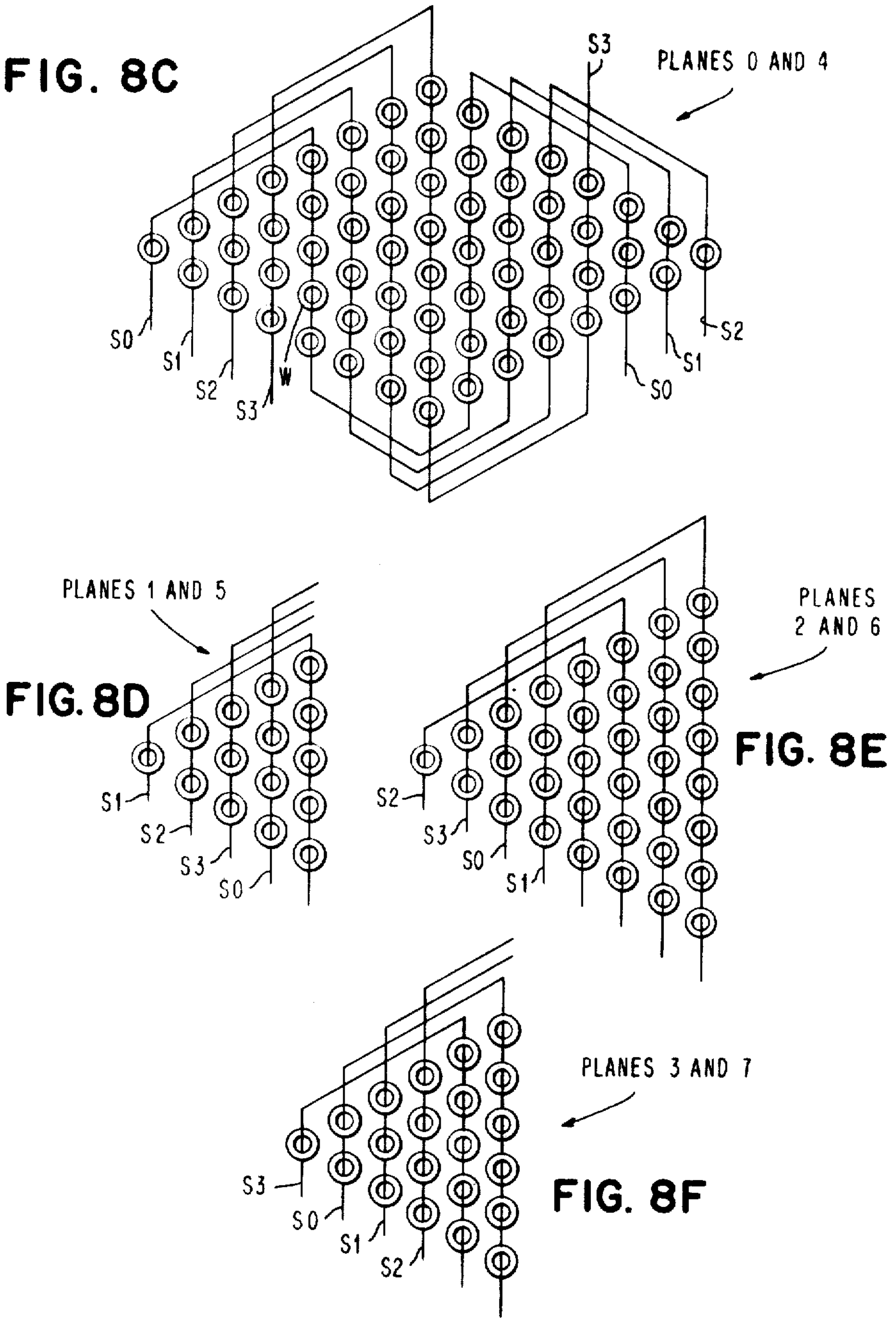
Figure 9:
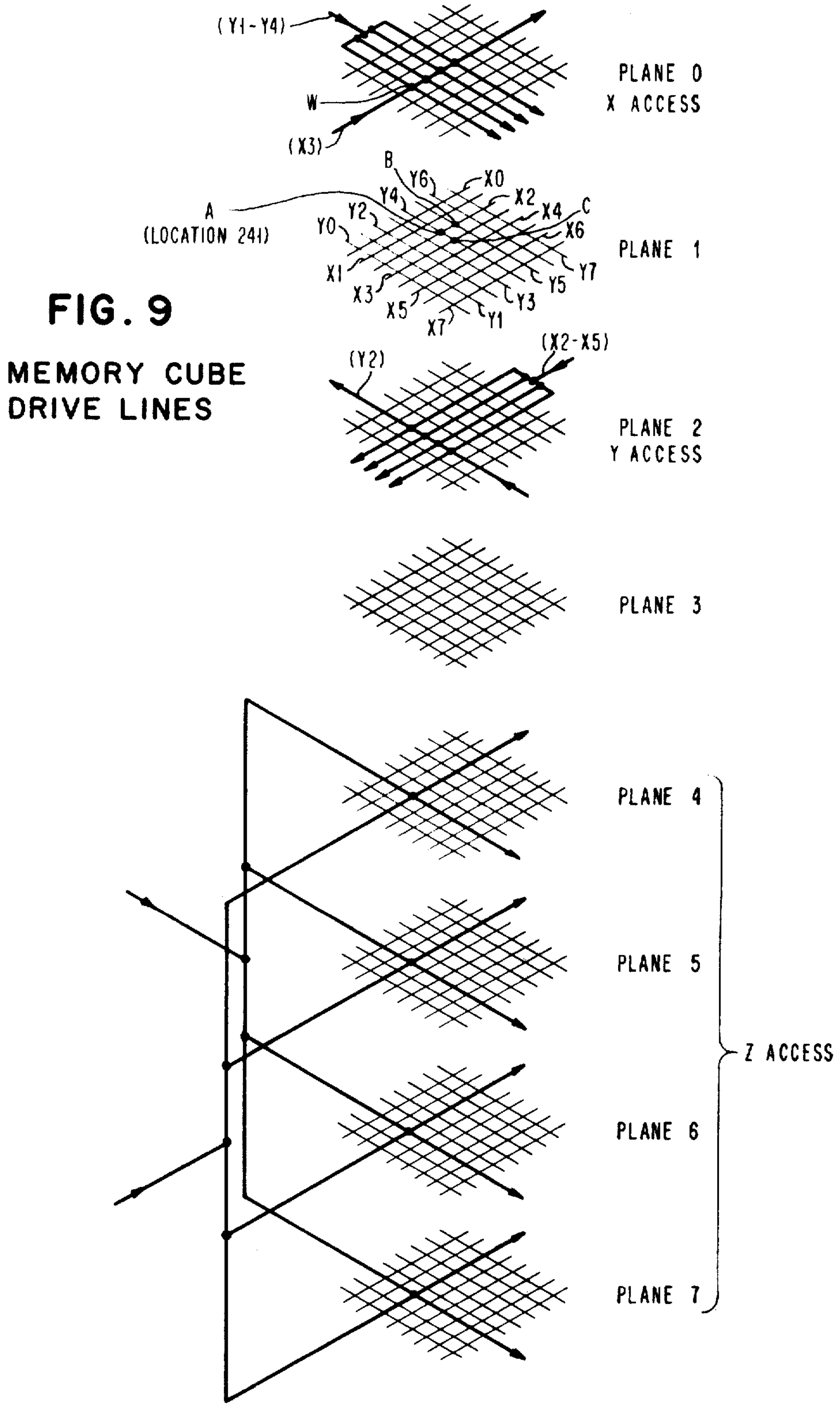

FIG. 9 is an exploded view of the drive windings of an 8 by 8 by 8 three dimensional Memory Cube, the sense windings for which are shown in FIGS. 8C–F.

Figures 2, 2A:
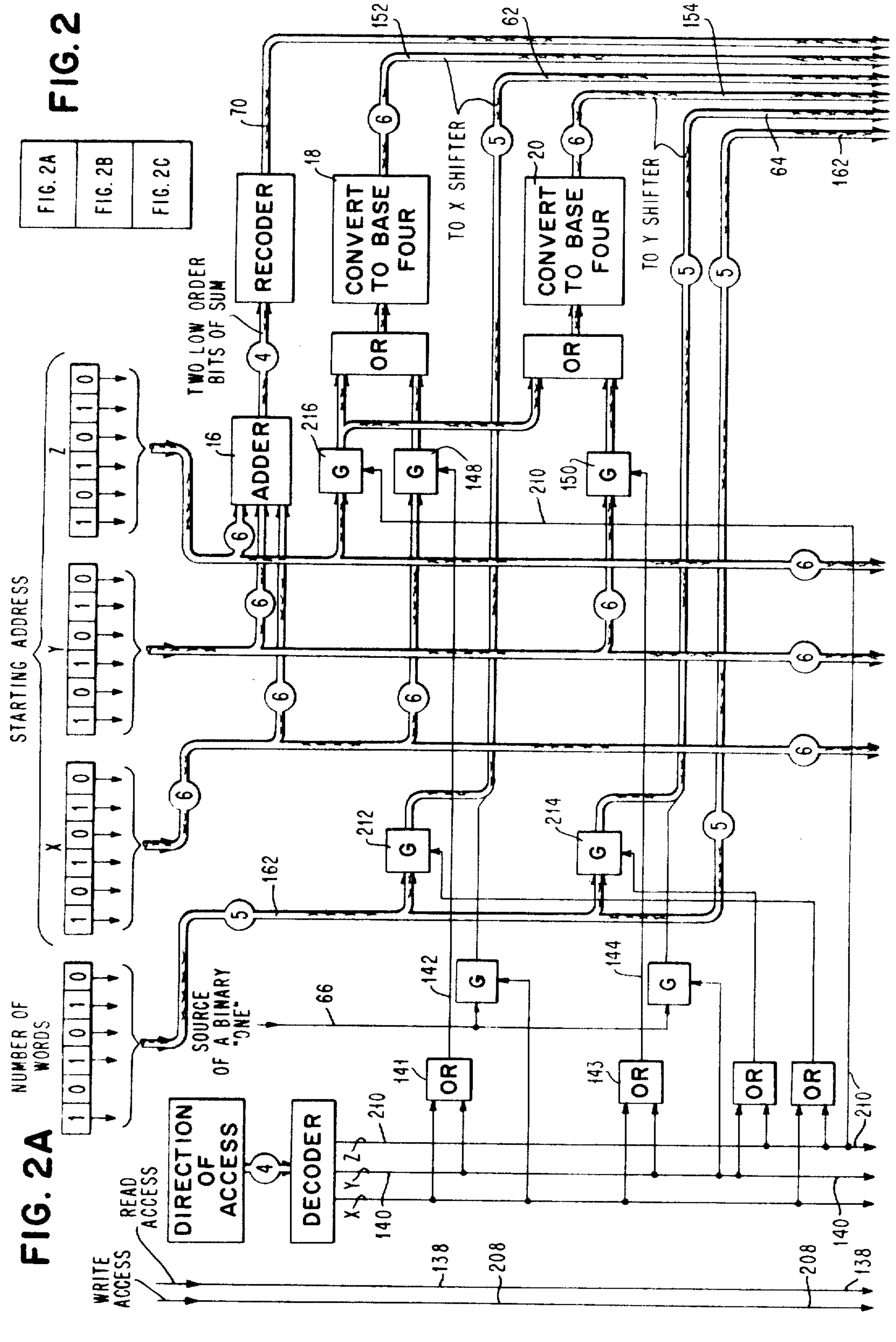
Figure 2C:
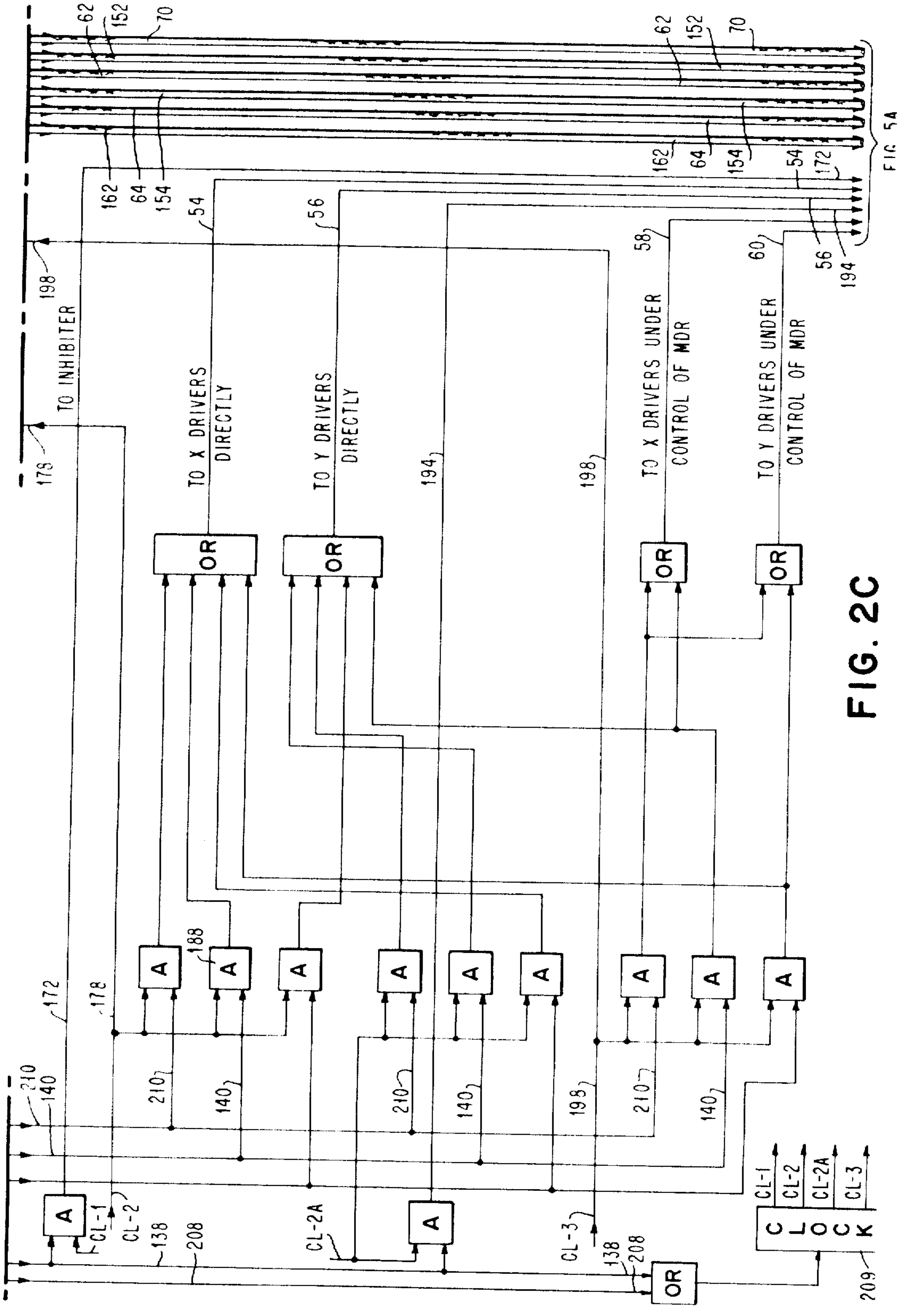
Figure 2B:
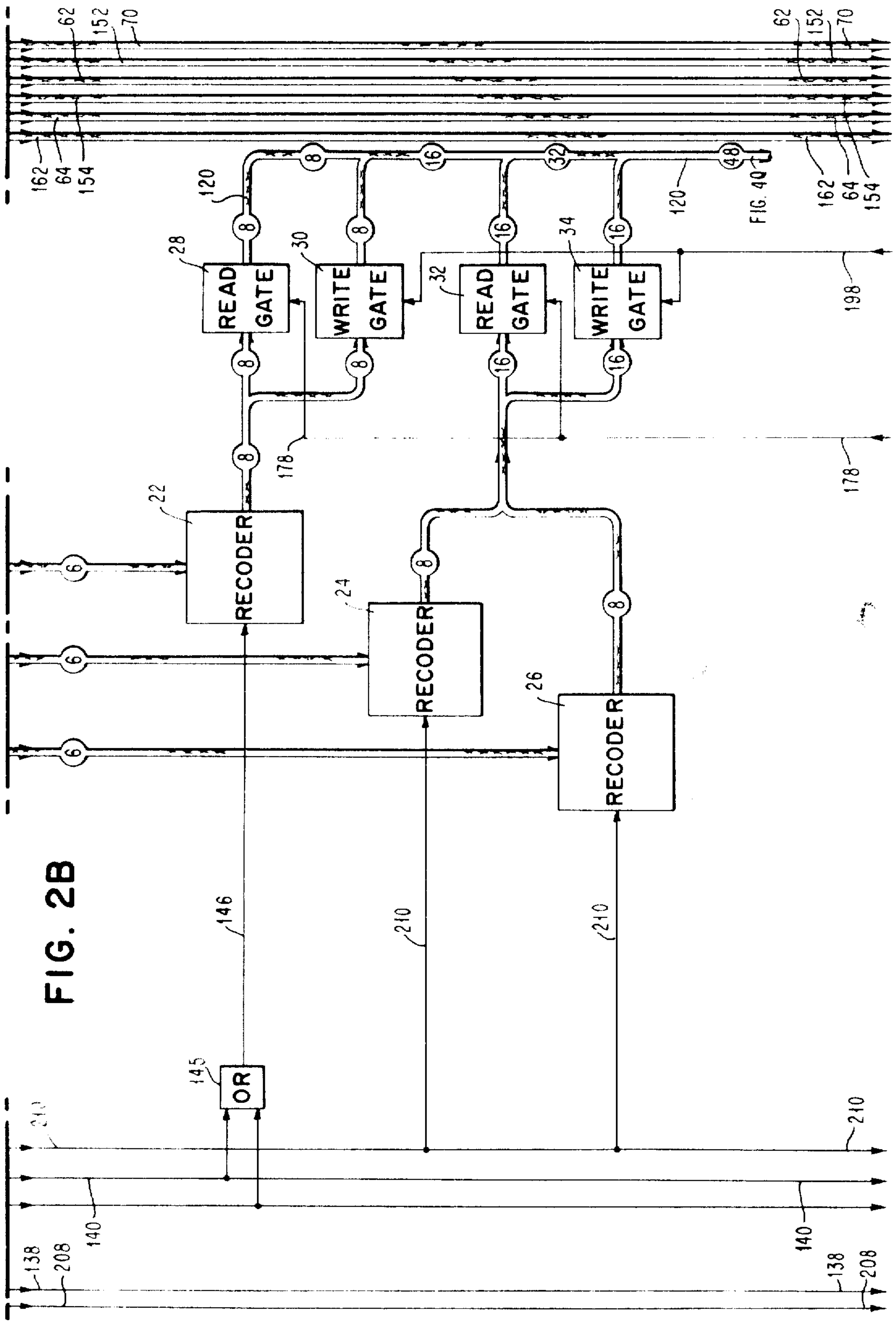
Figure 10:
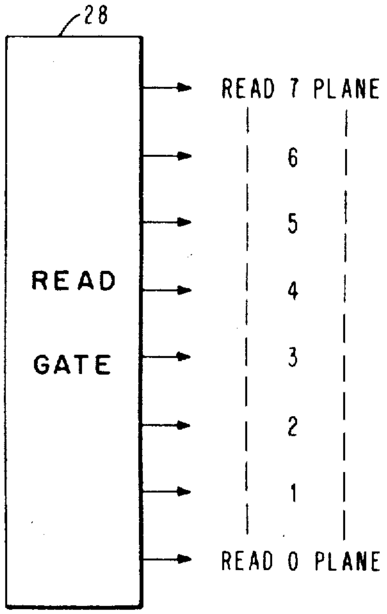

FIG. 10 details and labels the outputs of the Read Gate 28 shown on FIG. 2B.

Figure 11:
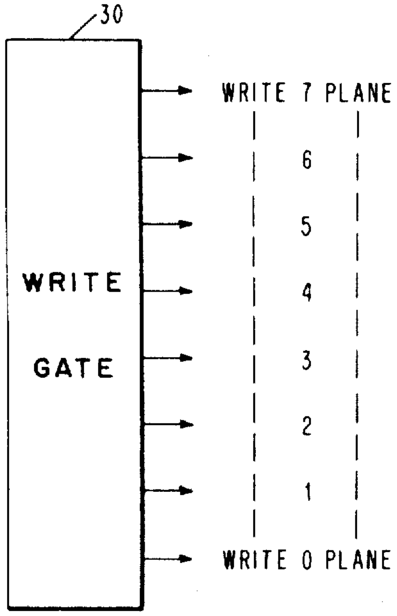

FIG. 11 details and labels the outputs of the Write Gate 30 on FIG. 2B.

Figure 12:
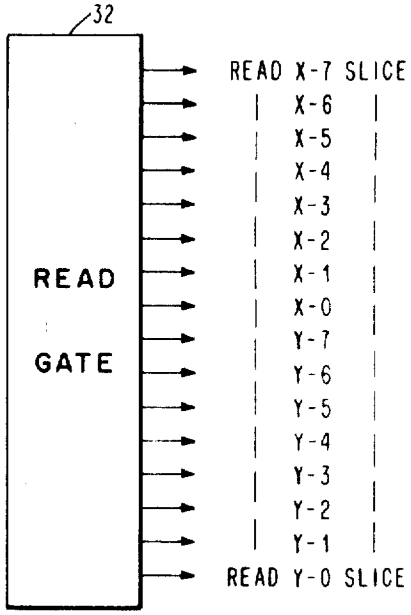

FIG. 12 details and labels the outputs of the Read Gate 32 on FIG. 2B.

Figure 13:
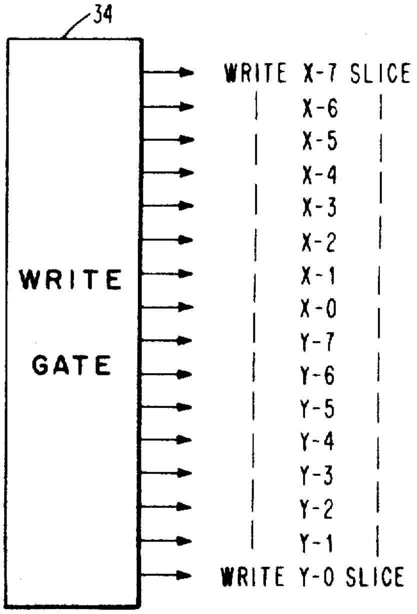

FIG. 13 details and labels outputs of the Write Gate 34 on FIG. 2B.

Figure 14:
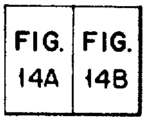
Figure 14A:
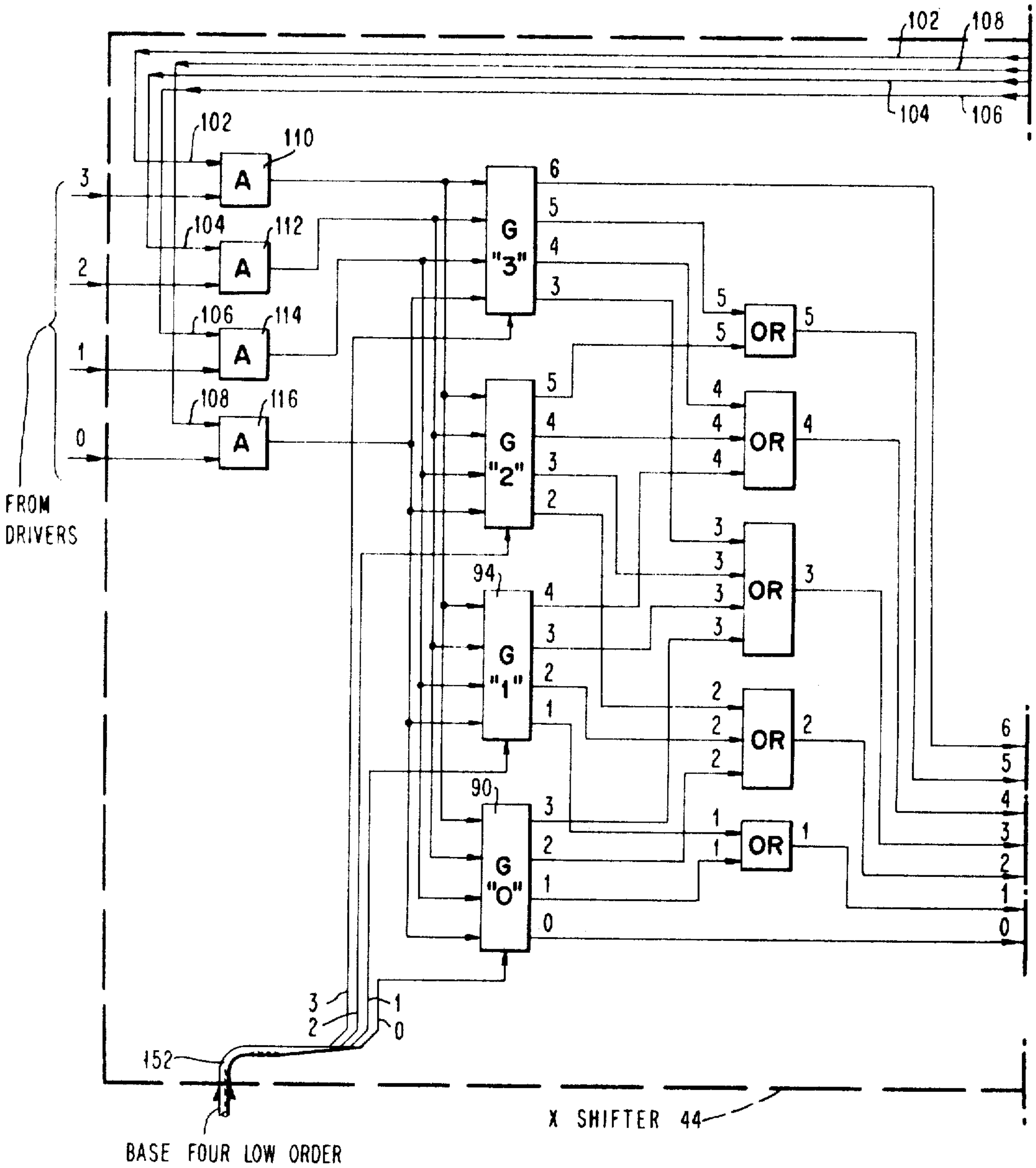
Figure 14B:
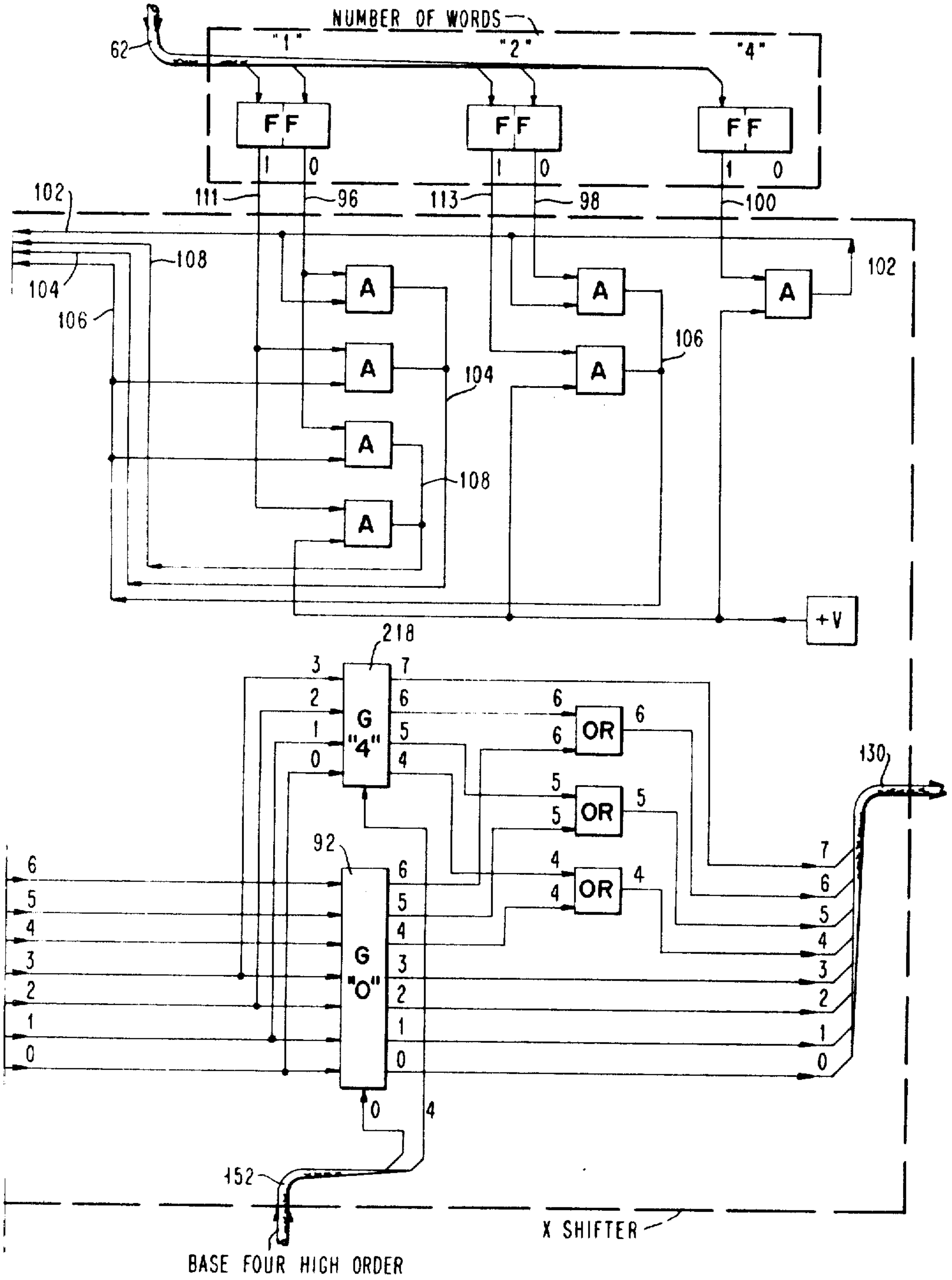

FIG. 14 is an organizational drawing illustrating the placement of FIGS. 14A–B.

Figure 5A:
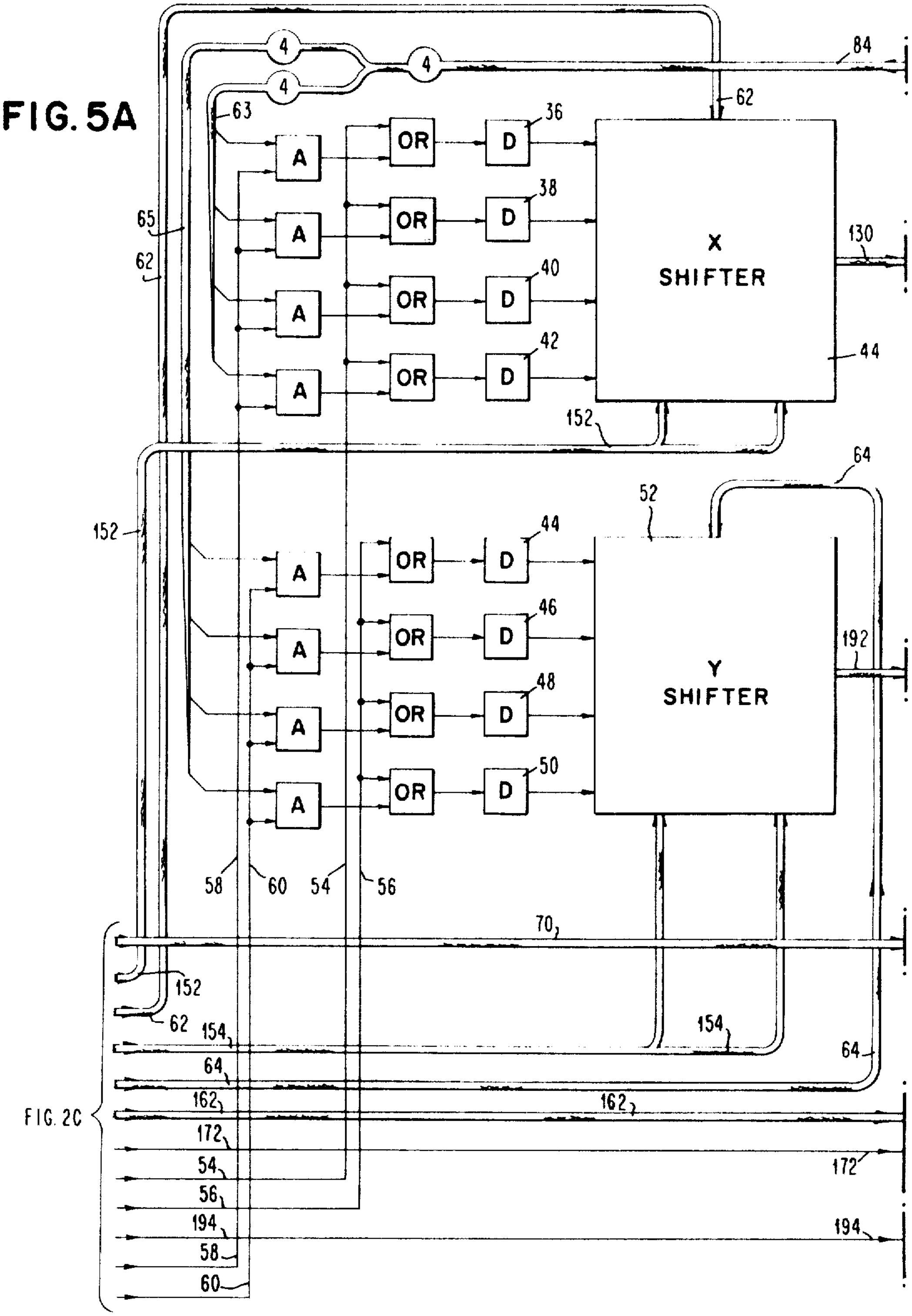

FIGS. 14A–B are a composite of a logical schematic diagram of the block labeled X Shifter on FIG. 5A.

Figure 15:
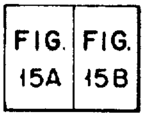
Figure 15A:
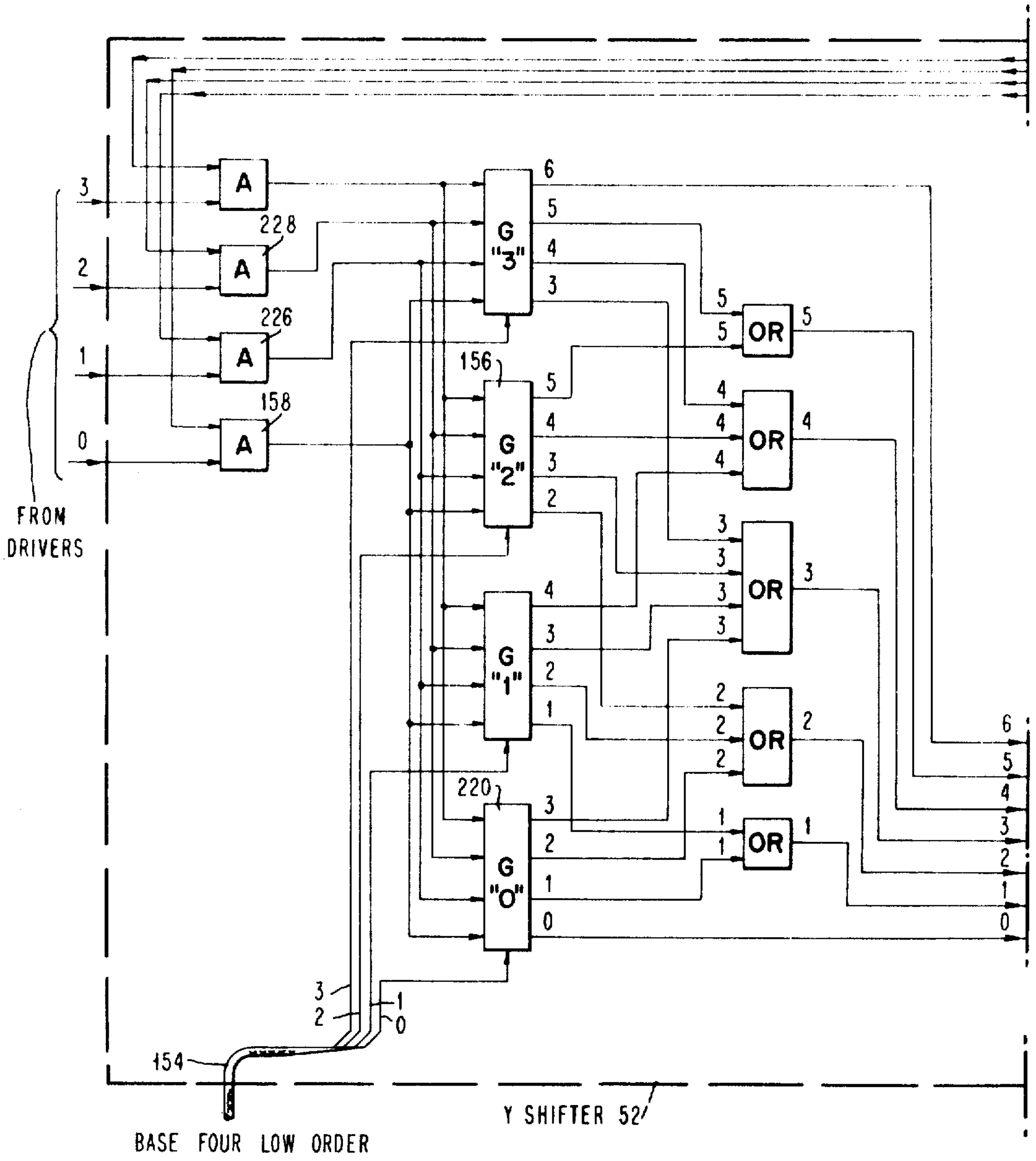
Figure 15B:
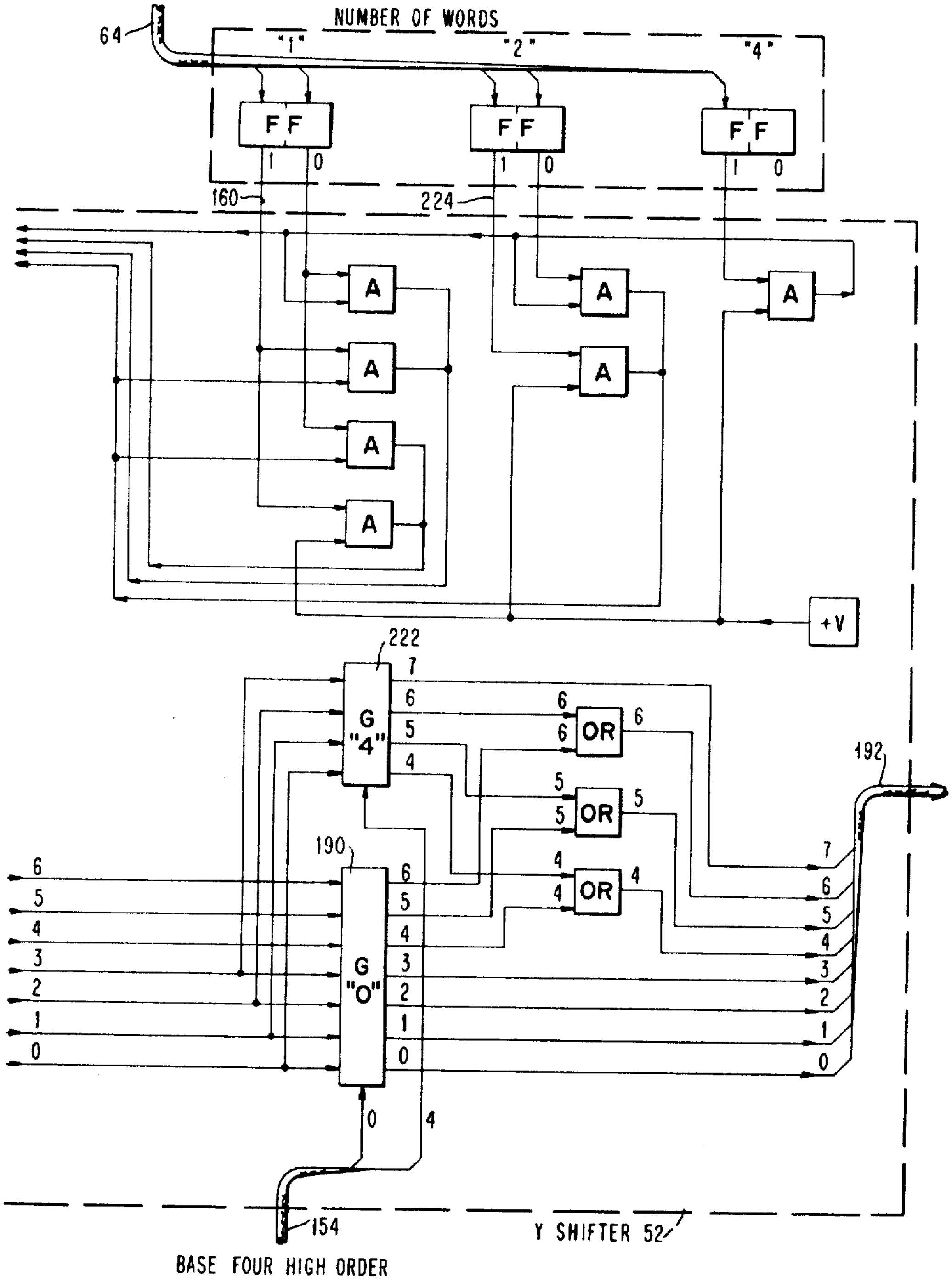

FIG. 15 is an organizational drawing illustrating the placement of FIGS. 15A–B.

FIGS. 15A–B are a composite of a logical schematic diagram of the block labeled Y Shifter on FIG. 5A.

Figures 5, 5B:
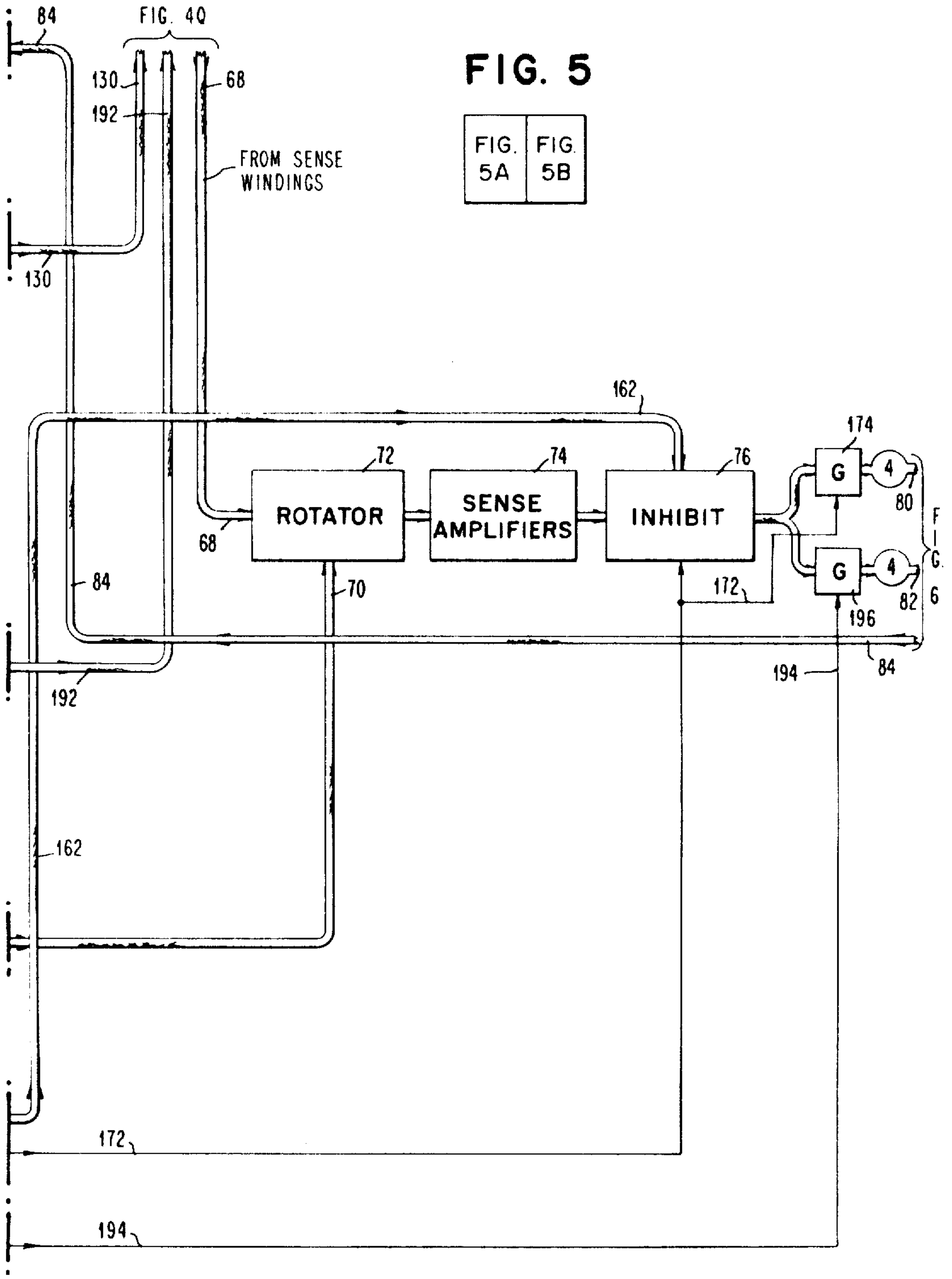

FIG. 16 is a logical schematic diagram of the block labeled Rotator on FIG. 5B.

FIG. 17 is a logical schematic diagram of the block labeled Inhibit on FIG. 5B.

Figures 18A, 18B, 18C:
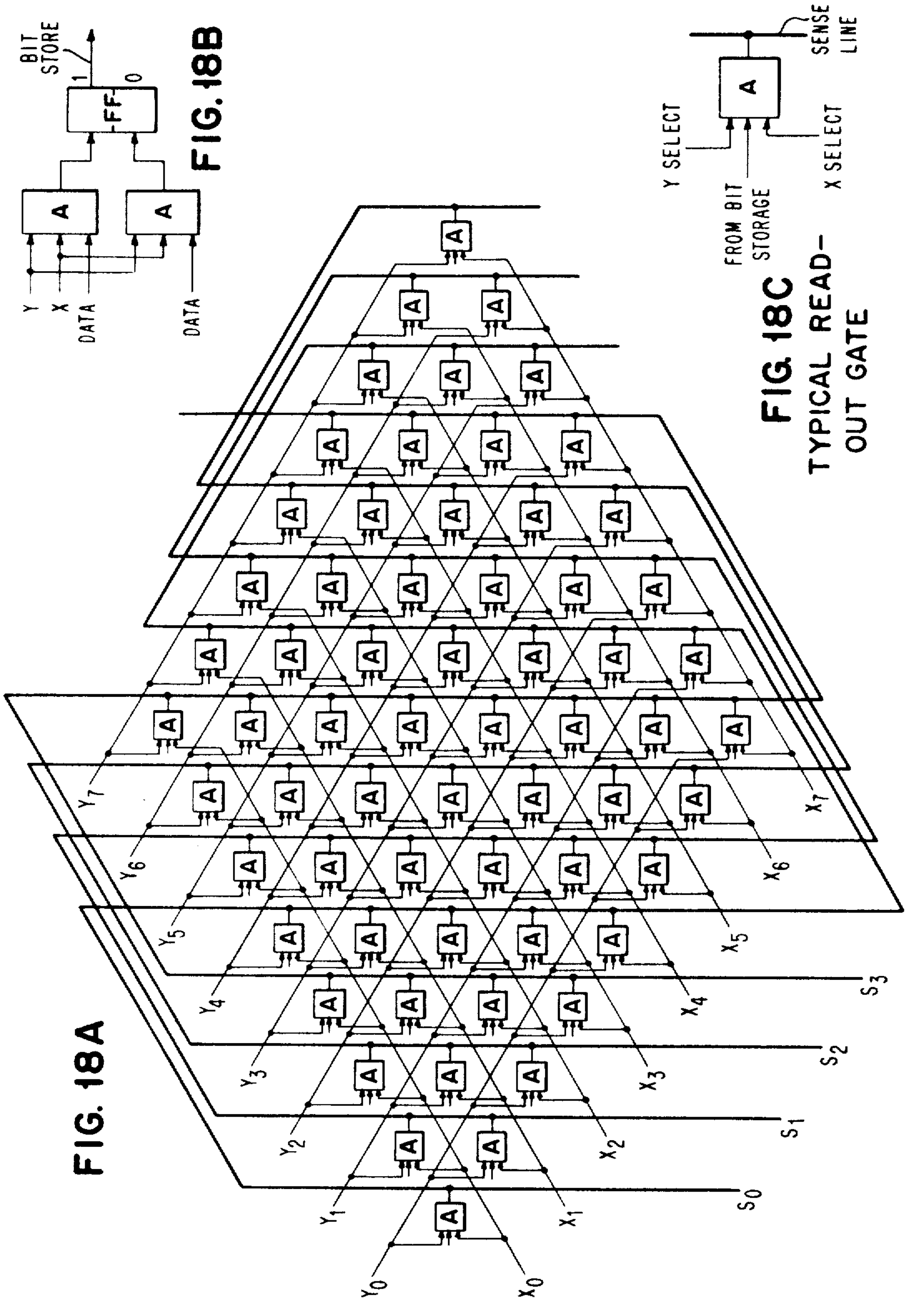

FIG. 18A is a detailed logical schematic and wiring diagram for a Read Out Gate suitable for use with one plane of a three dimensional solid state memory suitable for use with an alternative embodiment of the present invention.

FIG. 18B details a single storage element such as would be used in a solid state memory.

FIG. 18C is a detail of the inputs and outputs for a single gate element as illustrated in FIG. 18A.

Figure 19:
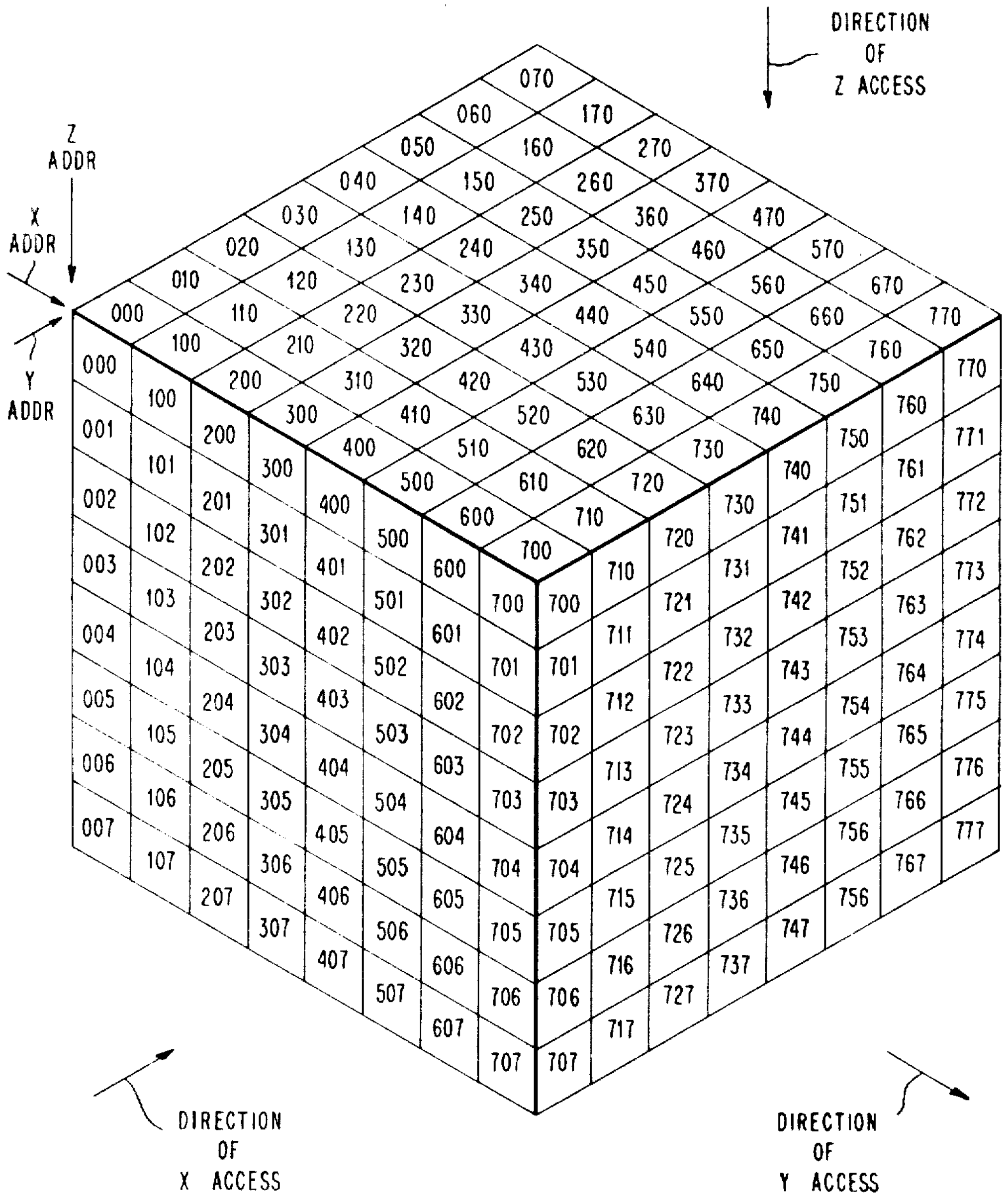

FIG. 19 is a diagrammatic illustration of an 8 by 8 by 8 Memory Cube illustrating the various bit positions in octal designation which designation is utilized in the subsequential detailed description of the preferred embodiment of the present invention utilizing such a three dimensional Memory Cube.

DETAILED DESCRIPTION OF DISCLOSED EMBODIMENTS

The invention will now be particularly disclosed and described with reference to the accompanying drawing wherein the same reference numerals have been utilized to refer to like portions of the system wherever possible for purposes of clarity. It will also be readily appreciated that the details of the disclosed embodiment are for the purposes of illustrating the principles of the present invention in the simplest and clearest form possible. It will be readily appreciated that many changes in form and detail of system could be readily made by a person skilled in the art without departing from the overall system organization and operation as set forth in this specification.

Figures 1, 1A:
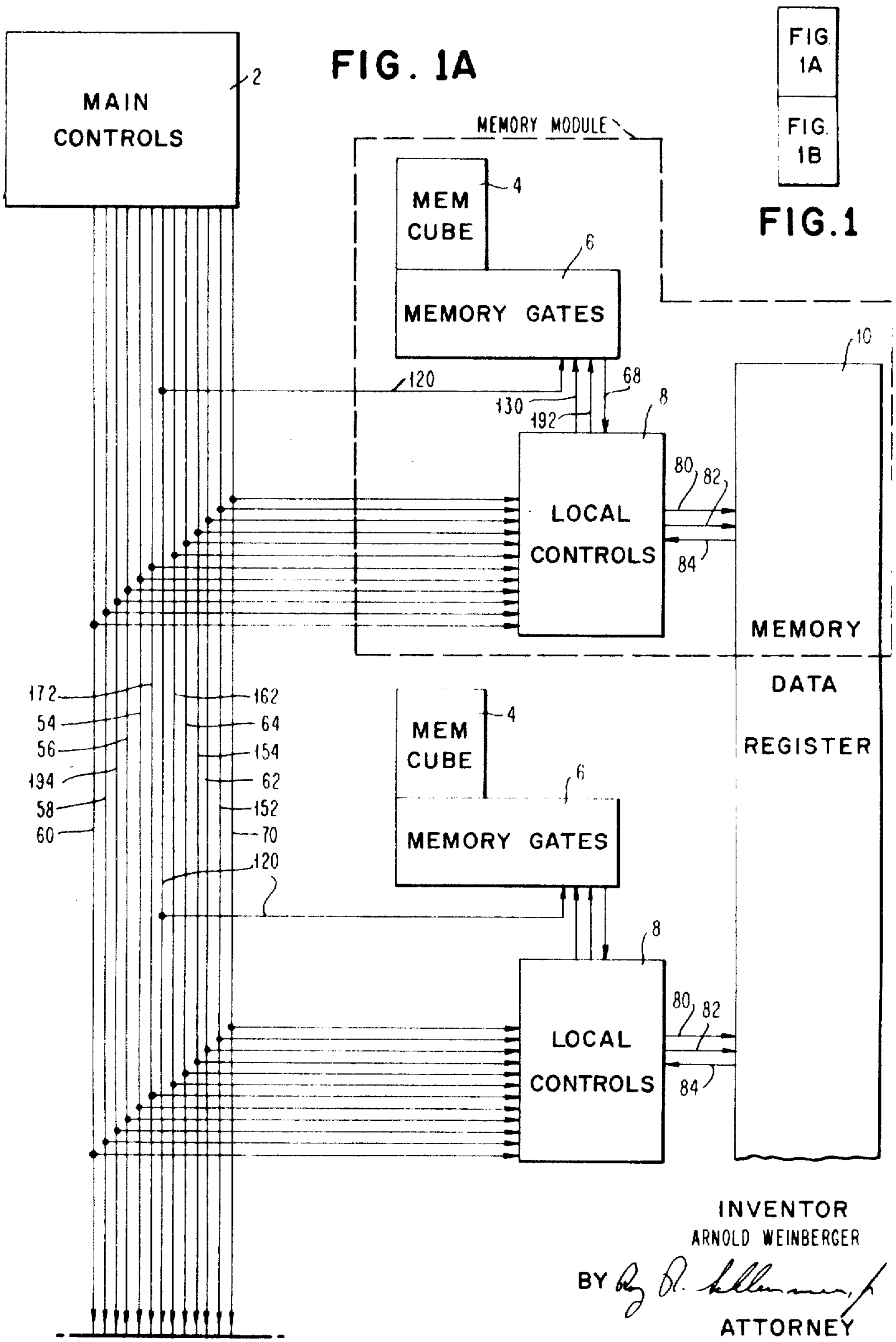
Figure 1B:
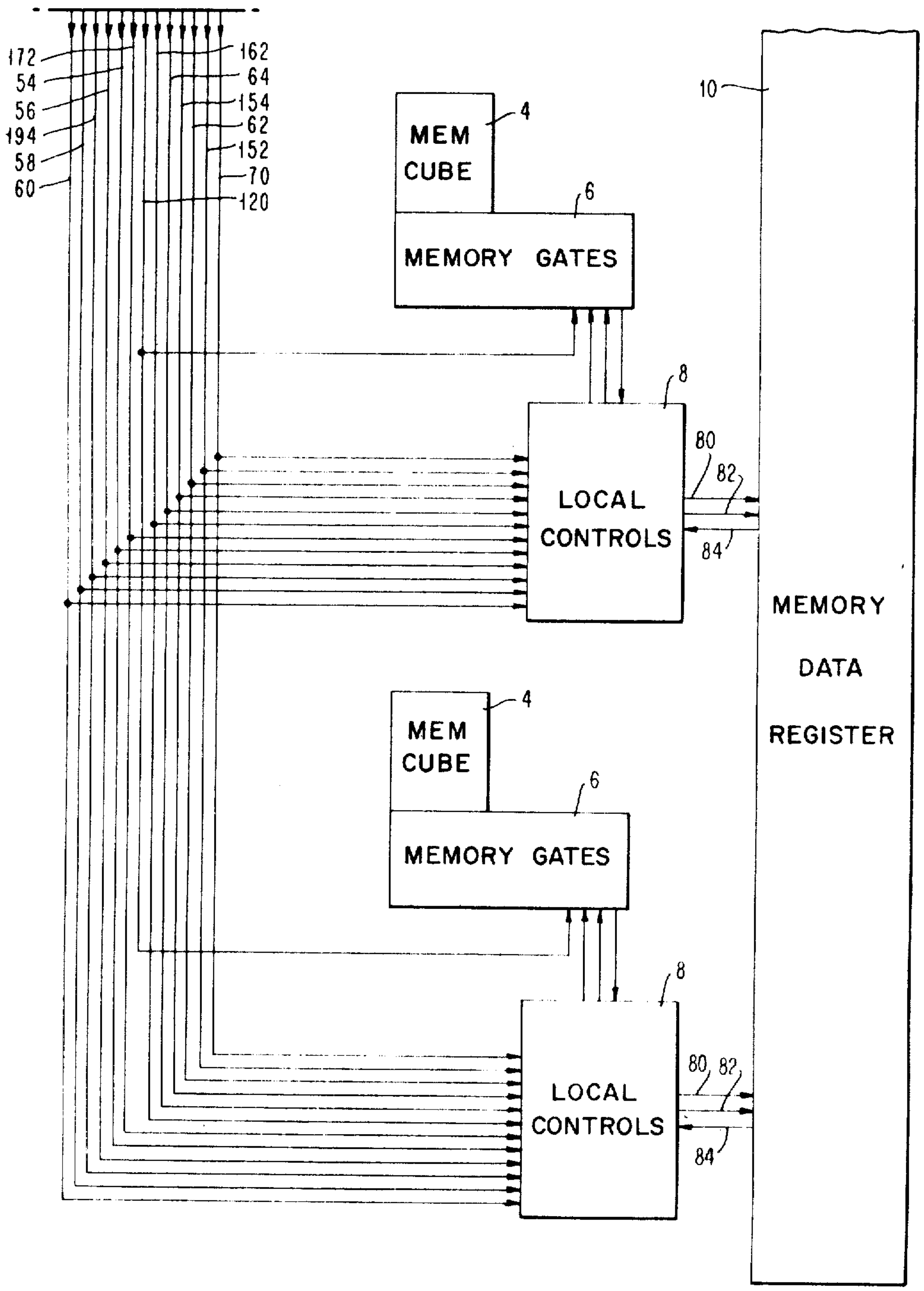

Referring now to the drawings the invention will be set forth in greater detail. As was stated previously, according to the preferred embodiment of the invention, the overall system comprises a plurality of memory modules the respective contents of which may be accessed and the accessed bits make up a plurality of machine words. Referring to FIG. 1 the overall system includes the Main Controls to which as will be apparent from the subsequent description of FIG. 2 controls the overall system address registers which specify the beginning bit within each memory module of a given access, the direction of the access and the number of words to be accessed or the number of bits per module. It will be noted that the output cabling from the Main Controls proceed in parallel to the various memory modules each of which comprises a Memory Cube 4, Memory Gate 6, Local Controls 8, and the assigned portion of the Memory Data Register 10. This memory module is indicated on FIG. 1 as being enclosed within the dotted line. Each module is essentially identical and works in parallel in response to the instructions specified in the Main Controls. It should be noted, however, that the Memory Cube 4 is an appropriate designation for the 3–D cube as illustrated and explained in the present detailed embodiment winding details of which are explained relative to FIGS. 8C–F, 9 and 19. However, in place of the Memory Cube some other type of memory configuration could similarly be utilized such as a one dimensional or two dimensional array as shown in FIGS. 8A and 8B respectively.

Before proceeding further with the specific description of the detailed embodiment the following is a general explanation of the various access modes and the manner in which it is anticipated that such a memory would be addressed and also the way in which the various drive lines would be energized and sense lines interrogated.

Assume first that each memory module that contains 512 bit storage locations and that a maximum of N (e.g. 4) bits of said memory are to be accessed concurrently. In this event the memory may be broken up into N (4) groups of K (128) bits each. The total number of bits in the module equals K N or 512 bits. According to the principles of the present invention it is necessary that not more than one bit be read concurrently out of each group which leads to a primary concept of the present system wherein the number of logically different sense lines needed to service the 512 bits is N (4) Sense Lines. Additionally, each bit needs to be serviced by only a single sense line and each sense in the present example services one and only one group (128) of bits. In order to reduce the selection complexity or addressing of the various bits within a memory the number of permissible combination of N (4) bits must necessarily be restricted to those combinations that are particularly useful while permitting some selection simplicity. Thus for a practical embodiment of the broad concepts of the invention, it will be apparent that the number of selection signals that control a bit of memory are not a function of the number of permissible combinations of bits that may be concurrently accessed but rather is a function of the degree of complexity that one is willing to tolerate and build into the selection logic. Three examples of such possible selection combinations which result in systems which can be reasonably constructed are a one, two and three dimensional memory arrangement which will be briefly described subsequently.

Example One-Dimensional Array

Referring to FIG. 8A a one dimensional array is illustrated, said array consisting of K N (512) bits which are numbered 0, 1, 2 . . . K $N-1$ (0, 1 . . . 511) which bits are arranged in a 1-dimensional array as shown. P-bit address, A, switches up to N (4) drivers to consecutively numbered bit position beginning with the address A. In the example, P is determined by the formula $2^P=512$ wherein $P=9$. Thus, a 9 bit binary address man specify any of the 512 bit positions in the one dimensional array. The N sense lines are numbered 0 . . . $N-1$ (0, 1, 2, 3), in the present group of examples, $N=4$. It will be noted that each of the sense lines 0 through 3 would have 128 ($K$) bits associated therewith. The Decoder operates in the following manner to determine the address A in the Address Register.

The decoder is merely a conventional AND gate tree circuit and depending upon the contents of Address Register one of the outputs lines from 0 to 511 will be selected. Built-in circuitry then connects the lowest order from the Driver to this address and depending upon the number of drivers selected anywhere from one to four of the drive lines will be energized beginning with the address A.

To determine which of the sense lines contains the first address of a group wherein the sense line is designated by the symbol J, the following formula is utilized:

J=residue of A modulo N

Thus for the situation illustrated where $N=4$ an address of 5 would appear on sense line 1, the address 8 on sense line 0, the address 123 on sense line 3, etc. Thus, if the address were 5 and 4 bits were to be accessed concurrently, the output would appear on sense lines 1, 2, 3 and 0 in that order. It will of course be understood that the number of the access will be supplied to the Driver block whereby 4 output drive lines will be energized thereby.

It should also be noted in passing that the P-bit address could also be decoded in two parts to provide a two signal selection system (not illustrated).

Example Two-Dimensional Array

In this example as in the one above it will be assumed that the individual memory module again has K N or 512 bits which as shown in FIG. 8B are numbered from 0 through 511. However, this array is arranged in two dimensions insofar as the accessing or drive line configuration is concerned. The dimensions are further chosen to be a power of 2 and not less than N (4). Utilizing each dimension as a power of 2 greatly simplifies the binary address decoding as will be readily understood. Also, choosing a dimension less than N would greatly complicate the switching and selection circuitry. In the two dimensional embodiment illustrated in FIG. 8B the array is 32 by 16. The address can therefore be divided into two independent parts. The first or X portion is considered the high order section and utilizes the first five bits for designating one of 32 rows. The Y access utilizes the low order 4 bits of the 9 bit address and these 4 bits can be utilized to specify anyone of 16 columns. In the figure the various bit storage locations are numbered as in FIG. 8A.

An additional signal designated on the drawing as "select X or Y direction" specifies whether an access is to be in the X or Y direction as was generally described previously. The X and Y Decoders in this embodiment operate in much the same way as for the embodiment of the one dimensional system described with reference to FIG. 8A. It being noted that the primary difference is that the two Drivers produce half select rather than full select signals along the drive lines from said Decoders. Thus, a full select would only be received at the intersection of an energized X and Y drive line. The actual mechanics of selection would be virtually identical to that of the subsequently disclosed detailed embodiment assuming only a single memory plane. That is to say that if an access along the X direction of 4 bits is desired, a single X driver would be energized and 4 Y drivers would be energized concurrently to access the 4 bits along the chosen X drive line.

As in the embodiment of FIG. 8A, the 9 bit address is placed in an Address Register and this specifies the starting address at which a given access of from 1 to 4 bits is to occur. In other words it specifies both the lowest X and Y values and the decoder switching network automatically selects the next adjacent X or Y drive lines as appropriate depending upon the direction of access.

As in the embodiment of FIG. 8A only 4 sense lines (0–3) are required. These are wound diagonally through the memory, such for example, that sense line 0 passes through bits 0, 4, 19, 34, 49, 64, 479, 494, and 509 to state the extreme bit positions. It may readily be seen that by effecting a maximum access of N (4) bits no accessed bit will lie along the same sense winding.

Assuming that the sense windings are wired as indicated in FIG. 8B, the determination of which sense line a given Address A appears on may be determined from the formula:

J=residue of $(X+Y)$ modulo N

Thus for the example where $N=4$, $A=5$ which is decoded into $X=0$ and $Y=5$. Substituting these values into the above formula, J would equal 1. Thus this address would appear on sense line 1. Similarly assuming $A=123$, this decodes into $X=7$ and $Y=11$. Substituting these values into the formula, it will be determined that address 123 will appear on sense line 2. As in the description of the above example having this value it is a relatively simple matter to shift the sense line outputs in a suitable shifter or rotator so that the beginning address always appears on the first or lowest order output line.

It may thus be seen that with the two dimensional array disclosed in FIG. 8B. The same multiple access may be achieved as with the one dimensional embodiment of FIG. 8A. However, with the two dimensional embodiment the accesses may occur along either of the two dimensions X or Y. By suitably winding the array the same number, i.e., N (4) sense windings may be retained and still fully serve the memory system. It should be noted in passing that the X, Y selection signals could be combined to provide a single selection signal per bit (not illustrated).

Example Three-Dimensional Array

Inasmuch as the bulk of the present embodiment relates to the detailed circuitry necessary to embody the present invention in a three dimensional Memory Cube, no one specific figure of the general nature of FIGS. 8A and 8B exist for this embodiment. However, the details of the memory wiring and interconnection may best be seen by referring to FIGS. 8C–F and FIG. 9. FIGS. 8C–F show the wiring details of the sense windings assuming four such windings $(N=4)$ through the eight separate core planes of the 8 by 8 by 8 Memory Cube set forth in the present disclosed embodiment. FIG. 9 shows details of the drive windings and the manner in which they would be actuated in the event of X, Y, or Z accessing modes. Referring to FIG. 9, an X access is illustrated for plane 0, a Y access in plane 2 and a Z access in planes 4, 5, 6 and 7.

For the present example as well as for the complete detailed embodiment it is assumed that the individual Memory Cube includes K N (512) buts which are numbered in octal designation as shown in FIG. 19. The cube is arranged in an 8 by 8 by 8 array wherein it will be noted that each dimension is a power of 2 and that no dimension is less than N (4). The reasons for this choice of dimensions are as explained in the Two-Dimensional Array Example above for ease of both decoding and sense winding.

It will be remembered that with any 512 bit memory a 9 bit binary address is capable of designating any particular Address within the system. However, in this three dimensional embodiment the address is divided into three 3 bit sections which are decoded separately into the X, Y and Z segments of said Address. As in both of the previous embodiments it is necessary that an additional signal be included to indicate whether a particular access is going to be of 1, 2, 3, or 4 bits which number is decoded and sent to the driver units which will accordingly energize up to four drivers depending upon the direction of access and the particular driver set (X or Y) being energized. Additionally, as in the embodiment of the Two Dimensional Array Example a direction of access signal must be included specifying whether the direction of access is to be along the X, Y or Z direction. The access direction arrows shown in FIG. 19 specify the X, Y and Z access directions utilized throughout the present description. Thus, if an access is in the X or Y direction, the operation of the X and Y drive lines will be virtually identical to the operation of the system of FIG. 8B with the additional feature that the particular core plane i.e., as shown in FIG. 9 will be specified by the Z portion of the main Address. For an access in the Z direction as will be apparent from an examination of FIG. 9 and specifically the wiring diagrams for planes 4, 5, 6, and 7, the same X and Y drive line is energized in each plane but in this case the X drive lines and the Y drive lines in each plane are driven in parallel to give the vertical or Z access direction. The manner in which the various gating and wiring controls shown in FIGS. 3 and 4 accomplish this will be described in detail subsequently.

Considering again FIGS. 8C–F, it will be apparent by examining these figures that considering any four consecutive bits in the X, Y or Z directions that no 2 adjacent bits will be intersected by the same sense winding due to the diagonal winding in the plane and stepping of the windings as they proceed between planes to avoid such dual intersection of bits in the vertical or Z direction. To determine the particular sense line on which a particular address A will lie, the following formula similar to that used in describing the embodiment of FIGS. 8A and 8B may be used.

$$J=\text{residue of } (X+Y+Z) \text{ modulo N}$$

As stated previously in this three dimensional embodiment the 9 bit address is broken into three 3-bit octal groups which are decoded as X, Y and Z portions. Thus, with an address $A=5$ (000 000 101) this would decode to $X=0$, $Y=0$, $Z=5$. Since $N=4$ in all three examples the address A would lie along sense line 1. As a second example assume that address $A=123$ (001 111 011) this would decode to $X=1$, $Y=7$, and $Z=3$. Inserting these variables in the above formula, this address would appear on sense line 3, etc.

FIG. 19 clearly shows the manner in which the 9 bit address considered as three separate octal digits would decode directly into the various numbered bit storage cubes within the large Memory Cube illustrated.

Referring now to FIG. 1 which is a block diagram of the Memory System, the Main Controls 2, feed a plurality of Memory Cubes 4, each with its associated Memory Gates 6 and Local Controls 8. Each Local Control 8 is tied in with the Memory Data Register 10. The present embodiment shows four Memory Cubes. In practice there would be more.

Figures 3, 3A:
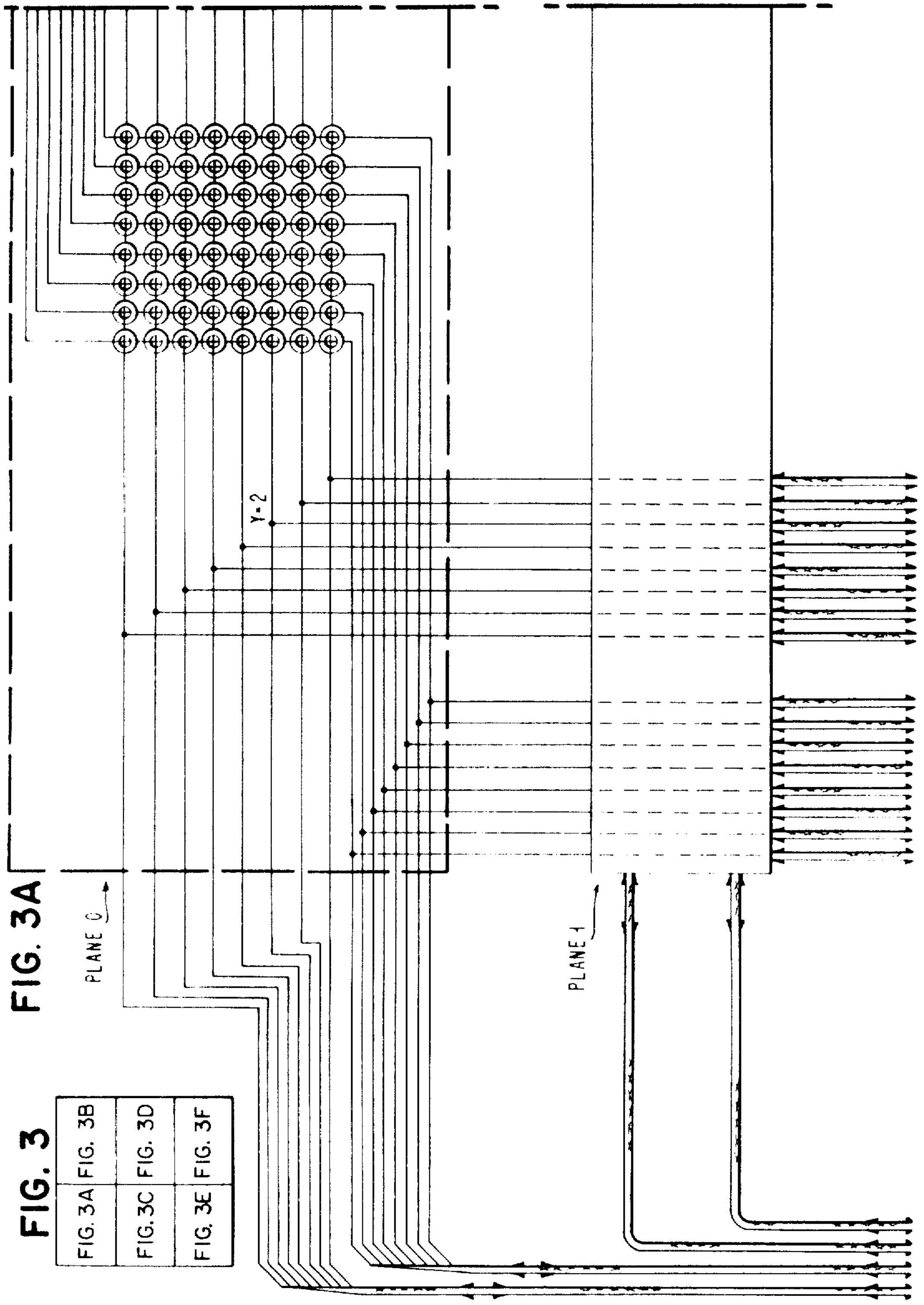
Figure 3B:
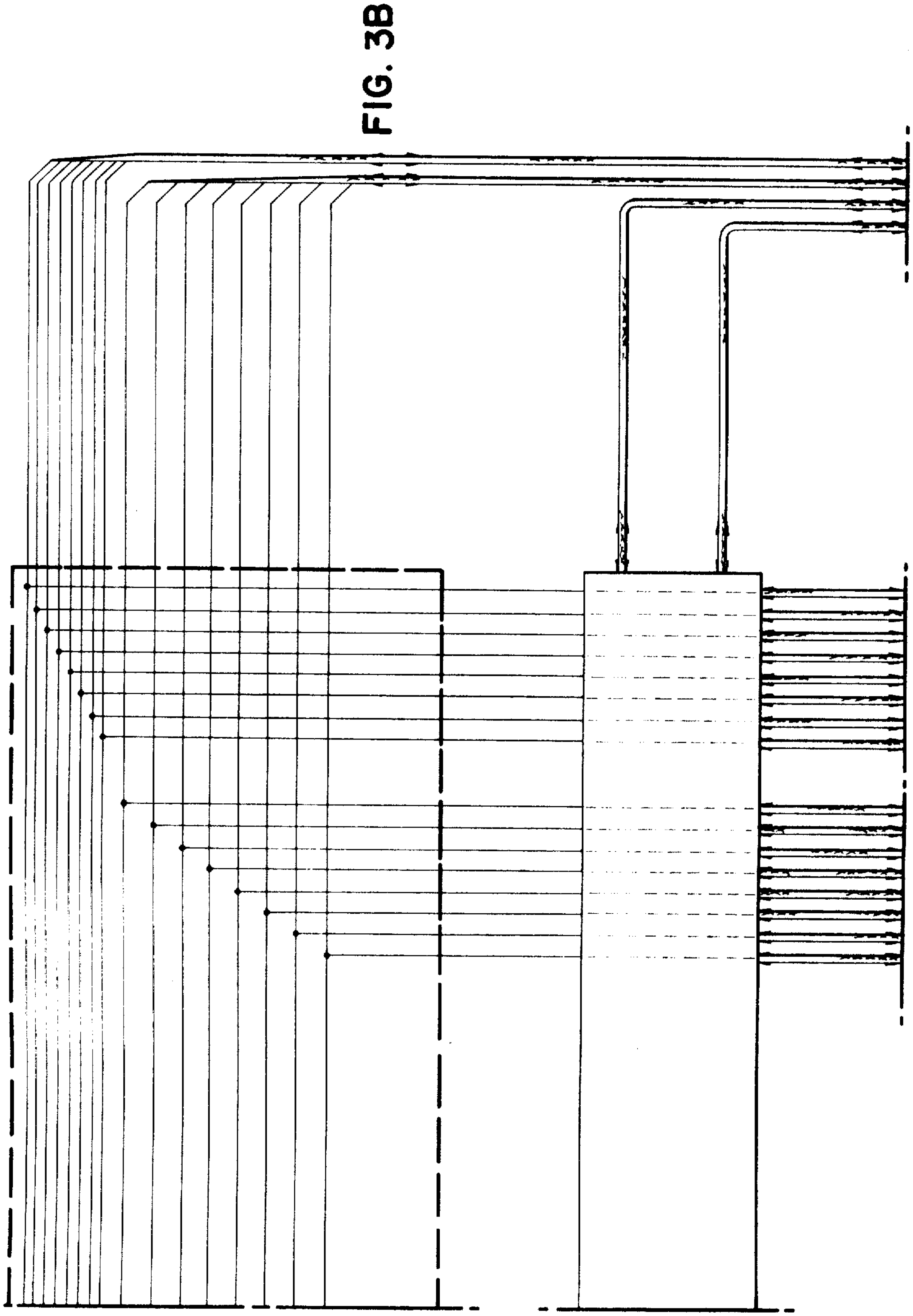
Figure 3C:
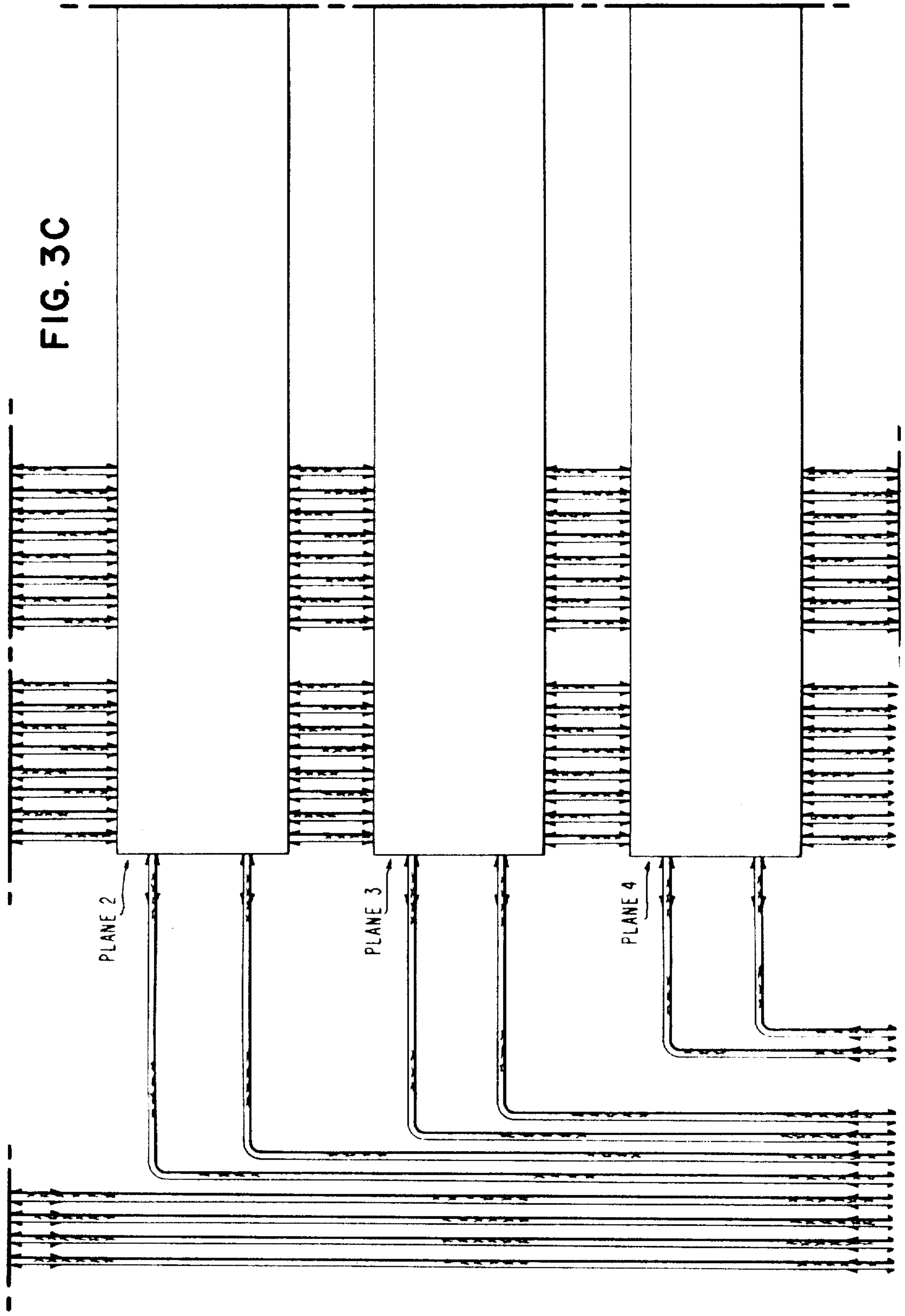
Figure 3D:
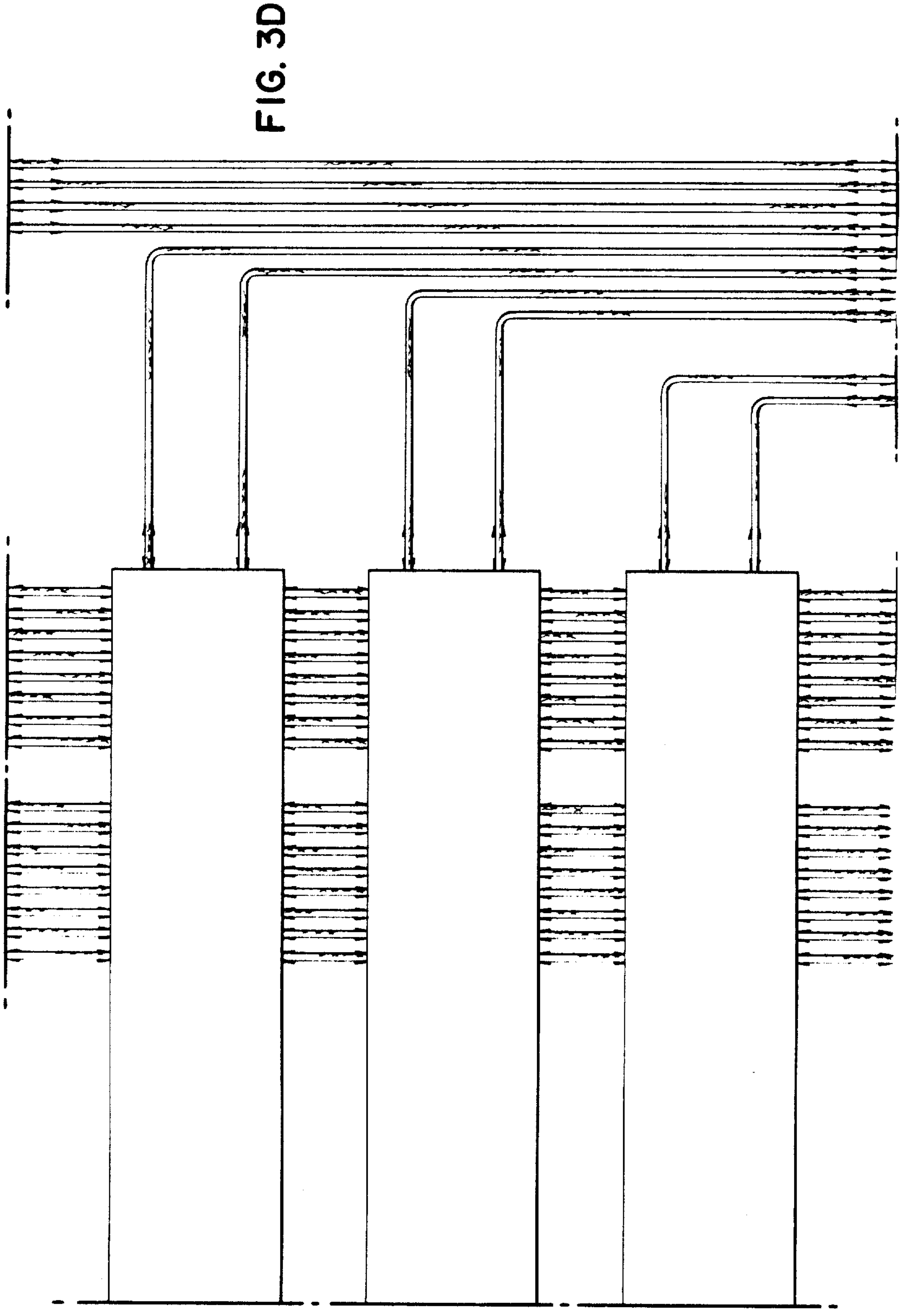
Figure 3E:
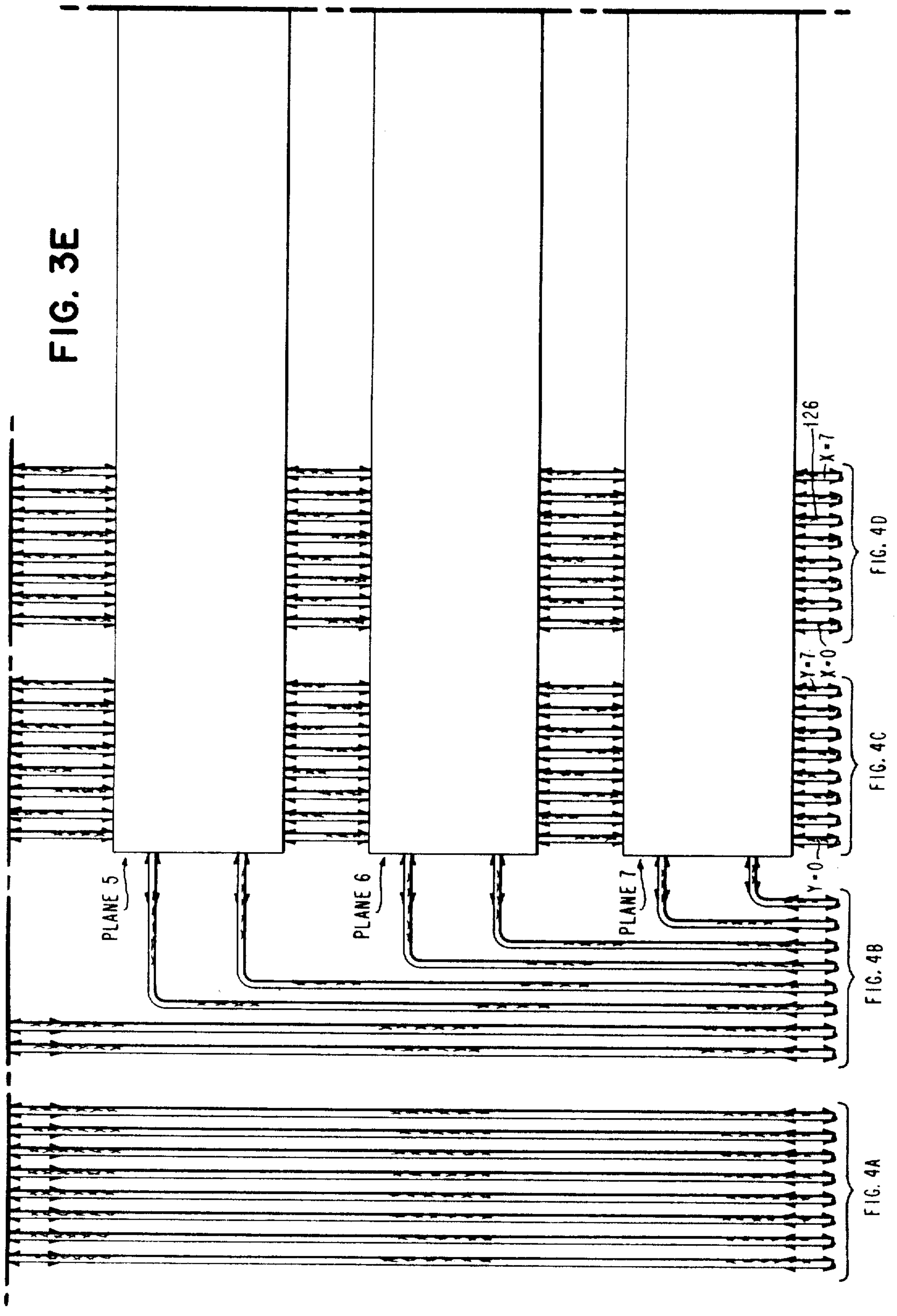
Figure 3F:
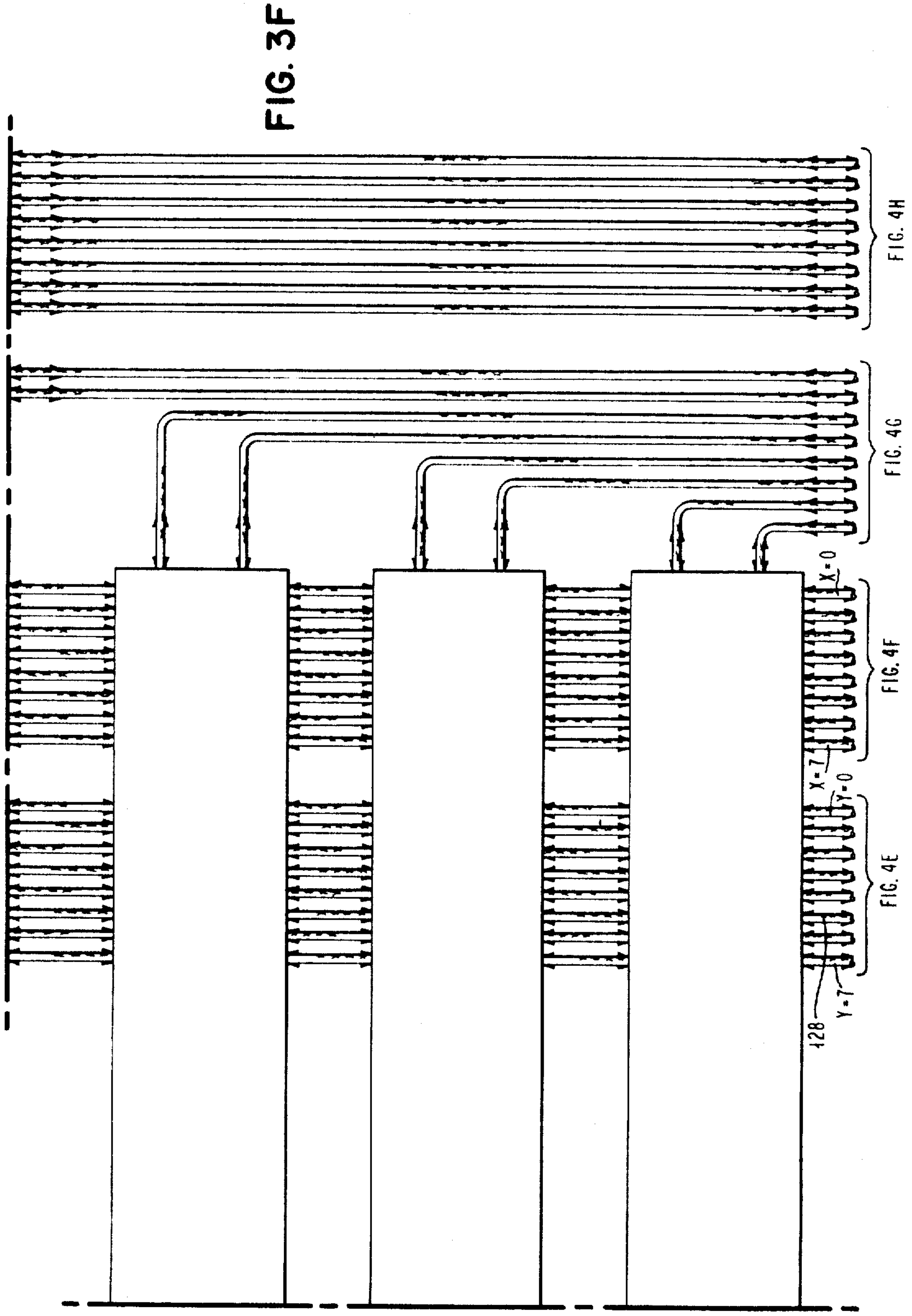

The Memory Cube 4 can best be explained by referring to FIGS. 3, 19, 7, 8 and 9. For purpose of the present embodiment, the cube is shown as an 8 by 8 by 8 element although again, in practice it would be much larger. FIG. 3 shows the drive wires in detail for the eight separate planes. The planes are shown numbered from 0 to 7 inclusive. The cables at the bottom of FIG. 3 extend to the Memory Gates which are shown on FIG. 4. FIG. 19, as stated previously, shows how the Memory Cube is (for this embodiment) divided up into 512 elements, each of which is a core. The figure shows how the cores are numbered, in octal fashion from 000 to 777 inclusive. The arrows at the upper left of FIG. 19 indicate the directions of the three directions of access X, Y and Z. It should be clear from an inspection of FIG. 19 that the Starting Address of an access whether it be in the X, Y or Z direction, can be specified by three octal numbers of one digit each. The first octal number can refer to the X address, the second octal number can refer to the Y address and the third octal number can refer to the Z address. For example, a Starting Address such as 430 would mean that the X address is 4, the Y address is 3 and the Z address is 0. The access can then proceed from this Starting Address in one of the X, Y or Z directions.

It should be noted that each Memory Cube is a bit position for the memory words involved in the system. The number of bits in the memory words is the same as the number of Memory Cubes. As stated previously, in the present embodiment there are four Memory Cubes so the number of bits in the memory words is four. The number of memory words that can be accessed simultaneously depends on the size of the Memory Cube and the amount of circuitry provided. To illustrate the principles involved, this embodiment is limited to a maximum of four memory words. In other words, from one to four memory words can be accessed simultaneously. How this is done will be explained in detail later.

Figure 7A:
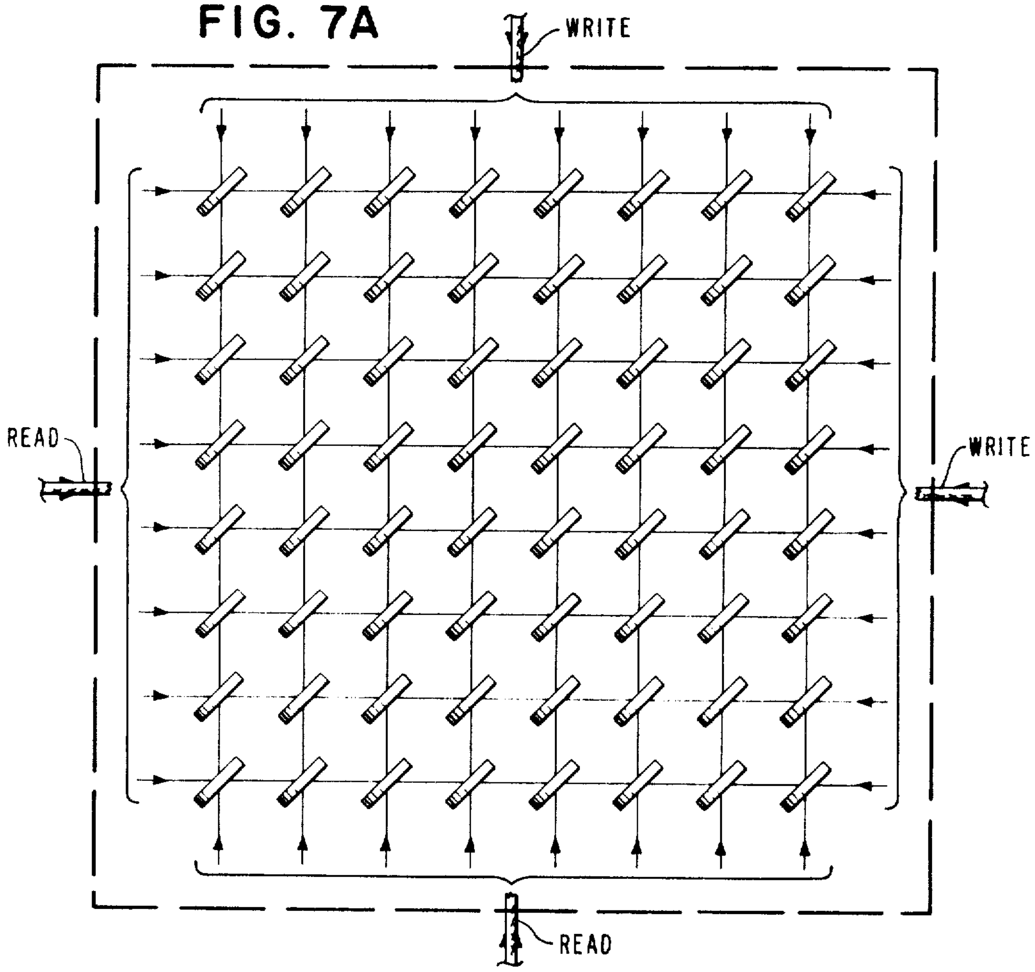
FIG. 7A is a composite drawing showing the individual storage cores and drive windings for a typical core plane suitable for inclusion as a memory plane in the present invention.
Figure 7B:
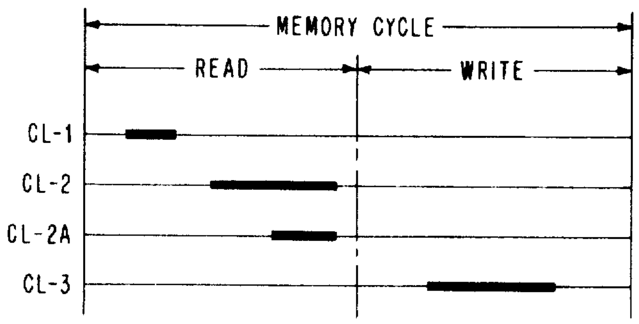
FIG. 7B is a timing diagram illustrating the timing of the drive pulses applied to the various windings as would be conventionally used with a core matrix memory of the type illustrated in FIG. 7A.

FIG. 7 shows the cores and drive wires for one plane of the Memory Cube. In this embodiment, there are eight of these planes in each memory cube.

FIGS. 8C–F show how the sense wires are arranged in each plane of a cube. It is a feature of this disclosure that only four sense wires are required for each memory cube, i.e., as many sense wires as the maximum number of simultaneously accessed bits.

FIG. 9 illustrates the three different types of accesses that are possible in each memery cube. In FIG. 9, for plane 0, an X access is shown. In other words, a single drive pulse would appear on wire $X_3$ and the multiple drive pulses would appear on wires $Y_1$, $Y_2$, $Y_3$ and $Y_4$. It should be further mentioned that the access shown for plane 0 is a "read" access. In FIG. 9, plane 2 illustrates a "write" Y access. A Z "read" access is shown by planes 4, 5, 6 and 7.

Figure 4A:
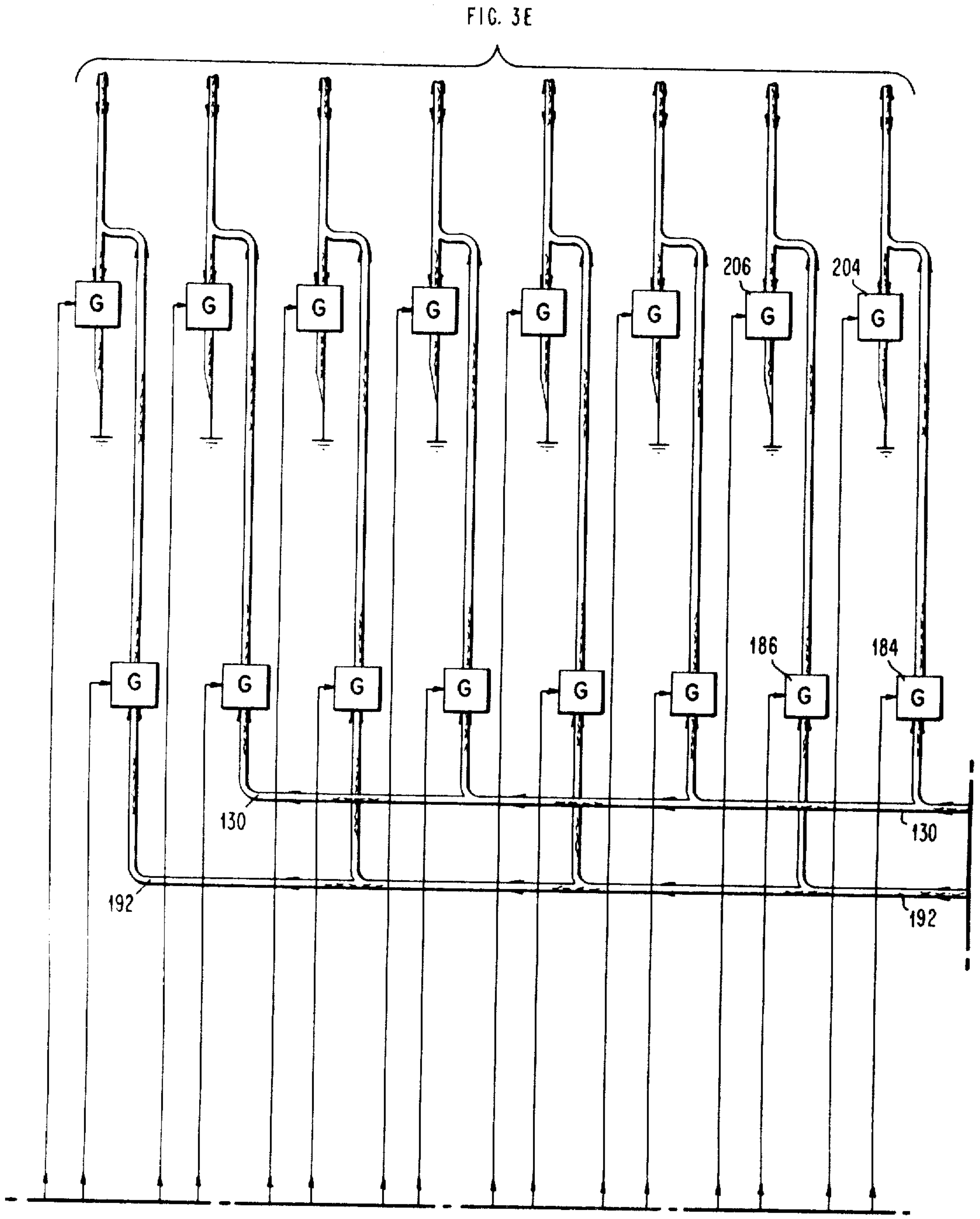
Figure 4B:
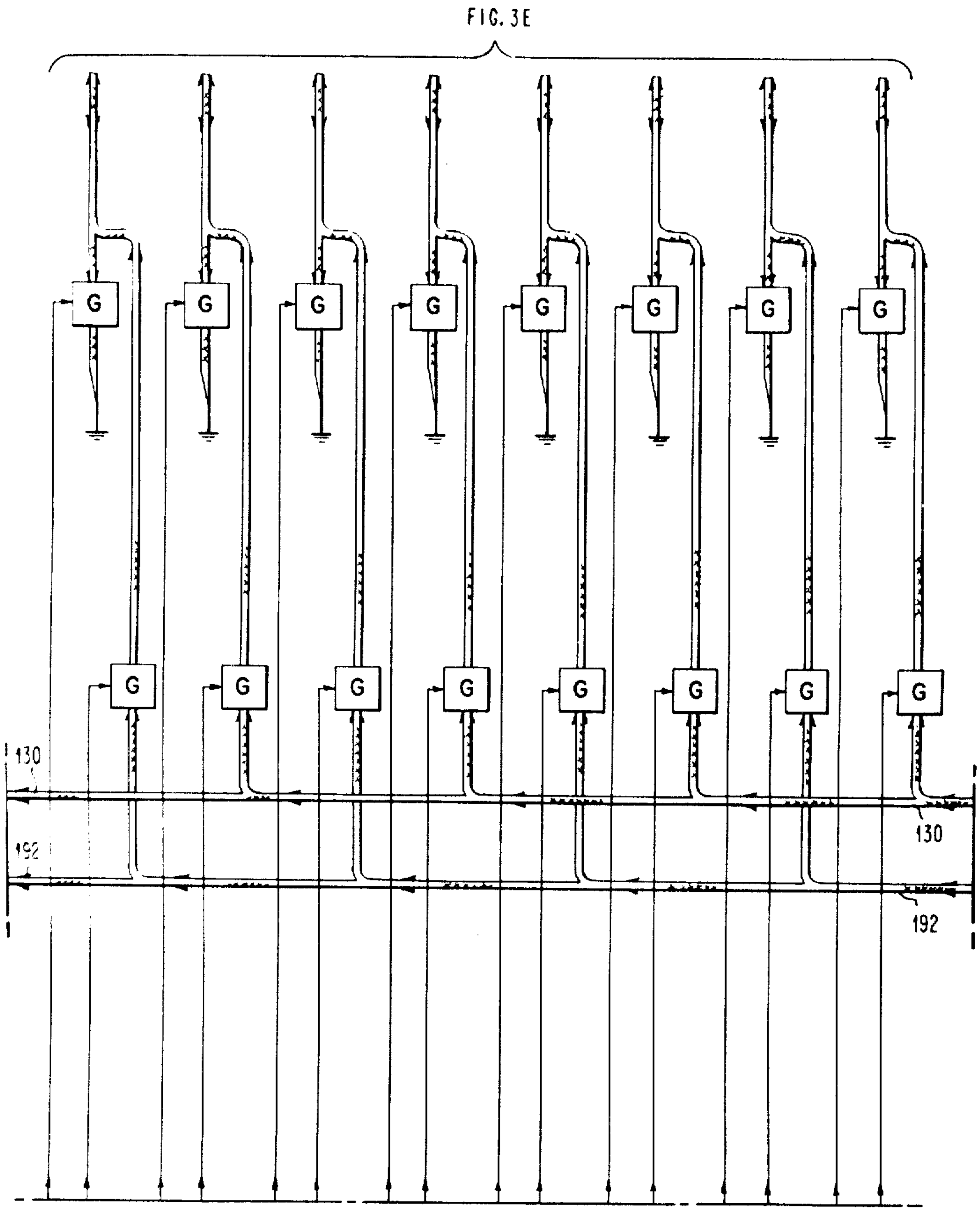
Figure 4C:
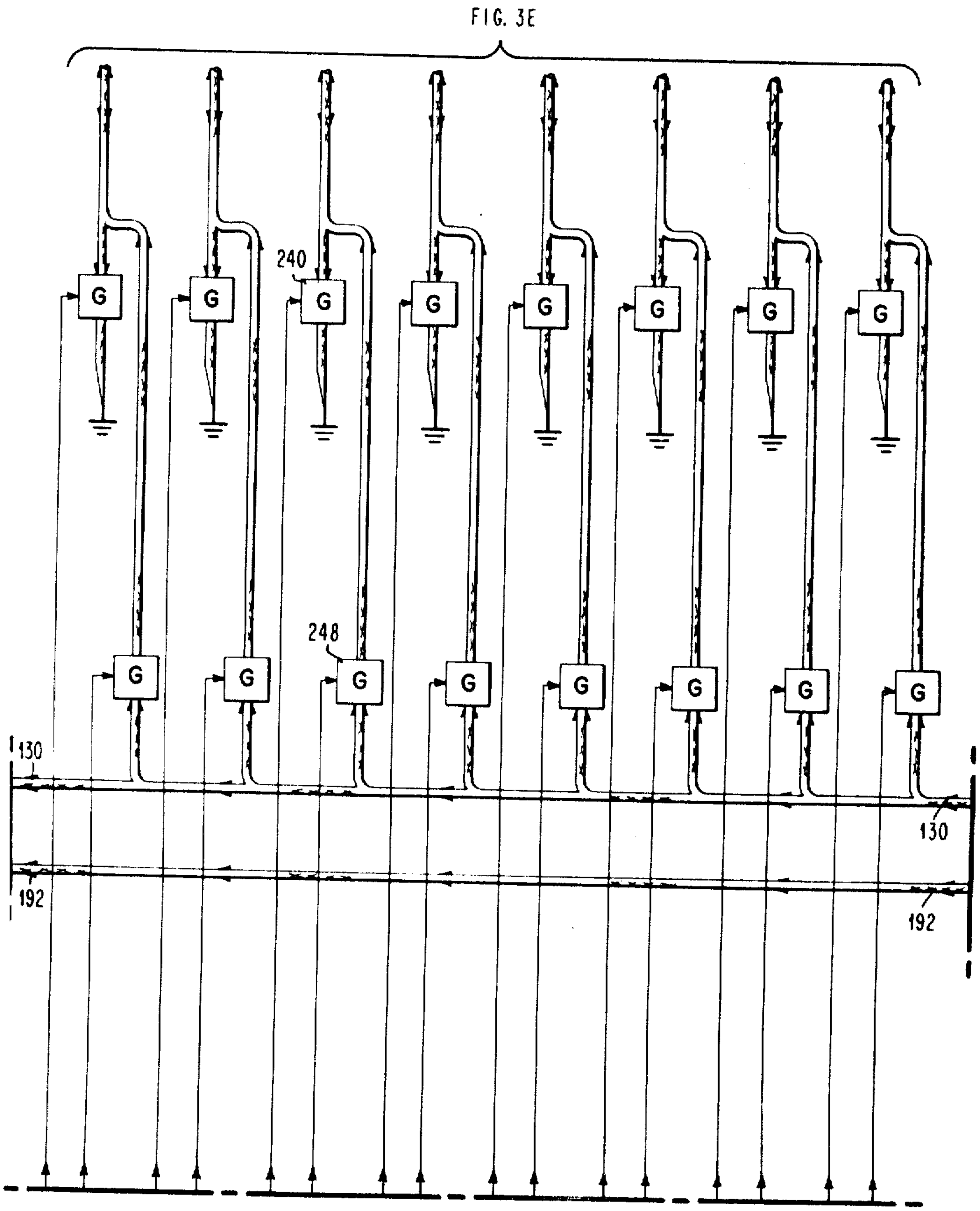
Figure 4D:
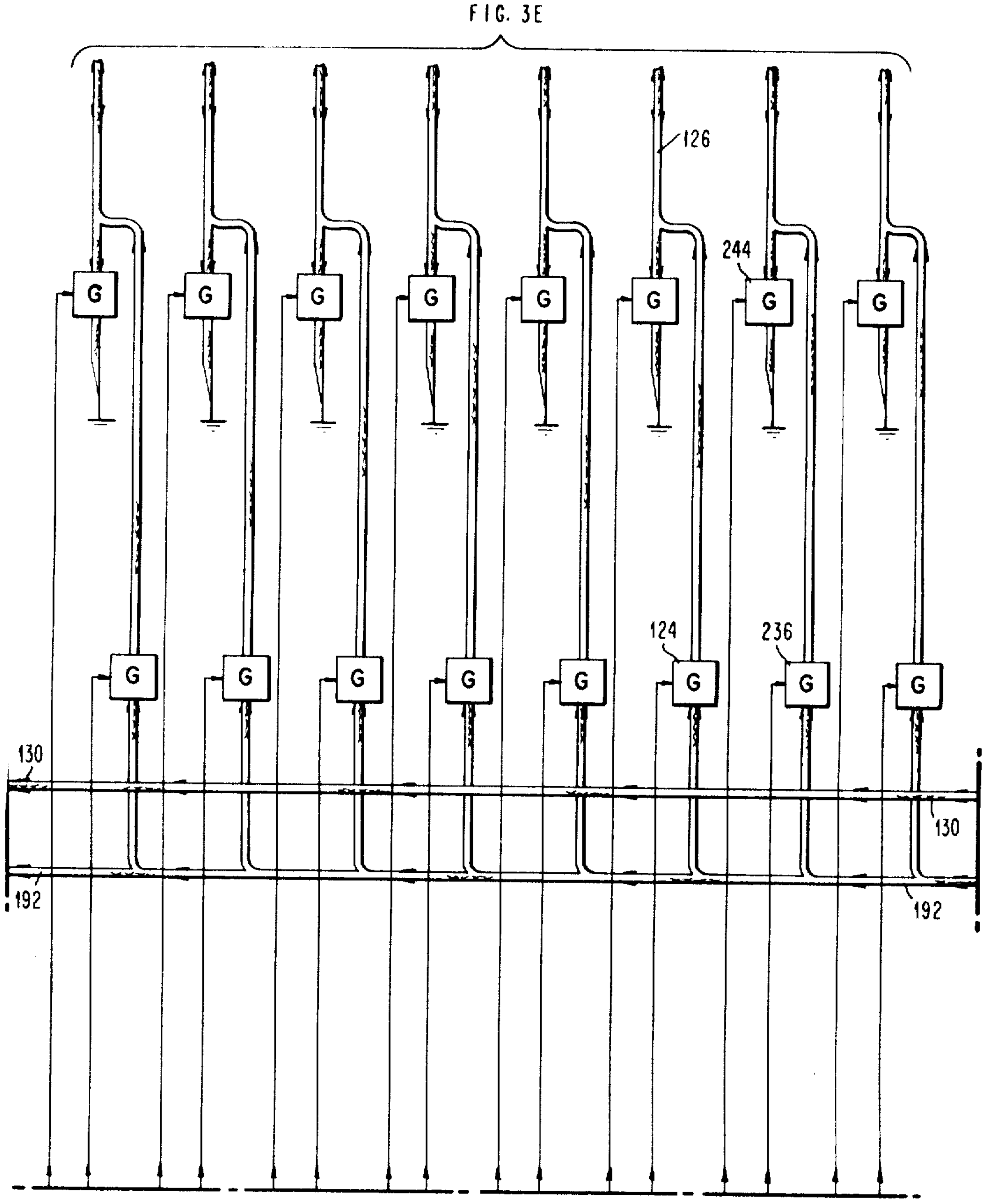
Figure 4E:
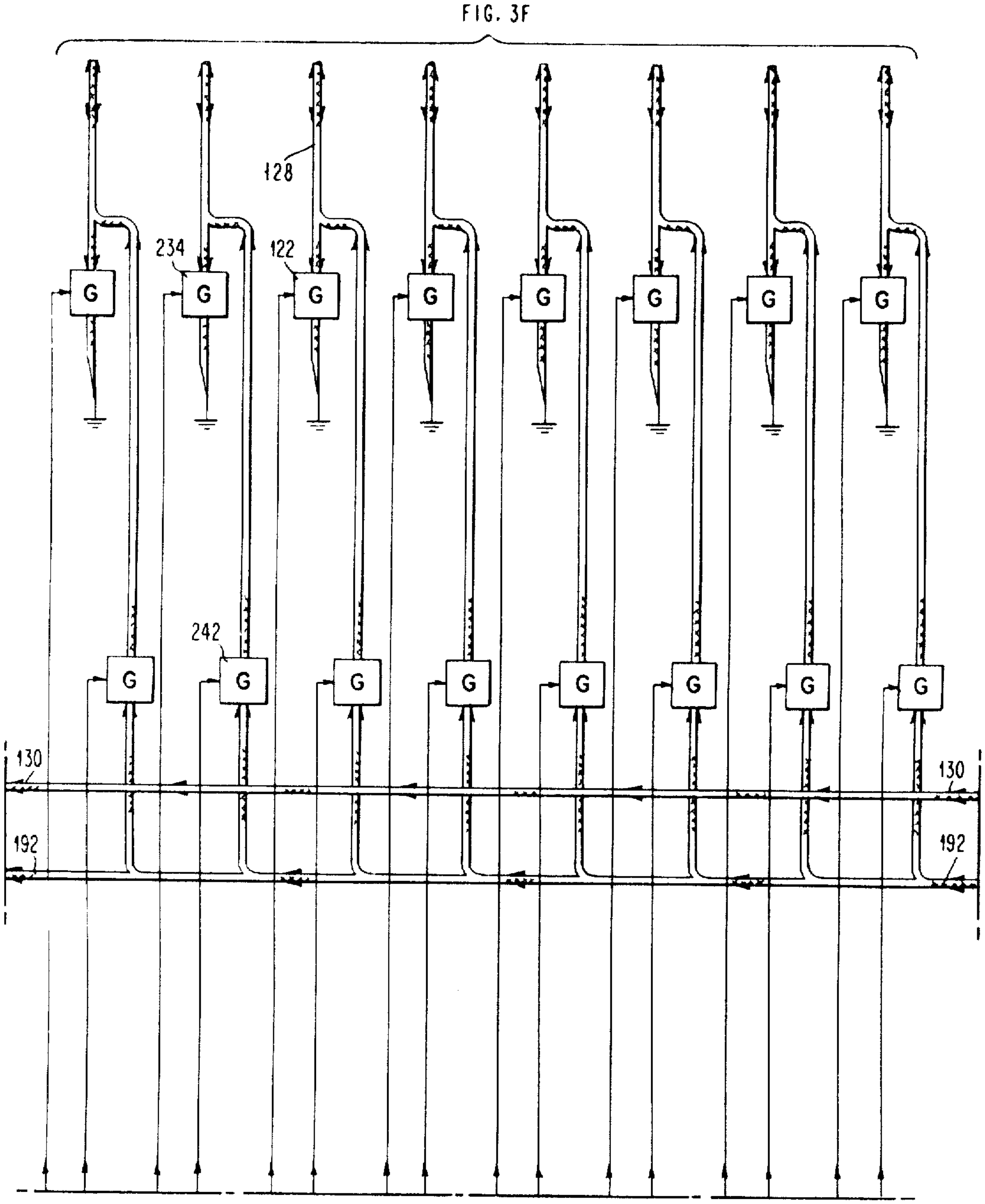
Figure 4F:
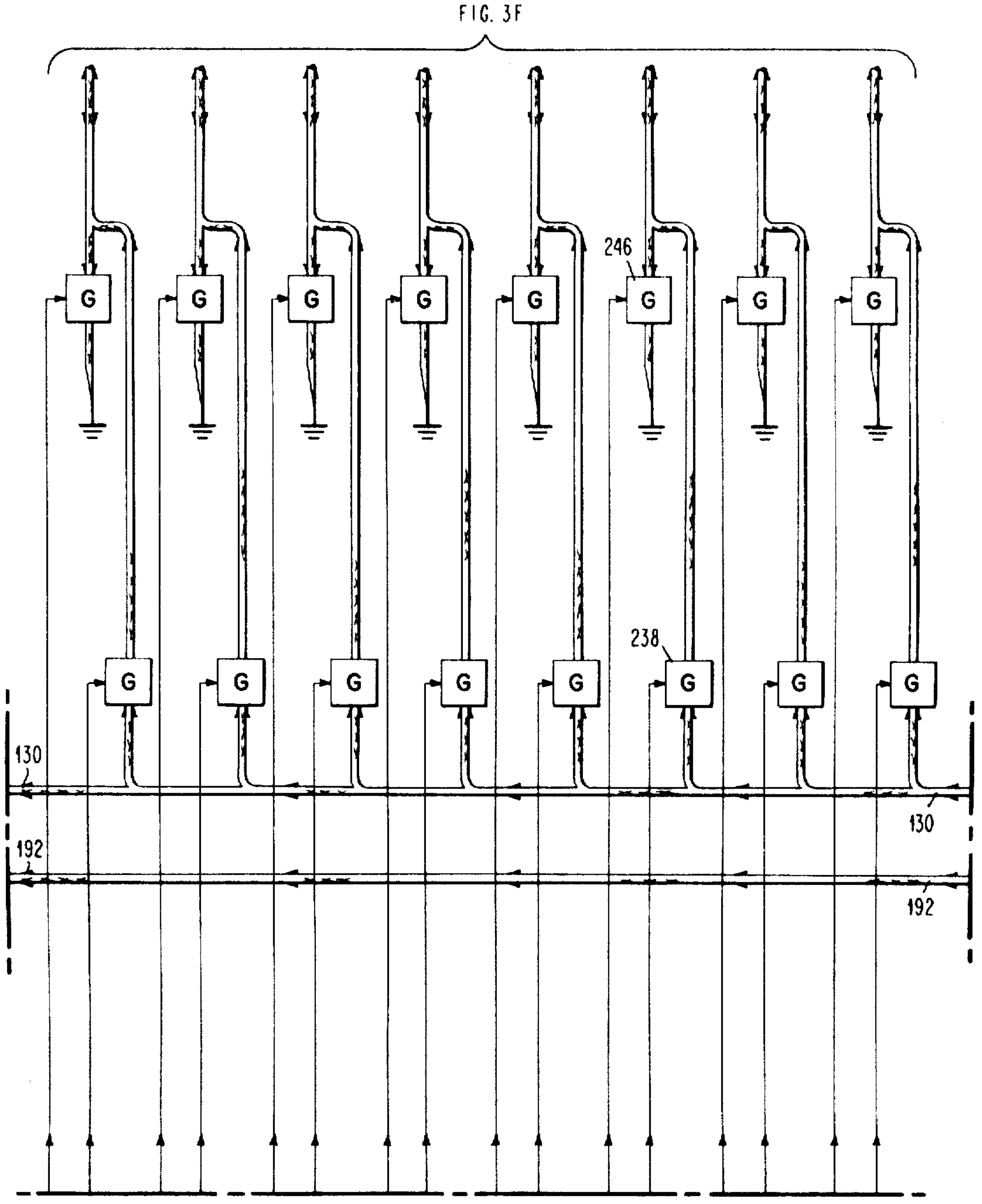
Figure 4G:
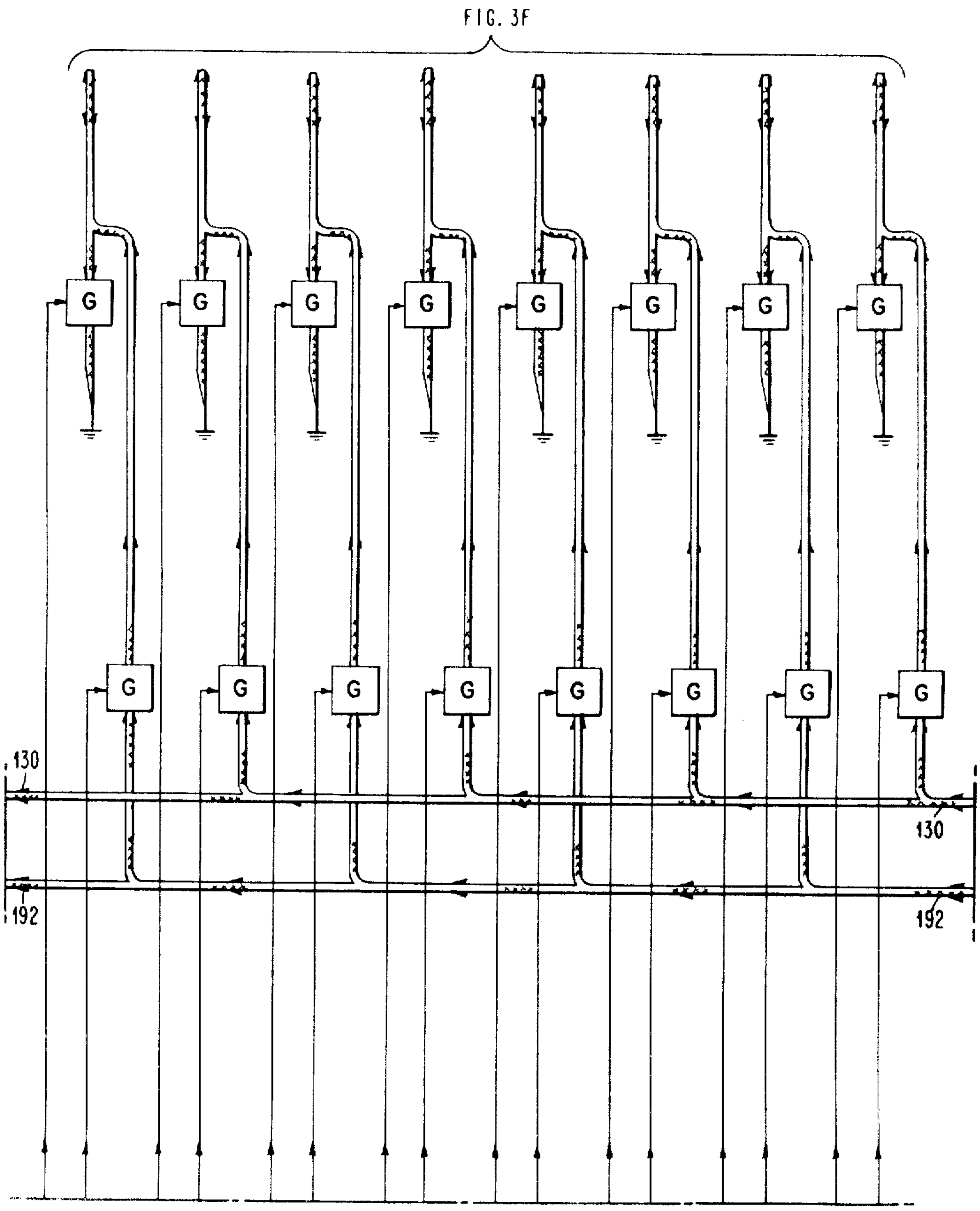
Figure 4H:
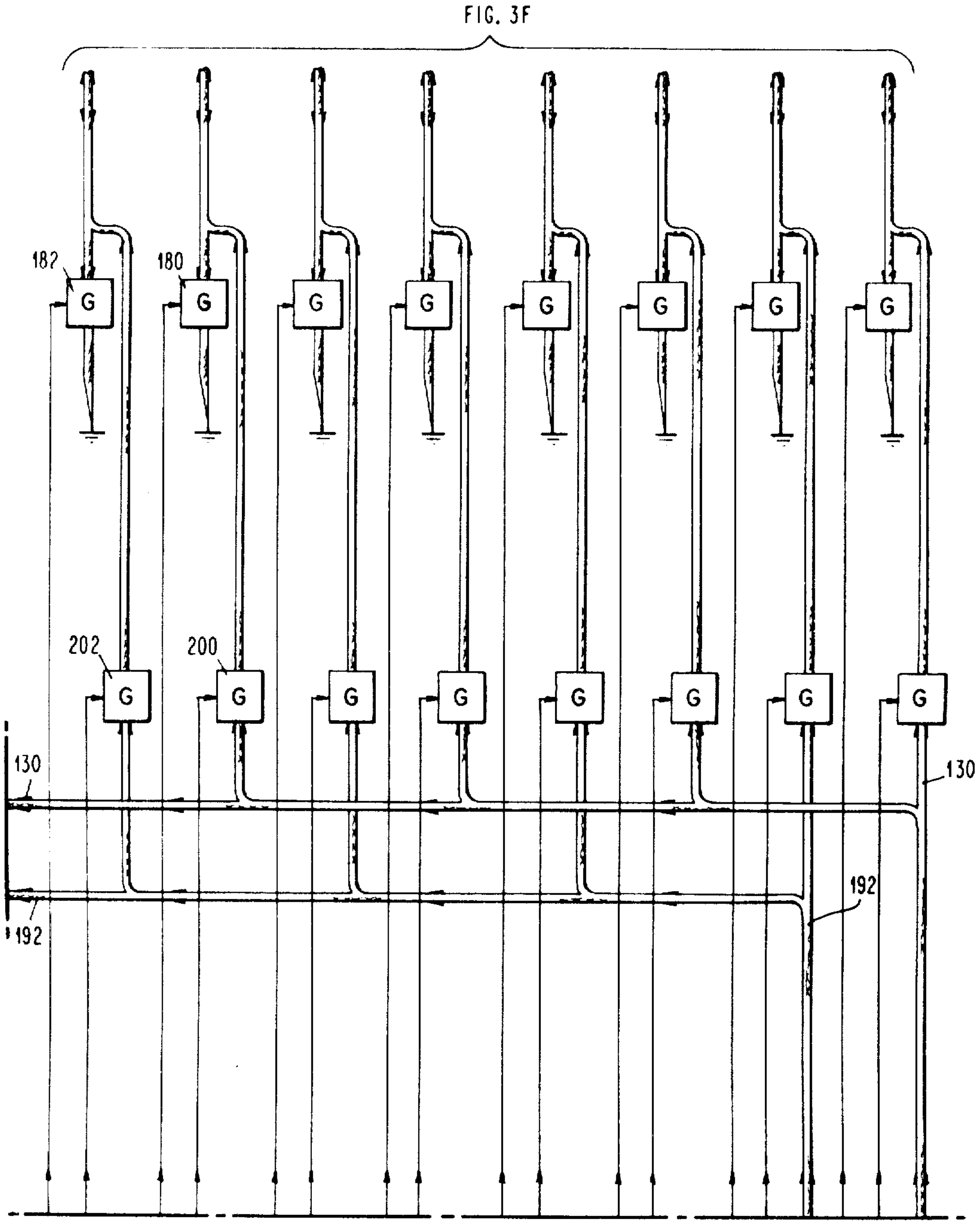
Figures 4, 4I:
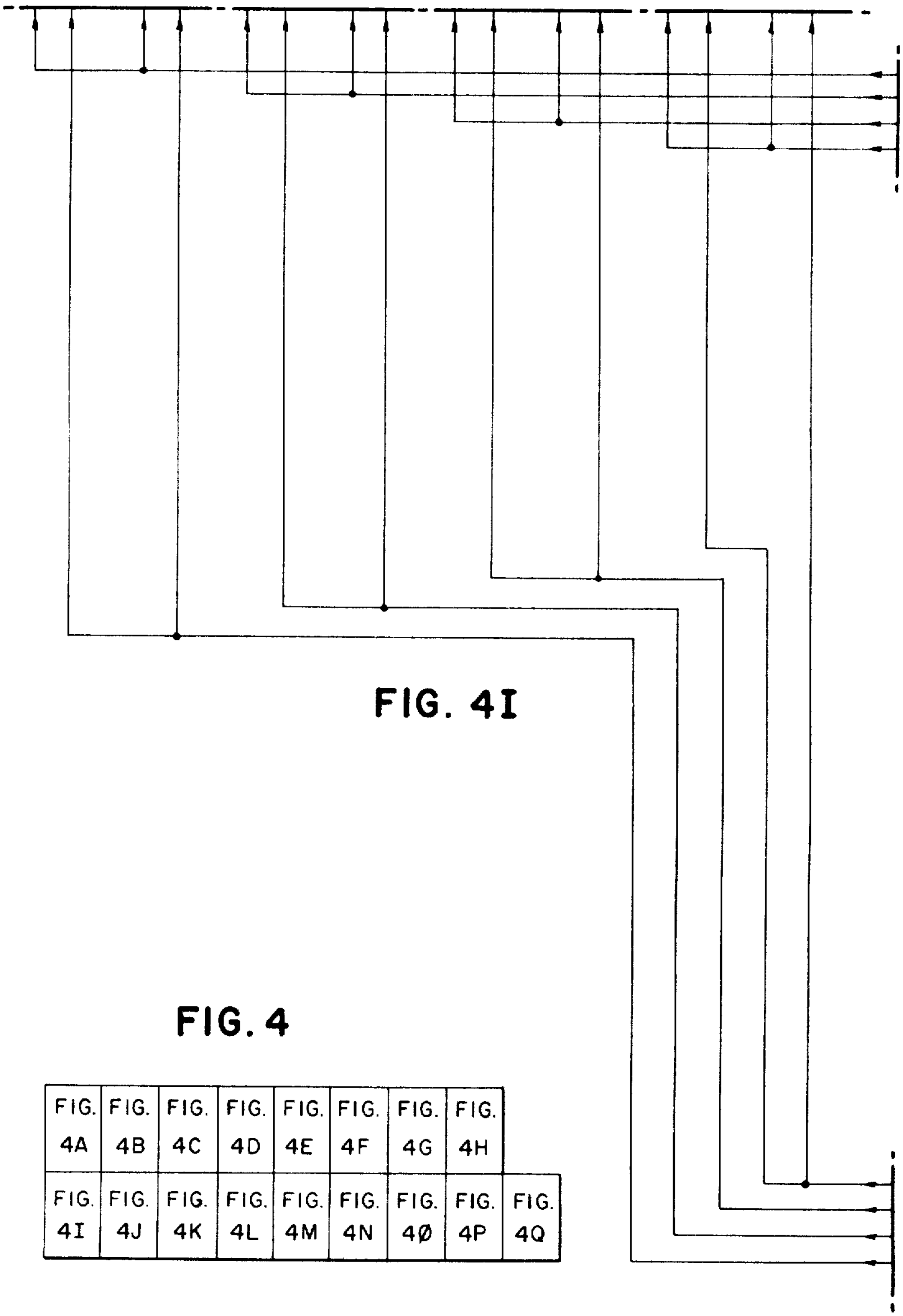
Figure 4J:
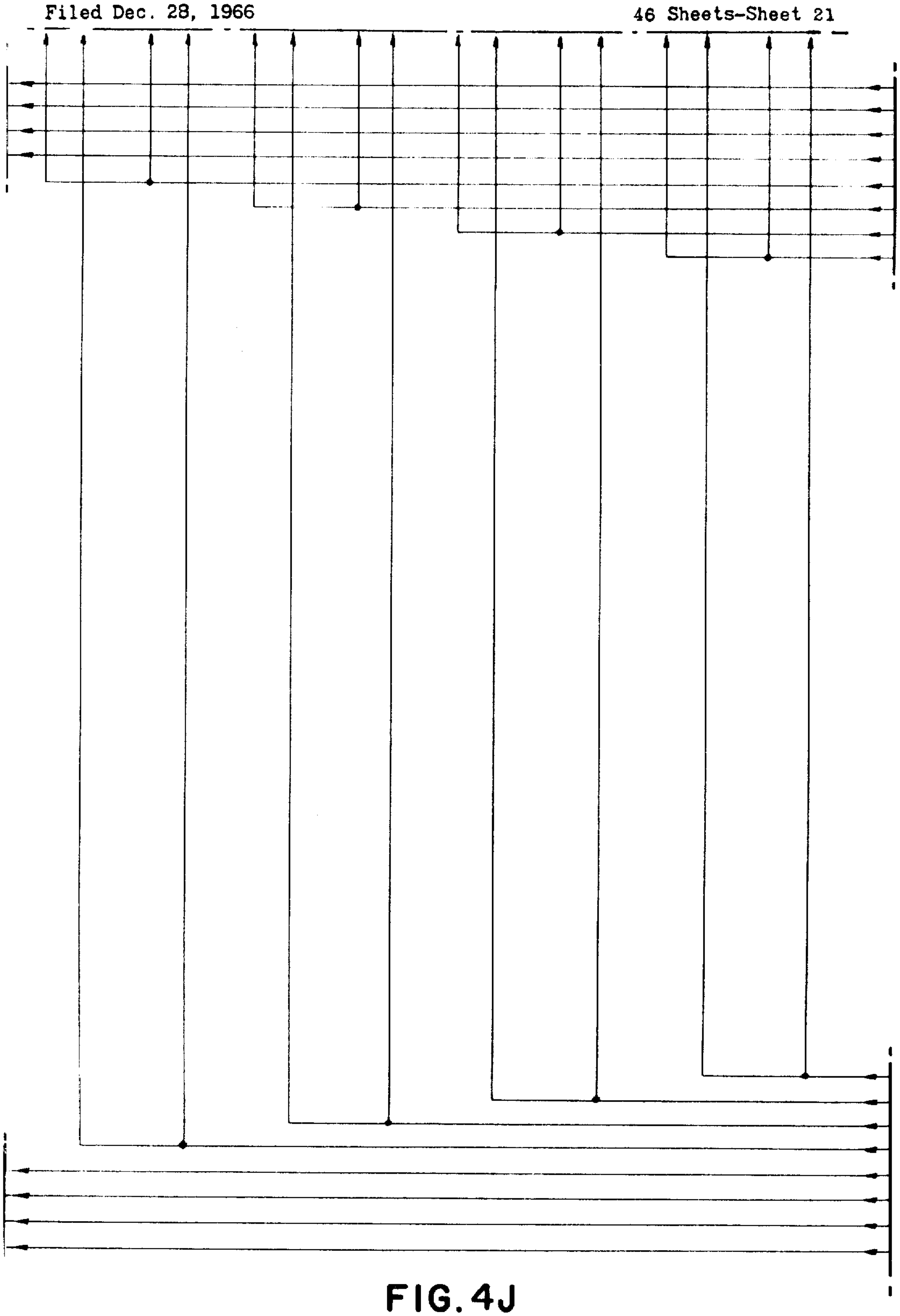
Figure 4K:
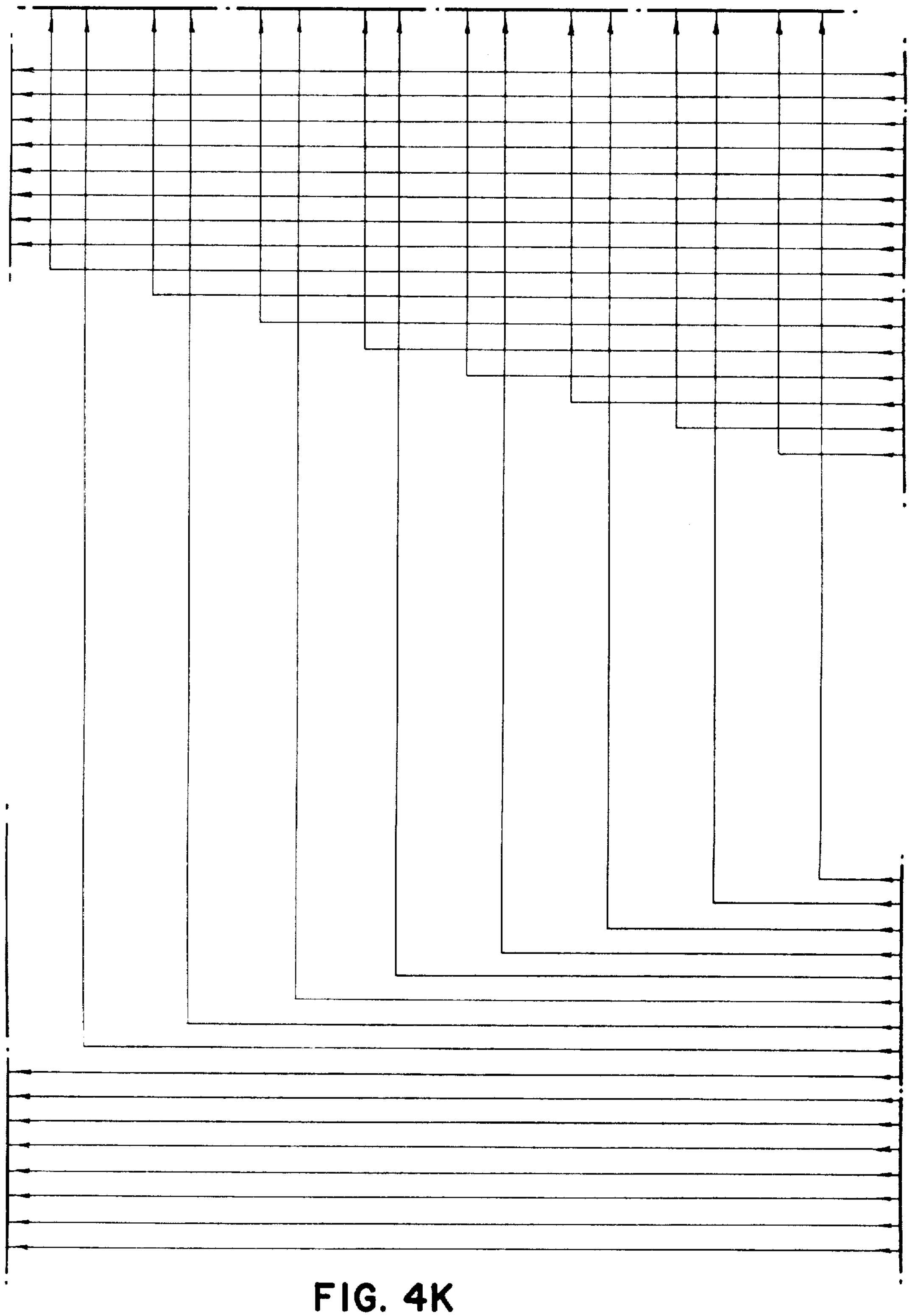
Figure 4L:
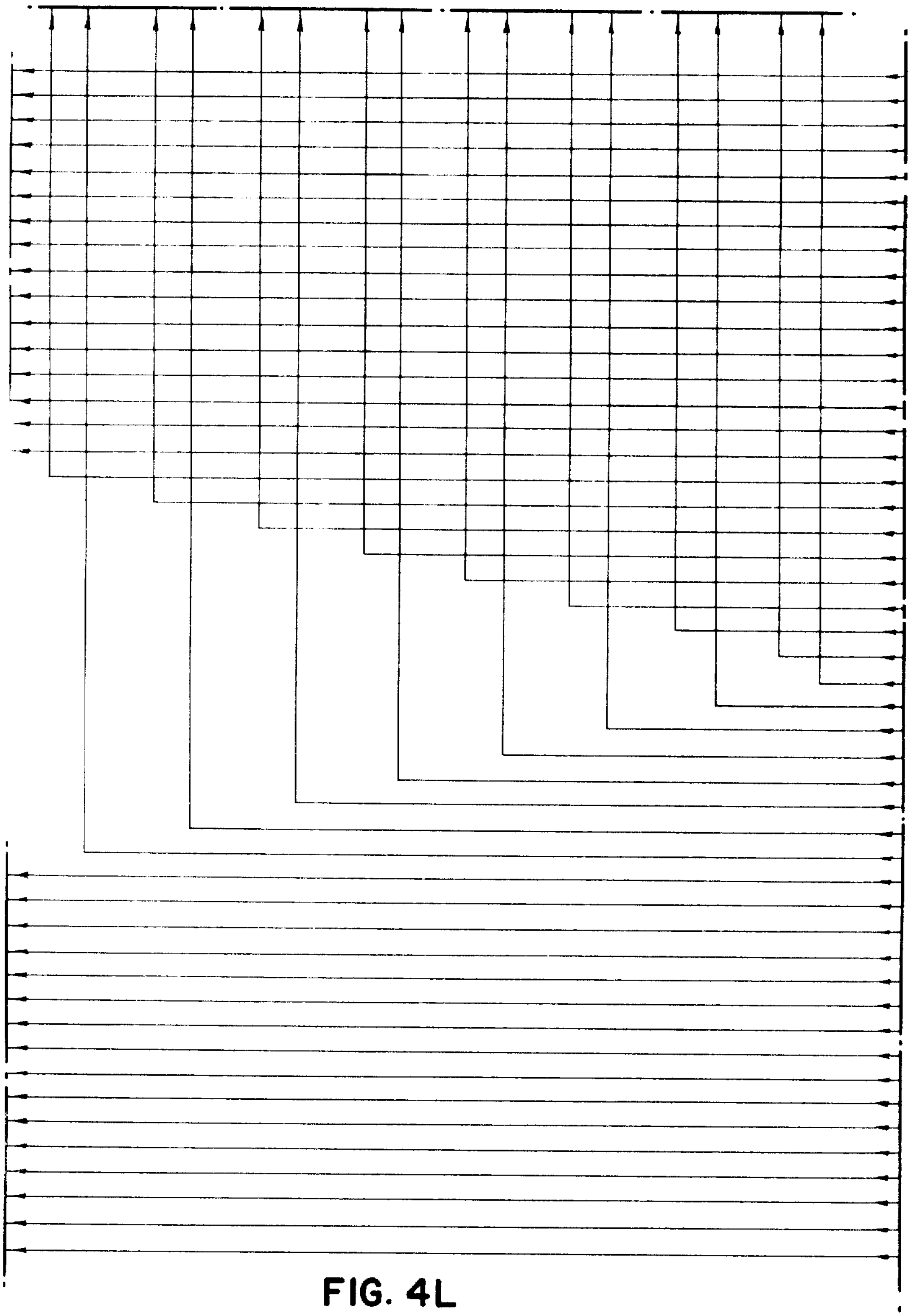
Figure 4M:
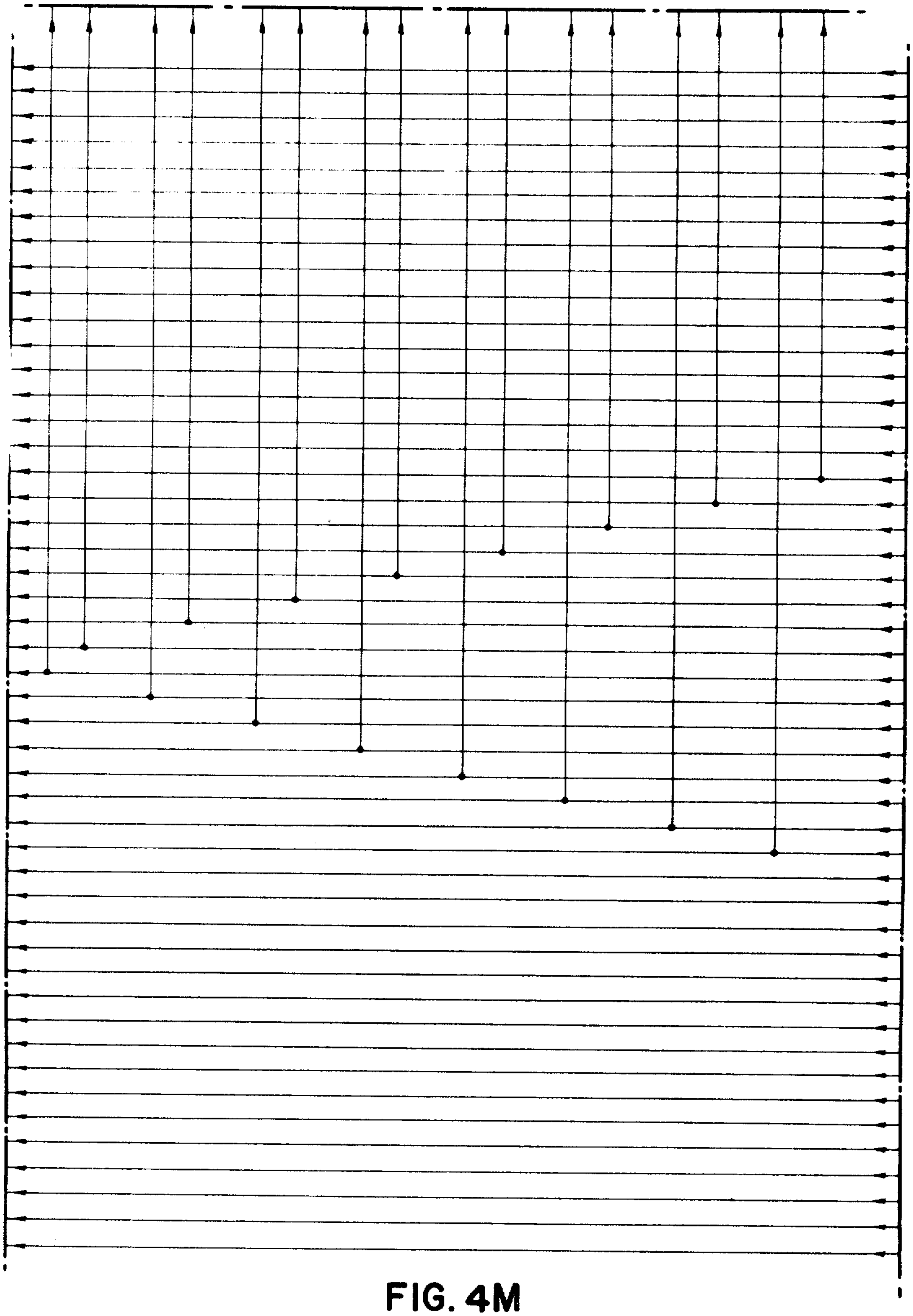
Figure 4N:
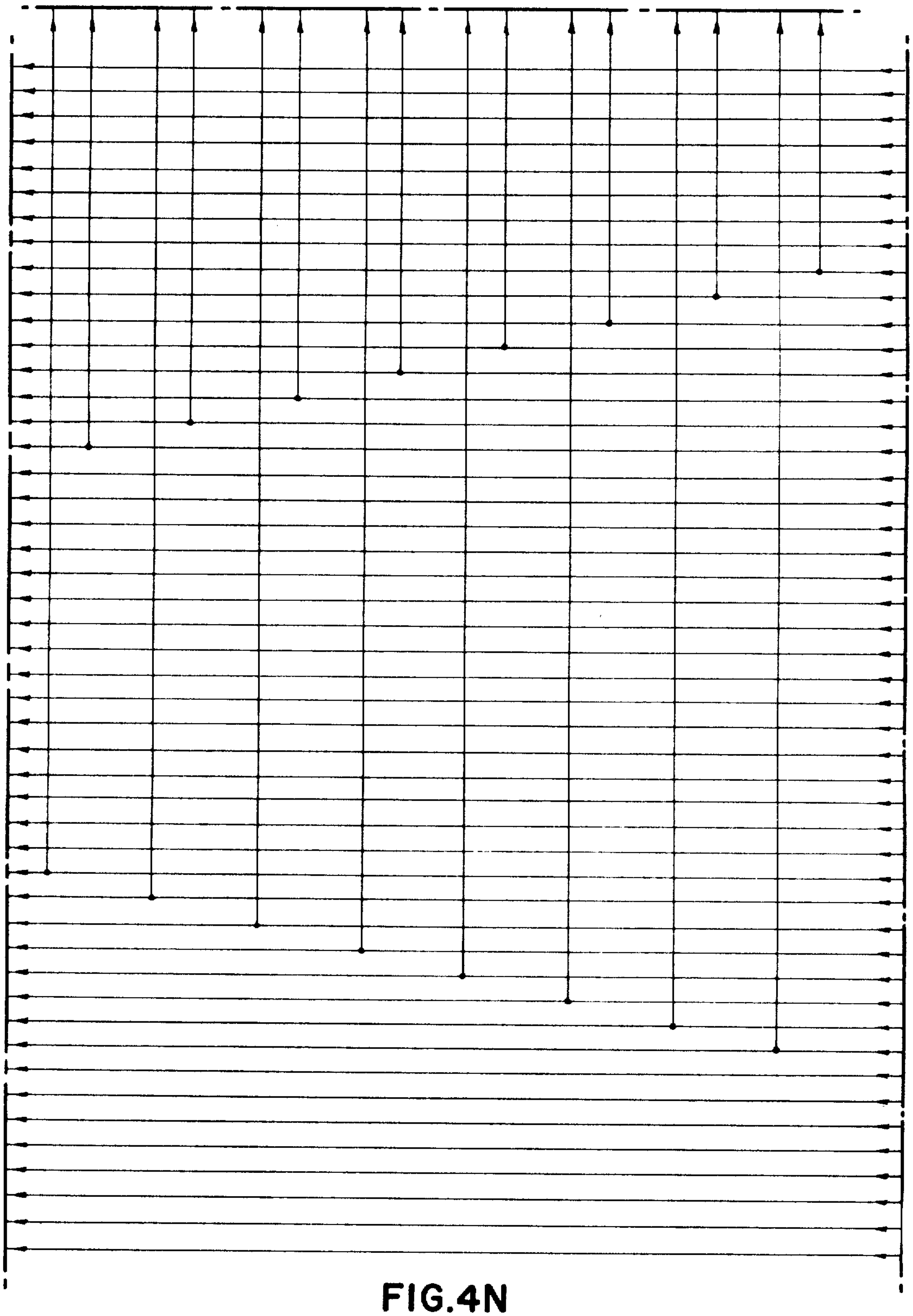
Figure 40:
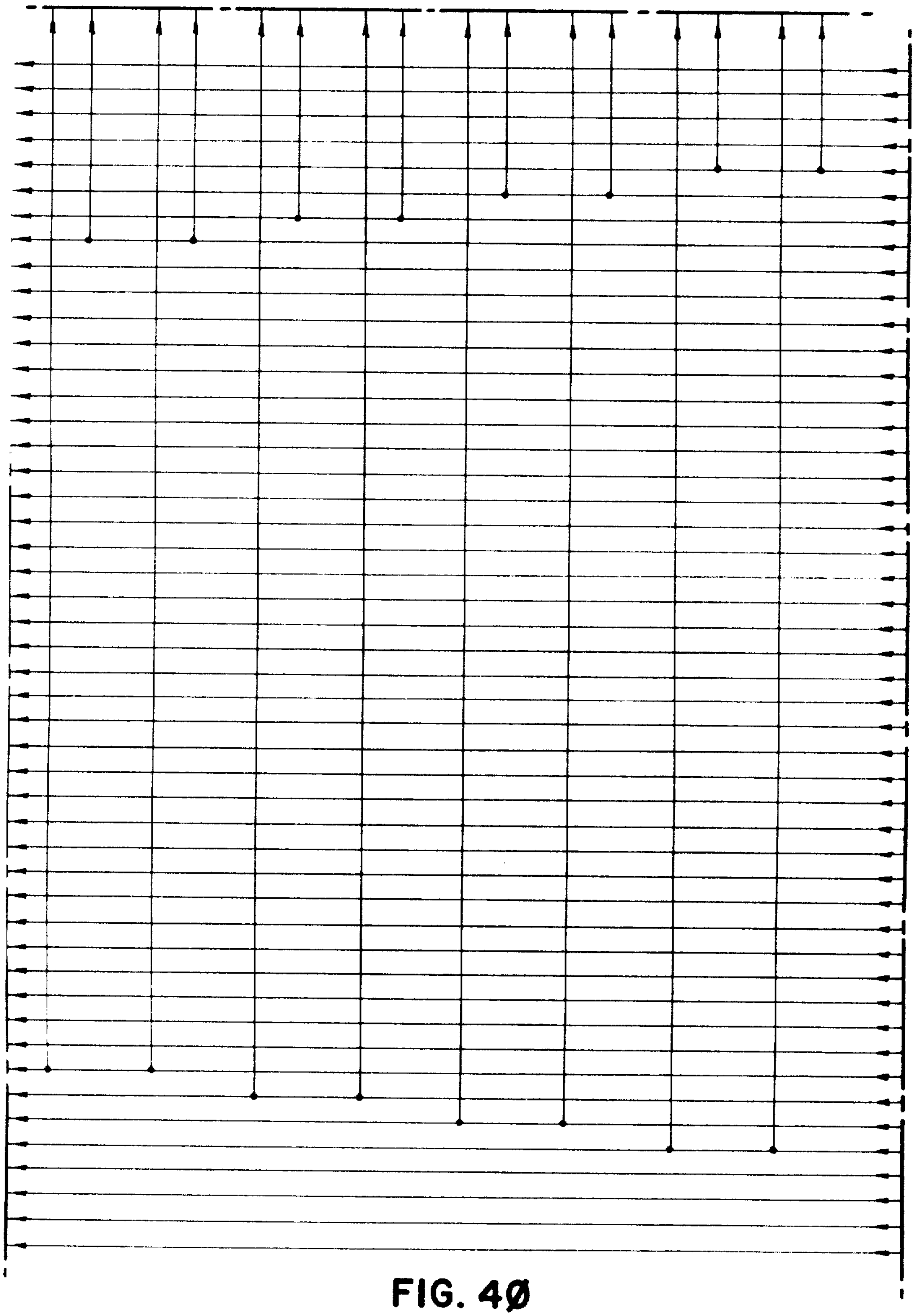
Figure 4P:
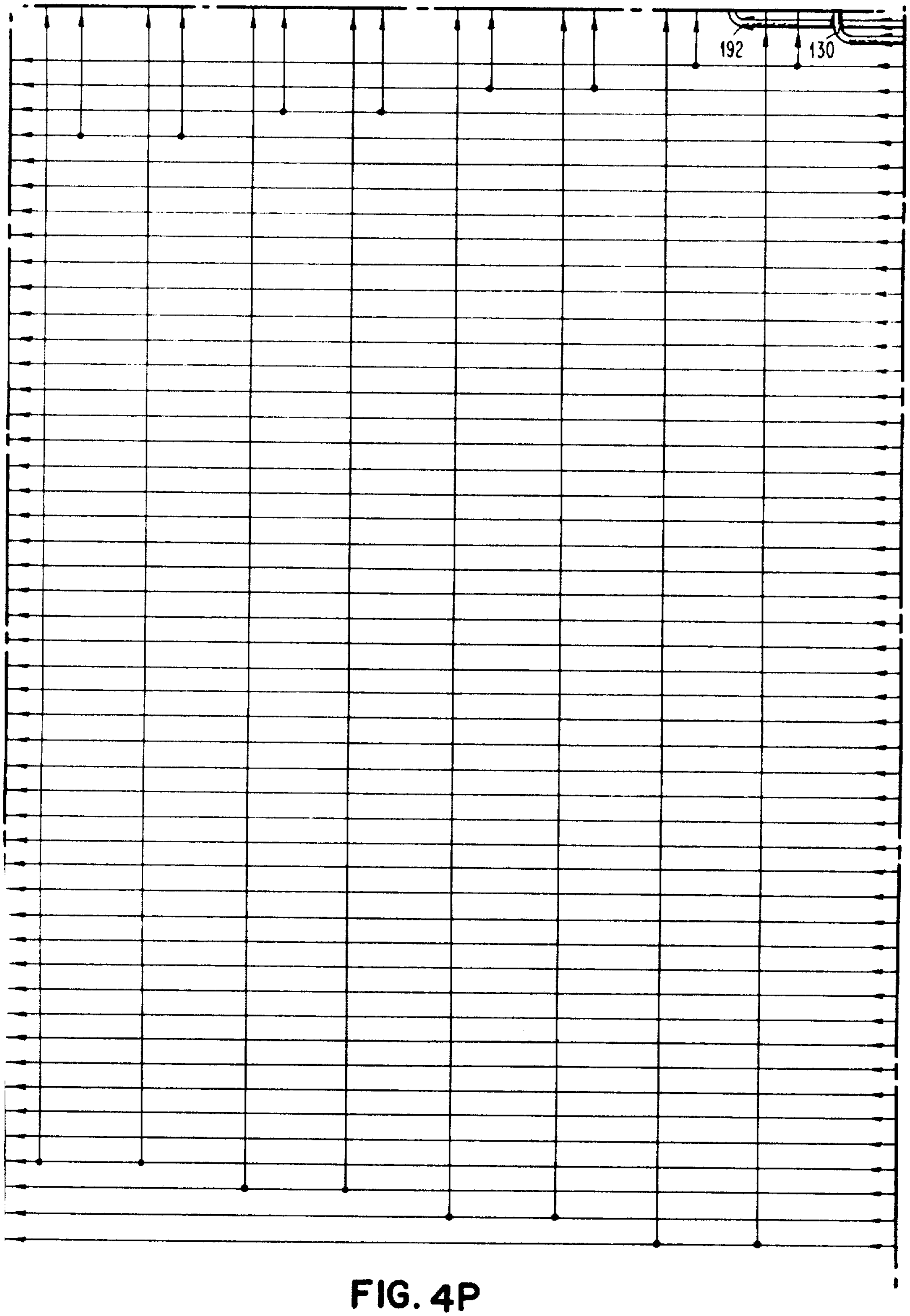

The gating for the drive wires of the Memory Cube is shown in FIG. 4. Here, the wires labeled "Write-0-Plane" to "Write-7-Plane" inclusive are used for a "write" access in either the X or Y direction. The wires labeled "Write X–0 Slice" to "Write Y–0 Slice" are used for a "write" access in the Z direction. The wires labeled "Read Y–0 Slice" to "Read X–0 Slice" inclusive and used for a "Read" access in the Z direction. The wires labeled "Read-7-Plane" to "Read-0-Plane" are used for a "Read" access in either the X or Y direction.

The upper row of gates in FIG. 4 performs the function of selectively grounding one end of selected drive lines and the lower row of gates is effective in applying the drive pulses to the opposite end of the grounded drive lines. Thus, as will be well understood, depending on the direction of flow of the drive pulse, the memory will be in a "read" or "write" cycle.

The Main Controls are shown in FIG. 2. There is only one of these Main Control units no matter how large the memory system. The information supplied to the memory system is shown at the top of FIG. 2. Looking from left to right, the line labeled "Write Access" is active if the access is a "Write" access. The line labeled "Read Access" is active if the access is a "Read" access. Either line can start the clock. The "Direction of Access" is indicated by a two bit binary number and, as can be seen, these two bits are decoded into either an X, a Y or a Z access. The "number of words" is a three bit binary number. It will be shown later how this field controls the inhibiting circuits to allow the correct number of drivers from one to four to become active. The "Starting Address" is shown as three 3 bit binary fields, each field containing one octal digit.

Figure 4Q:
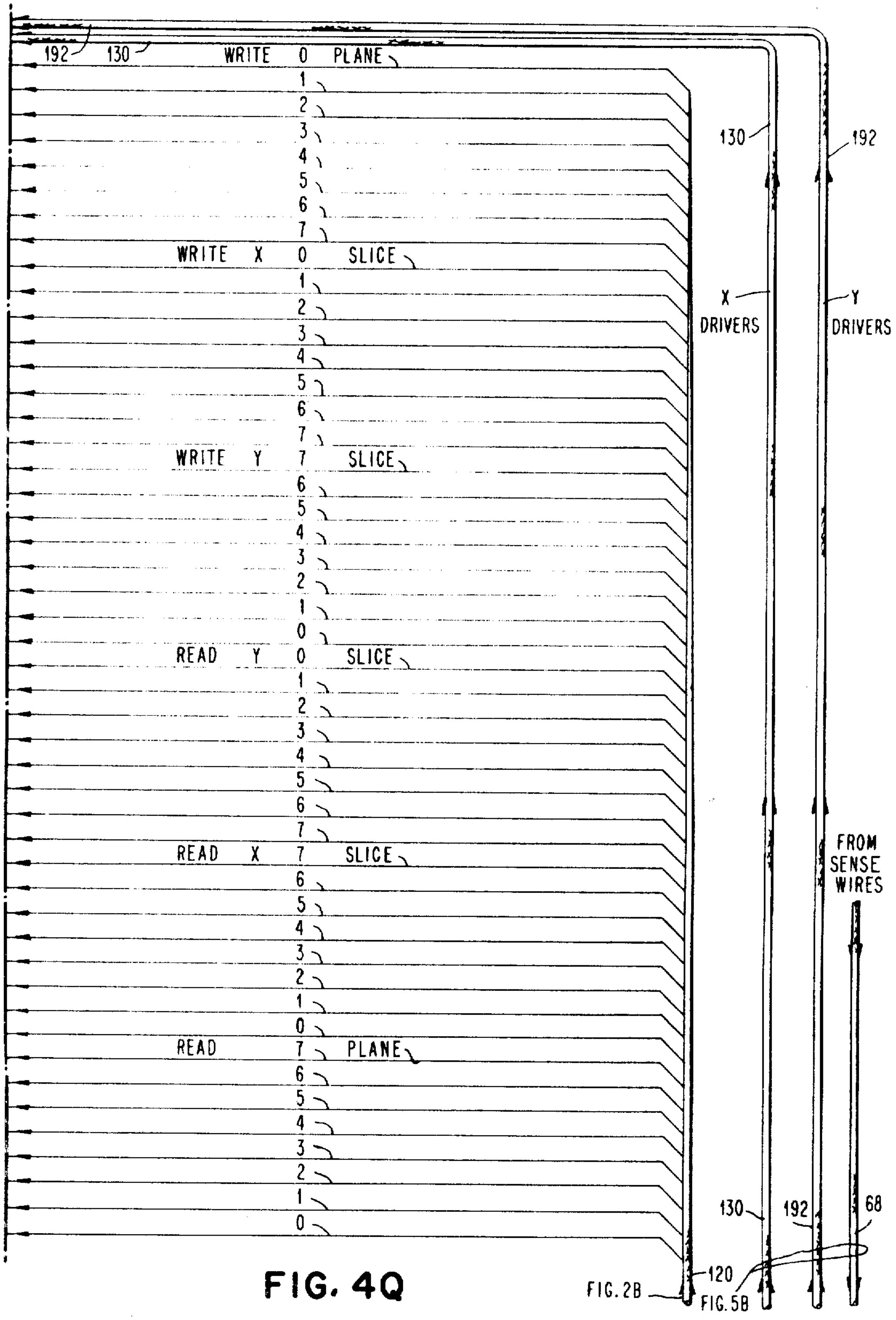

The system clock 209 is shown at the lower left of FIG. 2C and the outputs thereof correspond to the timing chart on FIG. 7. As is evident from an inspection of FIG. 2, the total system address comprises the Direction of Access," "The Number of Words," "Read or Write," and the "Starting Address" (A). The "Number of Words" field, as explained before, controls inhibiting circuits in the Local Control units 8. The X, Y and Z Starting Addresses are applied to the Adder 16 and the two lower order bits from the Adder 16 are recoded to control the rotation of the sense wires. The rotation circuits are in the Local Control units 8 and they will be explained in detail later. The X and Y Starting Addresses are also converted to base four by the converter units 18 and 20 and it will be shown later how the outputs of the units 18 and 20 control the X and Y Shifter units which are located in the Local Controls 8. The Starting Addresses are also applied to the Recorder Units 22, 24 and 26 where the three bits are decoded into eight lines one of which will be activated. The recorder unit 22 feeds the "Read Gate" 28 and the "Write Gate" 30. The "Read Gate" 28 is shown in detail in FIG. 10 and the wires coming from the gate go to similarly marked wires on FIG. 4Q. The "Write Gate" 30 is shown in detail in FIG. 11 and the wires coming from it go to similarly marked wires on FIG. 4Q. It should be noted that only one Recorder such as 22 is needed for either an X or a Y access. In the case of an X or a Y access, the Recoder 22 selects the single plane in which the access will take place and it is obvious that this selection is determined by the Z Starting Address. The Recoder 26 feeds the top eight lines of the "Read Gate" 32 and the top eight lines of the "Write Gate" 34. The Recoder 24 feeds the bottom eight lines of the "Read Gate" 32 and the bottom eight lines of the "Write Gate" 34. The gates 32 and 34 and the wires coming from them go to similarly marked wires on FIG. 4Q.

The Local Controls are shown on FIG. 5. The various inputs and outputs shown on FIG. 5 agree with those shown on the Block Diagram of FIG. 1. There are four drivers 36, 38, 40 and 42 associated with the X Shifter unit 44 and four drivers 44, 46, 48 and 50 associated with the Y Shifter unit 52. The X Shifter Unit 44 and the Y Shifter Unit 52 are identical. It will be noted that FIG. 14 and FIG. 15 which comprise the X and Y Shifters contain identical circuitry but are both illustrated since they will be useful later on in the description when actual circuits will be traced in the performance of a specific example. On the "Read" portion of a memory cycle the X and Y Drivers are enabled by wires 54 and 56 which come from the Main Control unit FIG. 2. On the "Write" portion of a memory cycle the X and Y Drivers are enabled by wires 58 and 60 which are ANDed with the cables 63 and 65 coming from the Memory Data Register 10. In other words, on the "Read" portion of a memory cycle all drivers are initially enabled. Some of these, as will be explained later, may be inhibited in the Shifter units 44 and 52. During the "Write" portion of a memory cycle the drivers are initially gated by "ones" stored in the Memory Data Register 10. As will be pointed out later, some of the selected drivers may be inhibited in the X and Y Shifter Units during the "Write" portion of a memory cycle. The specific operation of the Shifter units will be explained later but it can be mentioned now that the inhibiting in the Shifter units is done by cables 62 and 64 which come from the "Number of Words" register in the Main Control unit FIG. 2. If this register contains the binary equivalent of the number "one," three drivers will be inhibited. If it contains the binary equivalent of "two," two lines will be inhibited. If it contains the binary equivalent of "three," one line will be inhibited and if it contains the binary equivalent of "four," no lines will be inhibited. It should also be noted at this time that a single X or Y access is obtained by injecting a binary "one" into either cable 62 or 64 from line 66 (top of FIG. 2). This operation will be explained in detail later.

Again referring to FIG. 5, the four sense wires come in on cable 68. These wires come from FIG. 8. It was mentioned before that the amount of rotation is equal to the two low order bits of the sum of the X, Y and Z starting addresses. This, it will be remembered, is obtained from the formula $$J=\text{residue}(X+Y+Z) \text{ modulo } N$$

If this sum has any number in the low order 2 bits, these 2 bits are the residue or J. These two bits come in on cable 70 from FIG. 2 and go to the Rotator 72. The details of the Rotator are shown on FIG. 16 and will be explained in detail later. There are four sense amplifiers (one for each sense line) indicated by the reference character 74. The sense amplifiers feed the Inhibit unit 76. The Inhibit unit 76 permits only the proper number of sense wires to be active (one to four) and also controls the initial reset of the Data Register on a "Read" access. The Data Register can hold four words and it may be desired to replace only one, two or three of these words by a "Read" access. The Inhibit unit which is shown in detail in FIG. 17 will permit only the desired number of words in the Data Register 10 to be reset.

Figures 6, 6A:
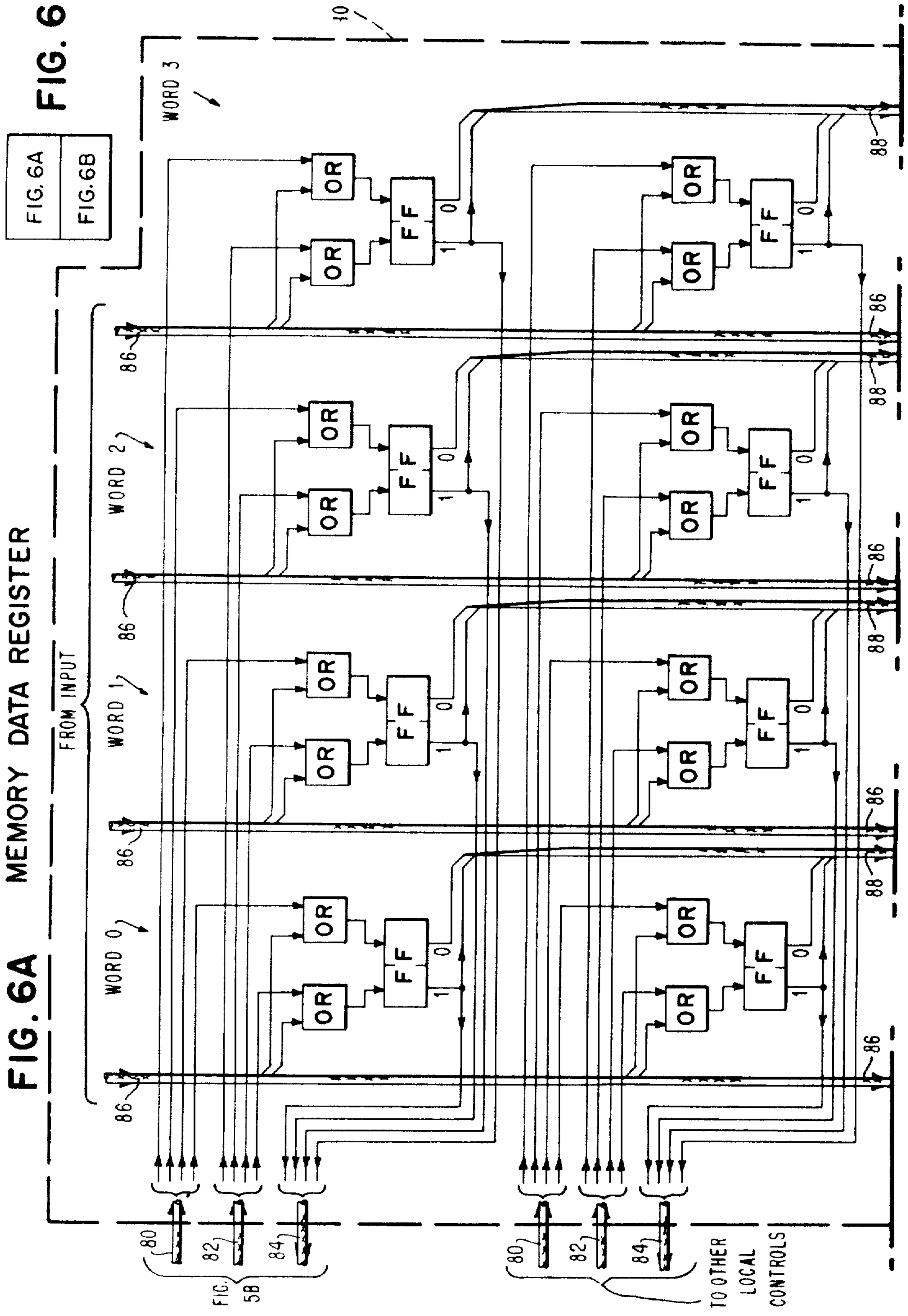
Figure 6B:
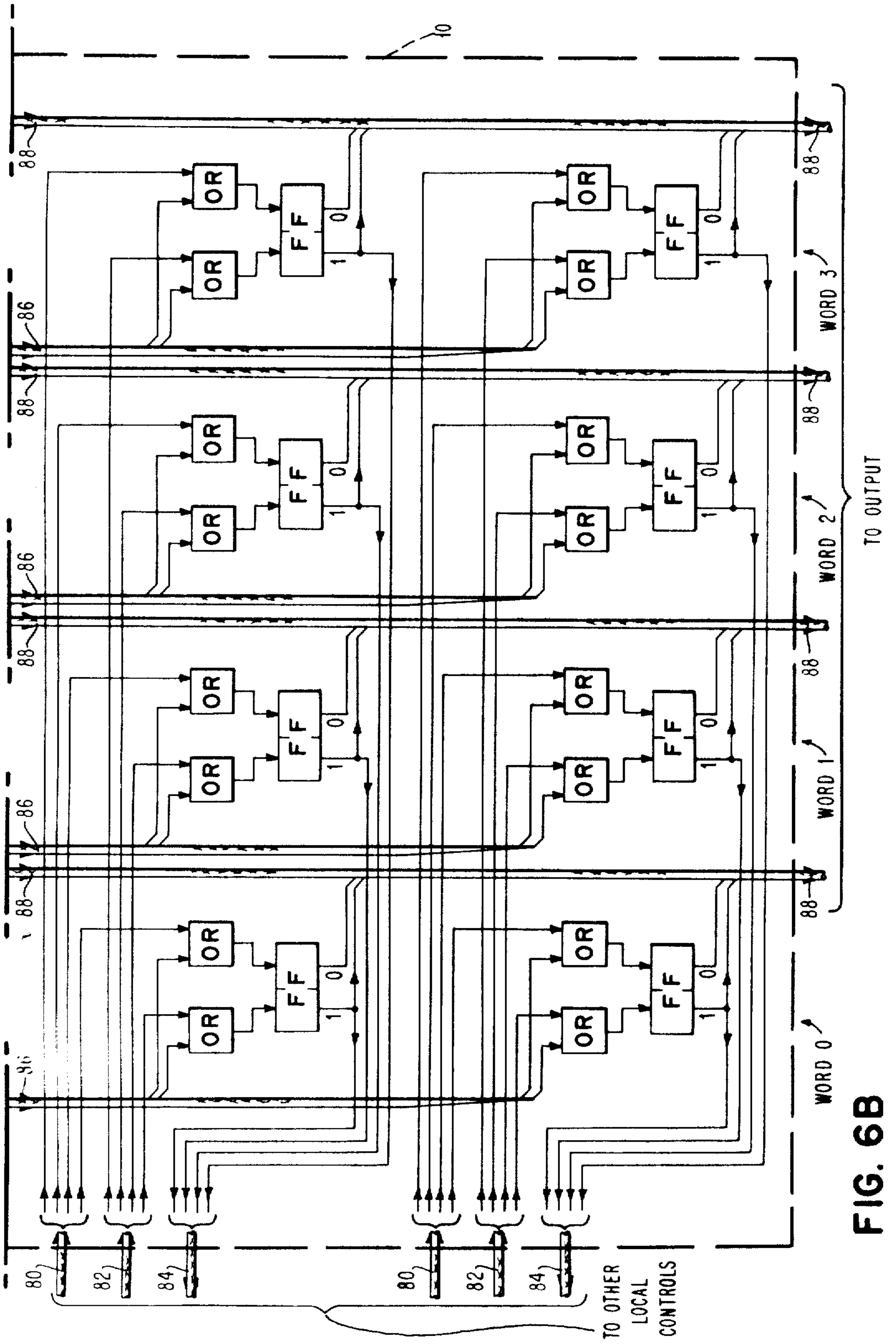

FIG. 6 shows the Data Register in detail. There are four word storage locations of four bits each. Referring also to FIG. 1 and FIG. 5 it will be seen that there are three cables connecting each Local Control unit 8 to the Data Register 10. The top cable such as 80 is used to reset the Data Register on a "Read" access under control of the Inhibit unit 76. The middle cable, such as 82 is used to read new information from the Memory Cube to the reset Data Register. The lower cable such as 84 is used to write information from the Data Register 10 into the Memory Cube. As shown, the words in the Data Register can be loaded from the computer by the cables 86. Information can go from the Data Register to the computer by the cables 88.

The X Shifter 44 shown in block form on FIG. 5 can be understood by referring to FIGS. 14 and 9. FIG. 9 shows how the X drivers in Plane 1 are numbered from X 0 to X 7 inclusive. All other planes are numbered in the same way. In FIG. 14, the four inputs at the lower left are from the four drivers and the eight outputs (up to a maximum of four may be active at any one time) at the lower right can be gated to the eight X wires shown in FIG. 9. In the case of a Y access, see plane 2 of FIG. 9 the amount of the X Shifter is the same as the X Starting Address (3 bit portion). If the X Starting Address is 0, there will be no shift and the wires coming in at the left of FIG. 14 will go out on the same numbered wires at the right of FIG. 14, assuming that none are inhibited. In this case, gates 90 and 92 will be enabled. If the Starting Address is 1, gates 94 and 92 will be enabled and it will be seen that, for example, the "0" input will go out on the "1" output line and the other input lines will be shifted accordingly. The maximum shift is 7 and in this case, the number of words accessed can be only one. The lines from the "Number of Words" register at the top of FIG. 2 come in at the top of FIG. 14. If this register contains the binary equivalent of the number 4, then lines 96, 98 and 100 will be active. An inspection of the circuit at the top of FIG. 14 will show that all four lines 102, 104, 106 and 108 will be active thus enabling all four gates 110, 112, 114 and 116. If the "Number of Words" register contains the binary equivalent of the number 3 then lines 111 and 113 only will be active with the result that lines 104, 106 and 108 will be active thus enabling gates 112, 114 and 116. It will be noted that gate 110 is not enabled and that, in this case, only three drivers are connected to the input of the Shifter. If the number of words is 2, only gates 114 and 116 will be enabled and, if the number of words is 1, only gate 116 will be enabled. Reference to FIG. 9 will show that for the example illustrated by Plane 2, the X Starting Address is 2 and the number of words is 4.

The second way that the X Shifter is controlled is illustrated by Plane 0 of FIG. 9. Here, the single access is along the $X_3$ wire. When the single access is in this direction only one X driver is used and the condition is the same as when the number of words is 1. The X Starting Address is applied to the X Shifter as before but a binary "one" is gated from line 66 (top of FIG. 2) to line 111 (top of FIG. 14). This enables only gate 116 and provides the single driver needed. (The other three are inhibited.)

The operation of the Y Shifter, FIG. 15, is identical to that of the X Shifter and it is believed that a detailed description of it is not needed.

The third way that both the X Shifter and Y Shifter are controlled is illustrated by Planes 4, 5, 6 and 7 of FIG. 9. This illustrates a Z access. In this case, only a single X and a single Y driver are needed in each of the planes. Referring to FIG. 2, it will be seen that, in the case of a Z access, the line 210 is active which causes the "Number of Words" and the Z Starting Address to be applied over cables 152, 62, 159 and 64 to both the X and Y Shifters. In the example illustrated in FIG. 9, the Starting Address would be 4, i.e., plane 4, and the number of words would be 4. The four Y drivers active in planes 4, 5, 6 and 7 in FIG. 9 constitute what, in this description, is termed "Read Y–2 Slice." In other words the Y drivers are all within a vertical plane which contains or which is defined by the $Y_2$ drive lines. This particular vertical plane is determined by the Y Starting Address (in this case 2) which selects the "Read Y–2 Slice" line in gate 32. This line goes into cable 120 and appears on FIG. 4Q where it is effective to enable gates 122 and 124. Gate 124 connects cable 126 (FIGS. 3 and 4) to the output of the Y Shifter (cable 192, FIG. 5) and gate 122 connects cable 128 (FIGS. 3 and 4) to ground. Our inspection of FIG. 3 will show that cable 126 goes to the left ends of all of the $Y_2$ drive wires and that cable 128 goes to the right ends of all the $Y_2$ drive wires. The maximum number of wires that can be energized in cable 126 is four and the example in FIG. 9 chooses the wires for Planes 4, 5, 6 and 7. These wires must, of course, be in consecutive order.

In the case of this same Z access, the X drivers are selected in a similar manner under control of recorder 26 (FIG. 2). Thus, the gates 246 and 248 on FIGS. 4C. and 4F will be energized to connect the X–2 drive lines in Planes 4, 5, 6, and 7 to the X drivers.

One of the unobvious features of the present invention is the simple means by which the single set of four sense wires is rotated. The requirement is that the word specified by the Starting Address, regardless of whether the access is X, Y or Z, should go or come from the word "0" position of the Memory Data Register 10. The word following the Starting Address should be connected to the word "1" position of the Memory Data Register and so on. The Rotator is shown in FIG. 16. It consists mainly of four gates. One to give a zero rotation, one to give a rotation of one, one to give a rotation of two, and one to give a rotation of three. The four gates 130, 132, 134 and 136 on FIG. 16 have their output lines numbered to indicate the degree of rotation that each one causes. These gates are enabled by the decoded output of the adder which sums the X, Y and Z Starting Addresses. As stated previously, it is this adder which adds the X, Y and Z portions of the address A together with the taking of only the two low order bits of the sum which represents the formula $$J \text{ (rotation)} = \text{residue } (X+Y+Z) \text{ modulo N} \quad (4)$$

Only the two low order binary bits of this sum is used and thus the amount of rotation can be any number from 0 to 3.

Referring again to FIGS. 8 and 9, the example shown for Plane 0 will first be explained. Here, the X Starting Address is 3, the Y Starting Address is 1 and the Z Starting Address is 0. Converting these to binary and summing them, the results are as shown below.

11
01
00
100

The amount of rotation is 0. An inspection of FIG. 8 for Plane 0 will show that this is correct. In other words, the address W in plane 0 as shown in FIG. 8 lies along sense line S0.

Taking the example shown for Plane 2 in FIG. 9, the X Starting Address is 2, the Y Starting Address is 2 and the Z Starting Address is 2.

10
10
10
110

The amount of rotation is 2. An inspection of FIG. 8 for Plane 2 will show that the starting position is sensed by sense wire S2, the next by S3, the next by S0 and the next by S1. The order is S2, S3, S0 and S1. An inspection of FIG. 16 will show that this rotation is accomplished by gate 134, which is correct.

Taking the Z access illustrated by Planes 4, 5, 6 and 7 of FIG. 9, the X and Y Starting Addresses are both 2 and the Z Starting Address is 4.

10
10
100
1000

The amount of rotation is 0. An inspection of FIG. 8 will show that the Starting Address (in Plane 4) is sensed by line S0. The next position, in Plane 5, is sensed by line S1. The next position in Plane 6 is sensed by line S2 and the next position, in Plane 7, is sensed by line S3. No rotation is necessary.

The Inhibit circuit, FIG. 17 is similar to the inhibit circuits shown for the shifters and it is believed that no additional explanation is necessary.

A few examples will now be explained in detail to show the operation of the memory system.

Example 1

Direction of Access—Y
Number of Words—2
X starting address—1
Y starting address—2
Z starting address—3
Type of Access—"Read"

Referring first to FIG. 2, the "Read" access line 138 will be active. The Y line 140 will be active and this will cause lines 142, 144 and 146 to be active through OR blocks 141, 143 and 145. Gates 148 and 150 will thus be enabled and the Recoder 22 will have an output on its "3" line. The Starting Address are summed as follows:

01
10
11
110

Amount of rotation=2. Cable 70 has an output which extends to the Rotator block shown on FIG. 5 and FIG. 16. Gate 134 of FIG. 16 will be enabled. Cable 152 has an output which extends to the X Shifter 44 shown on FIG. 5 and FIG. 14. Gates 92 and 94 of FIG. 14 will be enabled. Cable 62 contains the "Number of Words" and has an output which also extends to X Shifter 44 shown on FIG. 5 and FIG. 14. Lines 96 and 113 of FIG. 14 will be active and this will cause gates 114 and 116 to be enabled. Cable 154 has an output which extends to the Y Shifter 52 shown on FIG. 5 and FIG. 15. Gates 156 and 190 of FIG. 15 will be enabled. Cable 64 will have an output which also extends to the Y Shifter 52 shown on FIG. 5 and FIG. 15. Line 160 of FIG. 15 will be active causing gate 158 to be enabled. Cable 162 has an output which extends to the Inhibit block 76 shown on FIG. 5 and FIG. 17. Lines 164 and 166 of FIG. 17 will be active and gates 168 and 170 will be enabled.

Having described the initial circuits which are set up the remaining operations for the One Dimensional Array Example can be described by listing the functions performed by each clock pulse.

CL–1: Line 172 becomes active. This line extends to FIGS. 5 and 17. Its function is to reset word positions 0 and 1 in the Data Register 10. The pulse on line 172 (FIG. 17) extends through AND gates 168 and 170 to accomplish this purpose. It will be noted on FIG. 5 that gate 174 is enabled in order to connect the output of the Inhibit 76 to the zero or reset sides of the flip-flops in the Data Register 10.

CL–2: Line 178 (FIG. 2) becomes active to enable the Read Gate 28. Read Gate 32 is also enabled but it is not effective at this time because Recorders 24 and 26 have no output. Referring to FIG. 10, the line labeled "Read-3-Plane" will be active. This line extends to FIG. 4 where it is effective to enable gates 180, 182, 184 and 186. Gate 186 connects the output of the Y Shifter 52 (FIG. 5) to the left ends of the Y drive wires in Plane 3 (FIG. 3). Gate 184 connects the output of the X Shifter 44 (FIG. 5) to the bottom end of the X drive wires in Plane 3 (FIG. 3). Gate 182 grounds the right hand ends of the Y drive wires of Plane 3 and Gate 180 grounds the top ends of the X drive wires of Plane 3. The drive wires are now connected in the proper manner to "Read" the cores.

AND gate 188, FIG. 2, has an output which is applied to line 54 which extends to FIG. 5 and is effective to energize the Drivers 36, 38, 40 and 42. Referring to FIG. 14 it will be seen that gates 114, 116, 94 and 92 are enabled. The X Shifter will thus have outputs on lines #1 and #2 (lower right of FIG. 14). In this manner, the X drive lines are energized.

CL–2*a*: Line 56 (FIG. 2) becomes active. This line extends to FIG. 5 and is effective to energize drivers 44, 46, 48 and 50. Referring to FIG. 15, it will be noted that gates 158, 156 and 190 are enabled. This will cause an output on the #2 line of FIG. 15 which will extend via cable 192 (FIGS. 4 and 5) to gate 186 of FIG. 4 and from there to the $Y_2$ drive line of Plane 3 (in the "Read" direction) and to ground via gate 182 (FIG. 4). In this manner, the single Y drive line is energized.

Line 194 (FIG. 2) is active. This line extends to FIG. 5 where it enables gate 196. This allows the output of the Inhibit 76 to be fed to the Data Register 10. The amount of rotation for this example is 2. FIG. 8 will show that the sense wires used are S2 and S3. These lines are rotated by gate 134 of FIG. 16 so that S2 becomes the 0 output line and S3 becomes the 1 output line, which is the desired configuration.

The "Read" portion of the memory cycle is now complete and the "Write" portion will follow.

CL–3: Line 198 (FIG. 2) will become active enabling the Write Gate 30 (shown in detail in FIG. 11) which will have an output on its "Write-3-Plane" line. On FIG. 4, gates 200, 202, 204 and 206 will be enabled. This will cause the drive lines for Plane 3 to be again selected but in the "Write" direction instead of the "Read" direction as before. Line 56 (FIG. 2) will become active to select the single Y driver in order to energize the X drivers under control of the "one" bits in the Data Register 10. Line 58 extends to FIG. 5 where it is effective to gate the "ones" from the Memory Data Register 10 which arrive on the cable 63 to the drivers 36, 38, 40 and 42. In FIG. 14 gates 114 and 116 are enabled which permit word 0 and word 1 to be written back into the core memory. In this manner, the Memory Cubes are regenerated on a "Read" access memory cycle.

Example 2

Direction of access—Z
Number of words—3
X starting address—2
Y starting address—1
Z starting address—4
Type of access—Write Referring first to FIG. 2, the "Write" access line 208 will be active. The Z line 210 will be active. This will cause gates 212, 214 and 216 to be enabled through the indicated OR blocks. Recorders 24 and 26 will be active. The effective sum of the Starting Addresses is 3 and this is sent via cable 70 to FIGS. 5 and 16. In FIG. 16 gate 136 will be enabled. The Z Starting Address extends via cable 152 to FIGS. 5 and 14. In FIG. 14 gates 90 and 218 will be enabled. The "Number of Words" extends via cable 62 to FIGS. 5 and 14. In FIG. 14, lines 111 and 113 will be active. This will result in gates 112, 114 and 116 becoming enabled. The Z Starting Address extends via cable 154 to FIGS. 5 and 15. In FIG. 15, gates 220 and 222 will be enabled. The "Number of Words" extends via cable 64 to FIG. 5 and FIG. 15 .In FIG. 15, lines 160 and 224 will be active. This will cause gates 158, 226 and 228 to be enabled. The "Number of Words" appears on cable 162 which extends to FIG. 5 and FIG. 17. In FIG. 17, lines 166 and 230 will be active and, as a result, gates 232, 168 and 170 will be enabled.

CL–1: In effective because this is a "Write" access.

CL–2: Line 178 (FIG. 2) becomes active enabling the "Read Gate" 32. The gate 32 (see FIG. 12) will have an output on the "Read X–2 Slice" line and an output on the "Read Y–1 Slice" line. Referring to FIG. 4, gates 246 and 248 will be enabled to connect the output of the X Shifter to the proper X drive lines of the Memory Cube. Gates 234 and 236 will be enabled to connect the output of the Y Shifter to the proper Y drive lines of the Memory Cube.

Line 54 is active and extends to FIG. 5 where it is effective to energize the X drivers 36, 38, 40 and 42. Referring to FIG. 14, it is seen that the 0, 1 and 2 input lines are shifted to the 4, 5 and 6 output lines which agrees with the Z Starting Address of 4. In this manner the X drive currents are initiated.

CL–2*a*: Line 56 (FIG. 2) becomes active. This line extends to FIG. 5 where it energizes the Y drivers 44, 46, 48 and 50. These supply the inputs to the Y Shifter 52. Referring to FIG. 15, it is seen that the 0, 1 and 2 input lines are shifted to the 4, 5 and 6 output lines which agrees with the Z Starting Address of 4. In this manner, the Y drive currents are provided.

It should be pointed out that gate 196 (FIG. 5) is not enabled during a "Write Access" and that the only purpose of CL–2 and CL–2*a* is to clear the proper cores so that new information can be written into them.

CL–3: Line 198 becomes active and enables the Write Gate 34 which will have an output on the "Write X–2 Slice" line and an output on the "Write Y–1 Slice" line. Referring to FIG. 4, gate 238 will be enabled to connect the output of the X Shifter to the proper X drive lines and gate 240 will be enabled to ground the other ends of these same drive lines. Gate 242 will be enabled to connect the Y Shifter to the proper Y drive lines and Gate 244 will be enabled to ground the other ends of these same drive wires. In FIG. 2, lines 58 and 60 will both be active. These lines extend to FIG. 5 where they gate the "ones" in the Data Register to the X and Y Drivers.

The operation of the presently disclosed embodiment is believed to have been fully set forth in the above description of the various figures and elements of the system and also with reference to the specific access examples. It will of course be noted that every functional element in the logical schematic diagrams has not been numbered and specifically described. However, it is believed that with the present explanation the overall operation of each functional unit has been set forth, and that the operation of the system would be abundantly clear to anyone skilled in the computer arts.

FIG. 18 shows the details of a plane of Read Out Gates such as might be used in a solid-state version of a memory system incorporating the teachings of the present invention. In such a solid state memory such as would be conventionally built up utilizing integrated or monolithic circuit technology, each plane of cores would be replaced by a plane of individual solid state storage elements such as the flip-flop and the two input gates shown in FIG. 18B. In this figure the X and Y lines perform the coincident select function and the two lines marked "data" would set the "1" or the "0" side of the storage flip-flop depending upon whether the input bit were a binary one or zero. FIG. 8C shows the details of an individual read out gate illustrating the connections from the bit storage position, the X and Y drive lines and the sense line. As will be further apparent by an examination of FIG. 18, assuming a maximum access (N) of 4 bits, only 4 sense windings are required and it will be readily understood that in any given accesses only one bit position connected to a given sense line could be properly accessed. Therefore, the output of the Read Out Gates may be simply OR-ed to the sense lines as only one of same would be active during any given cycle. It will of course be obvious in the proposed solid state memory embodiment that the same X and Y drivers can be utilized for both reading and writing operations and that the direction of current flow through the wire need not change for reading and writing. In such case, during a write cycle an output would appear upon the sense line. However, the sense line is merely disconnected from the Memory Data Register since this Register would be connected to the bit storage flip-flops via the "Data" lines. Obvious extensions of the present invention such as utilizing a much larger Memory Cube (3D), various configurations of Memory Modules and also a larger access size apply to this solid state version of the memory as well as to the magnetic core versions discussed in detail previously.

SUMMARY

The previous detailed description of the present invention with reference to the three dimensional Memory Cube as well as the general description of the one dimensional and two dimensional Memory Modules should clearly indicate the broad utility and adaptability of the disclosed memory system for those applications where, not only multiple accesses are desired but also where various combinations, i.e. directions, of word access are highly desirable. While certain design configurations are illustrated in the embodiment, it is to be understood that these were in many instances highly simplified for purposes of clearly setting forth the gist of the invention without obscuring it with unnecessary technical detail. For example, the size of the memory cube, i.e., 8 by 8 by 8 as well as the maximum number of bits accessed per Memory Cube were chosen for ease of illustration. In actuality individual memory cubes of 128 by 128 by 128 would in all probability be used with much larger K values (maximum number of bits per Memory Cube access).

The general description of a one dimensional and two dimensional embodiment as illustrated in FIGS. 8A and 8B clearly illustrate the manner in which a less complicated although less flexible Memory Cube can be incorporated in the system. Also, as generally stated in the General Description a multiplicity of three dimensional memory cubes might be utilized for each Memory Module, thus, extending the possible dimensions of access.

It may be seen that, applying the principles of the present invention in the broadest sense, a memory system is described wherein said memory system is comprised of a plurality of Memory Modules wherein the directions of access within the system and thus within each module is limited only by the number of dimensions of the Memory Module itself. Thus, in the two dimensional embodiment of FIG. 8B there are two dimensions of access and in the three dimensional embodiment described in detail in the remainder of the specification there are three dimensions of access etc. A further specific advantage of the system is that in such a system made up of a plurality of Memory Modules wherein each storage bit position within said module is separately accessible upon command there need be only as many total sense lines per module as the maximum number of bits to be accessed in any one memory cycle from said module. It will be of course be understood that this maximum is fixed by the design of the machine and that any number less than said maximum may be accessed by suitable programming of the system. Further, it will be obvious that in certain instances with a very large memory it may be necessary to use more than one sense line through a single string of cores, only one of which would be accessed at any one time, due to cumulative noise problems, signal fan in and fan out limitations etc. as will be readily appreciated by those skilled in the art. However, it will also be understood that from the standpoint of selectivity of the system only one sense line would theoretically be capable of doing the job assuming that the devices utilized therewith were capable of performing the assigned tasks.

Similarly while the majority of the present specification has been directed to conventional core storage, other memory storage forms such as thin film memories or solid state memories of the type generally referred to with respect to the description of FIG. 18, could equally well be utilized with the teachings of the present invention.

Also as stated previously the memory size and access size ("number of bits" K accessed per cycle) may vary at the will of the system designer. Similarly the particular address recoders and decoders as well as the instruction word format could vary widely. They were used here primarily for purposes of ease of illustration and adaptability to the presently disclosed numerical examples. Since the disclosed Memory Cube is 8 by 8 by 8, utilizing an octal code for designating access within the cube was particularly convenient since the three bit octal code represents the minimum and maximum data content necessary to specify such an address as will be readily understood. Other schemes could similarly be used for the Rotator for the sense lines to in effect unscramble the output of the memory during an access cycle. However, the disclosed system was thought to be particularly simple and straightforward in description.

Finally, in the three dimensional embodiment described in detail herein only two drive windings i.e., and X and Y were shown. Z accesses were made in the cube by relatively complicated logical circuitry capable of decoding the access instruction. It would be much simpler in terms of required encoding, decoding and switching apparatus to provide additional Z drive lines within the cube. Thus, if an X access were required the suitable Z and Y drive lines would be energized, if a Y access were required the suitable X and Z drive lines would be energized and if a Z access were desired the suitable X and Y drive lines would be energized thus providing the desired dimension or direction of access within a Memory Cube.

While the invention has been particularly shown and described with reference to preferred embodiments thereof, it will be understood by those skilled in the art that various changes in form and details may be made therein without departing from the spirit and scope of the invention.

What is claimed is:

1. In a multi-word access memory system for use with a computer the improvement which comprises central control means, a plurality of separate memory modules, each bit storage location therein being separately accessible, local control means associated with each module, said local control means being effective, in response to an address supplied to said central control means to concurrently access up to N bits in each module, N separate sense lines in each module said sense lines being wound such that not more than one of said concurrently accessed N bits will be serviced by any one of said sense lines.

2. A multi-word access memory system as set forth in claim 1 wherein a multi-bit access in each module comprises a multi-word access in said system, data register means associated with said system for accumulating the bits of data accessed from each module and wherein bits of data in the same relative location in different modules constitute different bits of the same word.

3. A multi-word access memory system as set forth in claim 2 wherein each module is M-dimensional and said local controls include means for accessing up to N consecutive bits in a selected one of said M-dimensions.

4. A multi-word access memory system as set forth in claim 3 said sense lines being arranged to sense individual memory elements so that a group of N consecutive bits starting at a beginning address A for a given memory access in any allowed direction of access will be serviced by the same sense lines in the same order.

5. A multi-word access memory system as set forth in claim 4 including address register means wherein an address supplied to said central control means specifies the beginning address in each module wherein a particular access of up to N bits is to occur, means connected to said N sense lines responsive to said starting address for always placing concurrently accessed bits on a set of output lines in their ascending order of address.

6. A multi-word access memory system as set forth in claim 5 including means for supplying said starting address to said central control means in binary form said M-dimensional memory being so arranged that each dimension is a power of 2 and no dimension is less than N, and means for directly decoding selected sections of said address to determine the coordinates of each dimension of said address.

7. A multi-word access memory system as set forth in claim 6 wherein each memory module is a 1-D array and includes means for determining the sense line on which a given starting address (A) will appear said means being effective to perform the operation defined by the equation:

$$J=\text{residue } (A) \text{ modulo } N$$

wherein J=the number of the sense line desired, A=the starting address, and N=the maximum number of bits concurrently accessible in the system and also the number of sense lines in each module.

8. A multi-word access memory system as set forth in claim 6 wherein each memory module is a 2-D array and includes means for determining the sense line on which a given starting address (A) will appear said means being effective to perform the operation defined by the equation:

$$J=\text{residue } (X+Y) \text{ module } N$$

wherein J=the number of the sense line desired, X and Y are the indicated components of the starting address (A), and N=the maximum number of bits concurrently accessible in the system and also the number of sense lines in each module.

9. A multi-word access memory system as set forth in claim 6 wherein each memory module comprises a three dimensional Memory Cube wherein said cube is comprised of a plurality of two dimensional planes wherein any storage location within a particular plane is specified by an X and Y address portion and wherein any plane may be specified by a Z address portion, said starting address including an indication of the "number of bits" up to N to be accessed on a current memory cycle and an indication of whether an access is to be in the X, Y or Z direction, means for directly decoding preselected portions of said starting address into the X, Y and Z address components thereof.

10. A multi-word multi-dimensional access memory system as set forth in claim 9 wherein each said two dimensional plane includes X and Y drive lines for performing coincident current accessing of storage locations, each module also including N drivers for selectively energizing up to N Y drive lines and N drivers for selectively energizing up to N X drive lines.

11. A multi-word multi-dimensional access memory system as set forth in claim 10 including means for causing both sets of drivers to energize their respective drive lines in a single two dimensional memory plane in the case of an X and a Y direction of access and for energizing their respective X and Y drive lines in adjacent planes in the case of a Z direction of access.

12. A multi-word multi-dimensional access memory system as set forth in claim 11 including decoding means responsive to the "Number of Words" and "Direction of Access" portions of the system address to selectively energize up to N drivers in each set concurrently depending upon the content of said system address.

13. A multi-word multi-dimensional access memory system as set forth in claim 9 including X, Y and Z drive lines, for accessing storage locations in said memory cube and means for supplying half select pulses concurrently to two of said drive lines to access a particular location, and wherein means are provided responsive to the direction of access portion of said system address to prevent energization of those drivers corresponding to said specified access direction.

14. A multi-word access memory system as set forth in claim 9 wherein the N sense lines for a single 3-D module are wound down through all of the planes of said module.

15. A multi-word access memory system as set forth in claim 14 including means for determining the sense line on which a given starting address will appear said means being effective to perform the operation defined by the equation $$J=\text{residue } (X+Y+Z) \text{ modulo } N$$

wherein J=the number of the sense line desired, X, Y, and Z are the indicated components of the starting address A, and N=the maximum number of bits concurrently accessible in the system and also the number of sense lines in each module.

16. A multi-word access memory system as set forth in claim 15 wherein any given bit in a memory cube may be selected by concurrently driving an X and a Y drive line in the particular plane in which the desired bit is located, the drive line selection system for effecting an X access within said three dimensional system comprising means for decoding from said starting address the particular X drive line along which the access is to occur, means for selecting as many consecutive Y drive lines beginning at the Y address portion of said starting address as are specified by "Number of Words" portion of the system address and for energizing the selected X and Y drive lines in the particular plane of said memory as specified by the Z portion of said starting address.

17. A multi-word access memory system as set forth in claim 15 wherein any given bit in a memory cube may be selected by concurrently driving an X and a Y drive line in the particular plane in which the desired bit is located, the drive line selection system for effecting a Y access within said three dimensional system comprising means for decoding from said starting address the particular Y drive line along which the access is to occur, means for selecting as many consecutive X drive lines beginning at the X address portion of said starting address as are specified by "Number of Words" portion of the system address and for energizing the selected X and Y drive lines in the particular plane of said memory as specified by the Z portion of said starting address.

18. A multi-word access memory system as set forth in claim 15 wherein any given bit in a memory cube may be selected by concurrently driving an X and a Y drive line in the particular plane in which the desired bit is located, the drive line selection system for effecting a Z access within said three dimensional system comprising means for decoding from said starting address the single X and Y drive lines along which the access is to occur and means for energizing said selected X and Y drive lines in as many planes of said memory, beginning at the plane specified by the Z portion of said starting address, as are specified by the "Number of Words" poriton of said address.

19. A multi-word access memory system as set forth in claim 14 wherein said individual storage locations comprise magnetic storage elements and wherein the same drive lines and the same address and access dimension decoding means are utilized to access particular locations on both the "read" and "write" access cycles but wherein gating means are included to select the direction of drive current flow depending upon the cycle.

20. A multi-word access memory system as set forth in claim 14 wherein the individual storage locations comprise selectively bistable solid state circuit modules and include both "read in" and "read out" gates associated therewith and means for concurrently energizing two drive lines for said storage location which will result in a "read in" or "read out" operation.

References Cited

UNITED STATES PATENTS

| | | | |
|---|---|---|---|
| 3,061,192 | 10/1962 | Terzian | 235—157 |
| 3,200,380 | 8/1965 | MacDonald et al. | 340—172.5 |
| 3,274,561 | 9/1966 | Hallman et al. | 340—172.5 |

RAULFE B. ZACHE, Primary Examiner